United States Patent
Fakoorian et al.

(10) Patent No.: US 10,609,714 B2
(45) Date of Patent: Mar. 31, 2020

(54) SPATIAL LISTEN BEFORE TALK

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/031,869

(22) Filed: Jul. 10, 2018

(65) Prior Publication Data

US 2019/0021092 A1    Jan. 17, 2019

Related U.S. Application Data

(60) Provisional application No. 62/531,763, filed on Jul. 12, 2017, provisional application No. 62/531,764, filed on Jul. 12, 2017.

(51) Int. Cl.
*H04W 72/08* (2009.01)
*H04B 7/0426* (2017.01)
(Continued)

(52) U.S. Cl.
CPC .......... *H04W 72/082* (2013.01); *H04B 7/043* (2013.01); *H04B 7/0456* (2013.01);
(Continued)

(58) Field of Classification Search
None
See application file for complete search history.

(56) References Cited

U.S. PATENT DOCUMENTS 10,476,709 B2 * 11/2019 Horvat ................. H04B 7/0854
2003/0125091 A1 * 7/2003 Choi ..................... H04B 7/0857
455/562.1
(Continued)

FOREIGN PATENT DOCUMENTS

WO   WO-2014188234 A1   11/2014
WO   WO-2016007757 A1   1/2016
(Continued)

OTHER PUBLICATIONS

International Search Report and Written Opinion—PCT/US2018/041664—ISA/EPO—dated Nov. 28, 2018.
(Continued)

*Primary Examiner* — Otis L Thompson, Jr.
(74) *Attorney, Agent, or Firm* — Liem T. Do

(57) ABSTRACT

Methods, systems, and devices for wireless communication are described. A user equipment (UE) may transmit a precoded reference signal to prevent interference with an incoming signal from a base station. The UE may determine a precoder for the reference signal based at least in part on a whitening matrix. In some examples, the UE may determine the precoder based at least in part on the whitening matrix and an effective channel between the base station and the UE. The precoded reference signal may be used by devices in other wireless communications systems to avoid interfering with a signal being received by the UE. In some examples, the UE may alternatively or additionally transmit an indication of the number of additional layers of the link between the UE and the base station that may be nulled out for a second link.

18 Claims, 31 Drawing Sheets

(51) Int. Cl.
*H04B 7/08* (2006.01)
*H04B 7/0456* (2017.01)
*H04L 5/00* (2006.01)

(52) U.S. Cl.
CPC ......... *H04B 7/0854* (2013.01); *H04L 5/0048* (2013.01); *H04L 5/0023* (2013.01); *H04L 5/0073* (2013.01)

(56) References Cited

U.S. PATENT DOCUMENTS

| | | | | |
|---|---|---|---|---|
| 2005/0025337 | A1* | 2/2005 | Lu | G06T 1/0028 382/100 |
| 2008/0225960 | A1* | 9/2008 | Kotecha | H04B 7/0413 375/259 |
| 2008/0232494 | A1* | 9/2008 | Pan | H04B 7/0426 375/260 |
| 2009/0141900 | A1* | 6/2009 | Ye | H04L 9/0875 380/270 |
| 2010/0002801 | A1* | 1/2010 | Jia | H04B 7/0417 375/296 |
| 2010/0254325 | A1* | 10/2010 | Narasimhan | H04B 7/024 370/329 |
| 2011/0150113 | A1* | 6/2011 | Oyman | H04L 1/0019 375/260 |
| 2011/0205963 | A1* | 8/2011 | Tang | H04B 7/0452 370/328 |
| 2011/0317748 | A1* | 12/2011 | Li | H04B 7/0417 375/219 |
| 2012/0157140 | A1* | 6/2012 | Kim | H04B 7/024 455/501 |
| 2013/0077514 | A1* | 3/2013 | Dinan | H04L 5/0057 370/252 |
| 2013/0129018 | A1* | 5/2013 | Ko | H04B 7/0478 375/296 |
| 2014/0350864 | A1* | 11/2014 | Fang | G06K 9/624 702/19 |
| 2015/0023442 | A1* | 1/2015 | Garcia Armada | H04B 7/024 375/267 |
| 2015/0146646 | A1* | 5/2015 | Chen | H04W 52/346 370/329 |
| 2015/0195020 | A1* | 7/2015 | Zhu | H04B 7/0617 370/329 |
| 2016/0013850 | A1* | 1/2016 | Zhou | H04B 7/0404 375/267 |
| 2016/0337156 | A1* | 11/2016 | Milleth | H04J 11/0056 |
| 2016/0358073 | A1* | 12/2016 | Desjardins | G06N 3/04 |
| 2016/0374060 | A1* | 12/2016 | Lim | H04L 5/0048 |
| 2017/0163327 | A1 | 6/2017 | Yang et al. | |
| 2017/0318593 | A1* | 11/2017 | Eriksson | H04L 5/006 |
| 2017/0359108 | A1* | 12/2017 | Abdel Khalek | H04B 7/0456 |
| 2018/0091197 | A1* | 3/2018 | Huang | H04B 7/0456 |
| 2018/0167183 | A1* | 6/2018 | Zhang | H04L 1/0031 |
| 2018/0337716 | A1* | 11/2018 | Fakoorian | H04B 7/0404 |
| 2018/0368083 | A1* | 12/2018 | Yang | H04B 7/0486 |
| 2019/0342013 | A1* | 11/2019 | Guo | H04B 15/00 |

FOREIGN PATENT DOCUMENTS

| | | |
|---|---|---|
| WO | WO-2016067318 A1 | 5/2016 |
| WO | WO-2016114696 A1 | 7/2016 |

OTHER PUBLICATIONS

Partial International Search Report—PCT/US2018/041664—ISA/EPO—dated Oct. 4, 2018.

* cited by examiner

SPATIAL LISTEN BEFORE TALK

CROSS REFERENCES

The present application for patent claims the benefit of U.S. Provisional Patent Application No. 62/531,763 by Fakoorian, et al., entitled "Spatial Listen Before Talk," filed Jul. 12, 2017, and assigned to the assignee hereof, and of U.S. Provisional Patent Application No. 62/531,764 by Fakoorian, et al., entitled "Spatial Listen Before Talk", filed Jul. 12, 2017, and assigned to the assignee hereof. Each of these applications is expressly incorporated by reference in its entirety.

BACKGROUND

The following relates generally to wireless communication, and more specifically to spatial listen before talk.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In order to avoid interfering with ongoing transmissions, a wireless device (e.g., a base station) may perform a listen before talk procedure before attempting to transmit. For example, the wireless device may measure the energy level on the transmission channel before attempting to transmit. If the energy level is above a threshold value, the wireless device may determine that another device is already transmitting on the transmission channel and will refrain from transmitting. If the energy level is below the threshold value, the wireless device may determine that no other device is transmitting on the transmission channel and that the transmission channel is available. The wireless device may then initiate a transmission.

SUMMARY

The described techniques relate to improved methods, systems, devices, or apparatuses that support spatial listen before talk.

A method of wireless communication is described. The method may include determining, by a user equipment (UE), a noise covariance matrix, selecting a subset of eigen directions based at least in part on the noise covariance matrix, determining a precoder based at least in part on the subset of eigen directions, and transmitting a reference signal precoded by the precoder.

An apparatus for wireless communication is described. The apparatus may include means for determining, by a user equipment (UE), a noise covariance matrix, means for selecting a subset of eigen directions based at least in part on the noise covariance matrix, means for determining a precoder based at least in part on the subset of eigen directions, and means for transmitting a reference signal precoded by the precoder.

Another apparatus for wireless communication is described. The apparatus may include a processor, memory in electronic communication with the processor, and instructions stored in the memory. The instructions may be operable to cause the processor to determine, by a user equipment (UE), a noise covariance matrix, select a subset of eigen directions based at least in part on the noise covariance matrix, determine a precoder based at least in part on the subset of eigen directions, and transmit a reference signal precoded by the precoder.

A non-transitory computer readable medium for wireless communication is described. The non-transitory computer-readable medium may include instructions operable to cause a processor to determine, by a user equipment (UE), a noise covariance matrix, select a subset of eigen directions based at least in part on the noise covariance matrix, determine a precoder based at least in part on the subset of eigen directions, and transmit a reference signal precoded by the precoder.

In some examples of the method, apparatus, and non-transitory computer-readable medium described above, selecting the subset of eigen directions of the noise covariance matrix comprises: selecting a set number of largest eigen directions of the noise covariance matrix.

In some examples of the method, apparatus, and non-transitory computer-readable medium described above, the reference signal comprises a sounding reference signal.

Some examples of the method, apparatus, and non-transitory computer-readable medium described above may further include processes, features, means, or instructions for determining a whitening matrix based at least in part on the noise covariance matrix. Some examples of the method, apparatus, and non-transitory computer-readable medium described above may further include processes, features, means, or instructions for selecting the subset of eigen directions from a set of non-zero eigen directions of the whitening.

Some examples of the method, apparatus, and non-transitory computer-readable medium described above may further include processes, features, means, or instructions for performing a signal measurement at the UE. Some examples of the method, apparatus, and non-transitory computer-readable medium described above may further include processes, features, means, or instructions for determining the covariance matrix based at least in part on the signal measurement.

A method of wireless communication is described. The method may include receiving, from a serving base station, an indication of the channel between the serving base station and a user equipment (UE), determining, by the UE, an effective channel between the serving base station and the UE based at least in part on the indication of the channel between the serving base station and the UE, determining a precoder based at least in part on the effective channel the serving base station and the UE, and transmitting a reference signal precoded by the precoder.

An apparatus for wireless communication is described. The apparatus may include means for receiving, from a serving base station, an indication of the channel between the serving base station and a user equipment (UE), means for determining, by the UE, an effective channel between the serving base station and the UE based at least in part on the indication of the channel between the serving base station and the UE, means for determining a precoder based at least in part on the effective channel the serving base station and the UE, and means for transmitting a reference signal precoded by the precoder.

Another apparatus for wireless communication is described. The apparatus may include a processor, memory in electronic communication with the processor, and instructions stored in the memory. The instructions may be operable to cause the processor to receive, from a serving base station, an indication of the channel between the serving base station and a user equipment (UE), determine, by the UE, an effective channel between the serving base station and the UE based at least in part on the indication of the channel between the serving base station and the UE, determine a precoder based at least in part on the effective channel the serving base station and the UE, and transmit a reference signal precoded by the precoder.

A non-transitory computer readable medium for wireless communication is described. The non-transitory computer-readable medium may include instructions operable to cause a processor to receive, from a serving base station, an indication of the channel between the serving base station and a user equipment (UE), determine, by the UE, an effective channel between the serving base station and the UE based at least in part on the indication of the channel between the serving base station and the UE, determine a precoder based at least in part on the effective channel the serving base station and the UE, and transmit a reference signal precoded by the precoder.

Some examples of the method, apparatus, and non-transitory computer-readable medium described above may further include processes, features, means, or instructions for receiving the indication of the channel between the serving base station and the UE comprises receiving a second precoded reference signal from the serving base station.

Some examples of the method, apparatus, and non-transitory computer-readable medium described above may further include processes, features, means, or instructions for determining the effective channel between the UE and the serving base station based at least in part on the second precoded reference signal.

Some examples of the method, apparatus, and non-transitory computer-readable medium described above may further include processes, features, means, or instructions for transmitting a third precoded reference signal to the serving base station. Some examples of the method, apparatus, and non-transitory computer-readable medium described above may further include processes, features, means, or instructions for receiving the second precoded reference signal in response to the third precoded reference signal.

Some examples of the method, apparatus, and non-transitory computer-readable medium described above may further include processes, features, means, or instructions for determining a whitening matrix based at least in part on a noise covariance matrix. Some examples of the method, apparatus, and non-transitory computer-readable medium described above may further include processes, features, means, or instructions for precoding the third precoded reference signal based at least in part on the whitening matrix.

Some examples of the method, apparatus, and non-transitory computer-readable medium described above may further include processes, features, means, or instructions for determining the precoder based at least in part on maximal-ratio combining (MRC) filtering.

Some examples of the method, apparatus, and non-transitory computer-readable medium described above may further include processes, features, means, or instructions for determining the precoder based at least in part on minimum mean square error (MMSE) filtering.

Some examples of the method, apparatus, and non-transitory computer-readable medium described above may further include processes, features, means, or instructions for determining a serving base station precoder based at least in part on the indication of the channel between the serving base station and the UE. Some examples of the method, apparatus, and non-transitory computer-readable medium described above may further include processes, features, means, or instructions for determining the precoder based at least in part on the serving base station precoder.

Some examples of the method, apparatus, and non-transitory computer-readable medium described above may further include processes, features, means, or instructions for determining a whitening matrix based at least in part on a noise covariance matrix. Some examples of the method, apparatus, and non-transitory computer-readable medium described above may further include processes, features, means, or instructions for determining the precoder based at least in part on the whitening matrix.

A method of wireless communication is described. The method may include receiving, at a wireless device in a first wireless communications system, scheduling information for a data transmission intended for the wireless device and transmitting a response to the scheduling information, wherein at least one of the scheduling information and the response to the scheduling information comprises an indication of a number of layers that can be nulled out for communications in a second wireless communications system.

An apparatus for wireless communication is described. The apparatus may include means for receiving, at a wireless device in a first wireless communications system, scheduling information for a data transmission intended for the wireless device and means for transmitting a response to the scheduling information, wherein at least one of the scheduling information and the response to the scheduling information comprises an indication of a number of layers that can be nulled out for communications in a second wireless communications system.

Another apparatus for wireless communication is described. The apparatus may include a processor, memory in electronic communication with the processor, and instructions stored in the memory. The instructions may be operable to cause the processor to receive, at a wireless device in a first wireless communications system, scheduling information for a data transmission intended for the wireless device and transmit a response to the scheduling information, wherein at least one of the scheduling information and the response to the scheduling information comprises an indication of a number of layers that can be nulled out for communications in a second wireless communications system.

A non-transitory computer readable medium for wireless communication is described. The non-transitory computer-readable medium may include instructions operable to cause a processor to receive, at a wireless device in a first wireless communications system, scheduling information for a data transmission intended for the wireless device and transmit a response to the scheduling information, wherein at least one of the scheduling information and the response to the scheduling information comprises an indication of a number of layers that can be nulled out for communications in a second wireless communications system.

Some examples of the method, apparatus, and non-transitory computer-readable medium described above may further include processes, features, means, or instructions for measuring a downlink channel from a user equipment (UE) in the second wireless communications system. Some examples of the method, apparatus, and non-transitory computer-readable medium described above may further include processes, features, means, or instructions for determining precoding weights based at least in part on the measuring.

DETAILED DESCRIPTION

Figure 1:
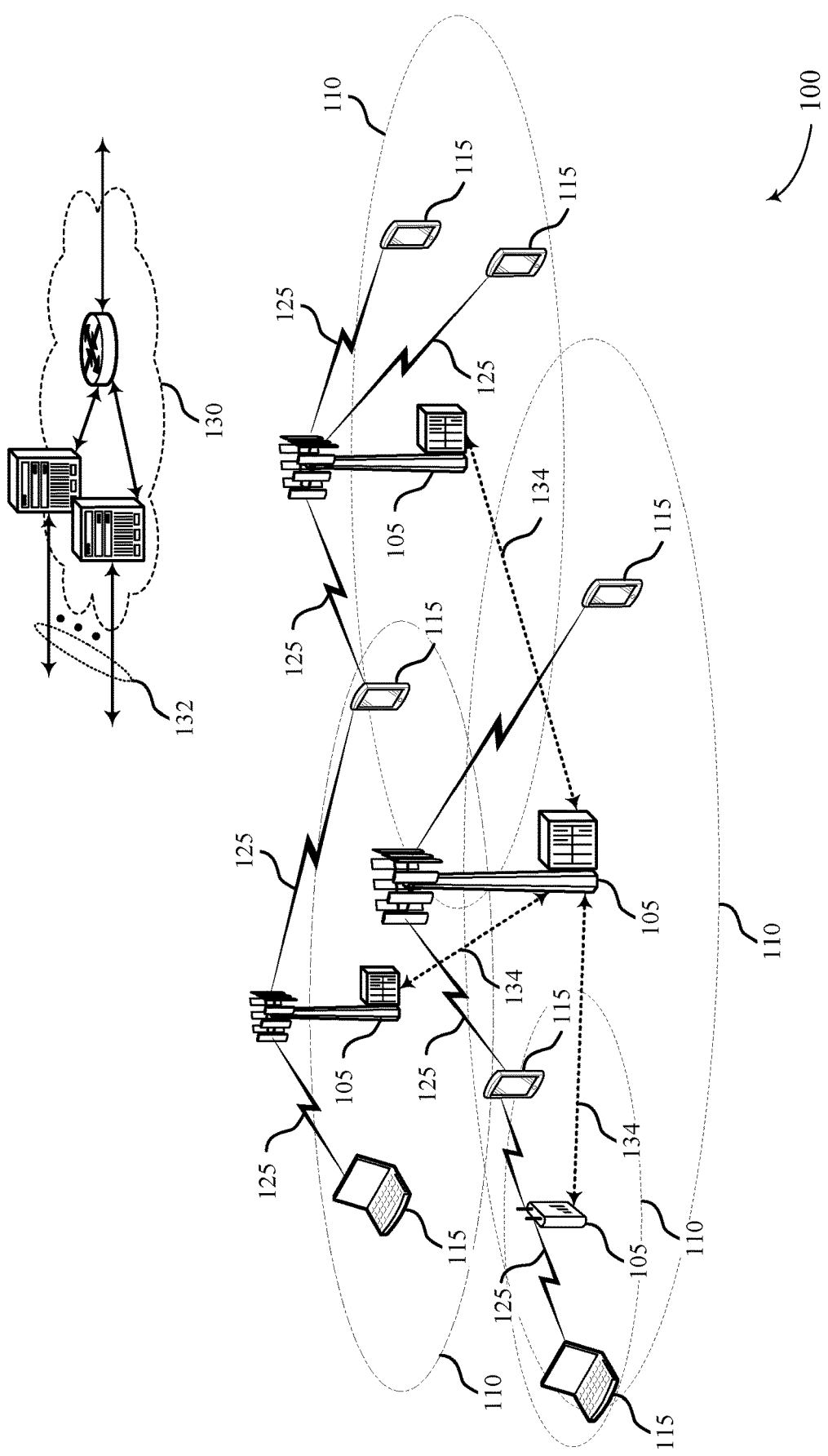
FIG. 1 illustrates an example of a wireless communications system that supports spatial listen before talk in accordance with aspects of the present disclosure.

In multiple-input multiple-output systems, a wireless device may have one or more transmission antennas and one or more reception antennas. In some examples, a wireless device (e.g., a base station) that has data to transmit may perform a listen-before-talk (LBT) procedure by measuring an energy level on each antenna. The base station may compare either the averaged energy across the antennas, or the maximum energy on any antenna, with the energy detection threshold and determine whether the transmission channel is available.

While such a LBT procedure may avoid interference with ongoing transmissions, it does not allow the base station to take advantage of the MIMO configuration. For example, an ongoing transmission may involve a transmission between a single transmission antenna at another base station and a single reception antenna at a UE (a 1×1 link). The base station may have two or more transmission antennas, and could transmit by nulling one stream while transmitting on the other stream. Thus, the base station could make more efficient use of the transmission channel.

In some examples, the base station may identify a null space with respect to the cross-channel between the base station and the UE. The base station may perform the LBT procedure based on the eigen vectors of the cross-channel and design a transmit precoder to null out the interference at the UE. In some examples, the base station may use this strategy in connection with a phase discontinuity from the UE. However, in some examples, such a design may not allow the base station to transmit when the UE has two reception antennas (e.g., where the link is 1×2), even though the signal will be transmitted by the single transmit antenna at the other base station.

In some examples, the base station may identify a null space with respect to a whitened cross-channel between the base station and the UE. The base station may perform the LBT procedure based on the eigen-vectors of the whitened cross-channel and design a precoder to null out the interference at the UE. In some examples, the base station may perform the LBT procedure and design the precoder based at least in part on a subset of the eigen-vectors of the whitened cross-channel. However, in some examples, such a design may not allow the base station to transmit when the UE observes white or full rank noise covariance, even though the rank of the noise covariance may not impact the base station's ability to null out the interference at the UE.

In some examples, the base station may identify a null space with respect to the whitened cross-channel and the whitened direct channel between the UE and the other base station. The base station may perform the LBT procedure based on the whitened cross-channel and the whitened direct channel and design a precoder to null out the interference at the UE.

In some examples, the UE may precode a reference signal to indicate how the base station may identify the null space. For example, the UE may transmit a reference signal precoded based at least in part on a whitening matrix or a whitening matrix multiplied by the effective direct channel. The base station may perform the LBT procedure and design the precoder based at least in part on the UE precoder.

Aspects of the disclosure are initially described in the context of a wireless communications system. Aspects of the disclosure are further illustrated by and described with reference to apparatus diagrams, system diagrams, and flowcharts that relate to spatial listen before talk.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a base station 105, other network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier,"

"component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
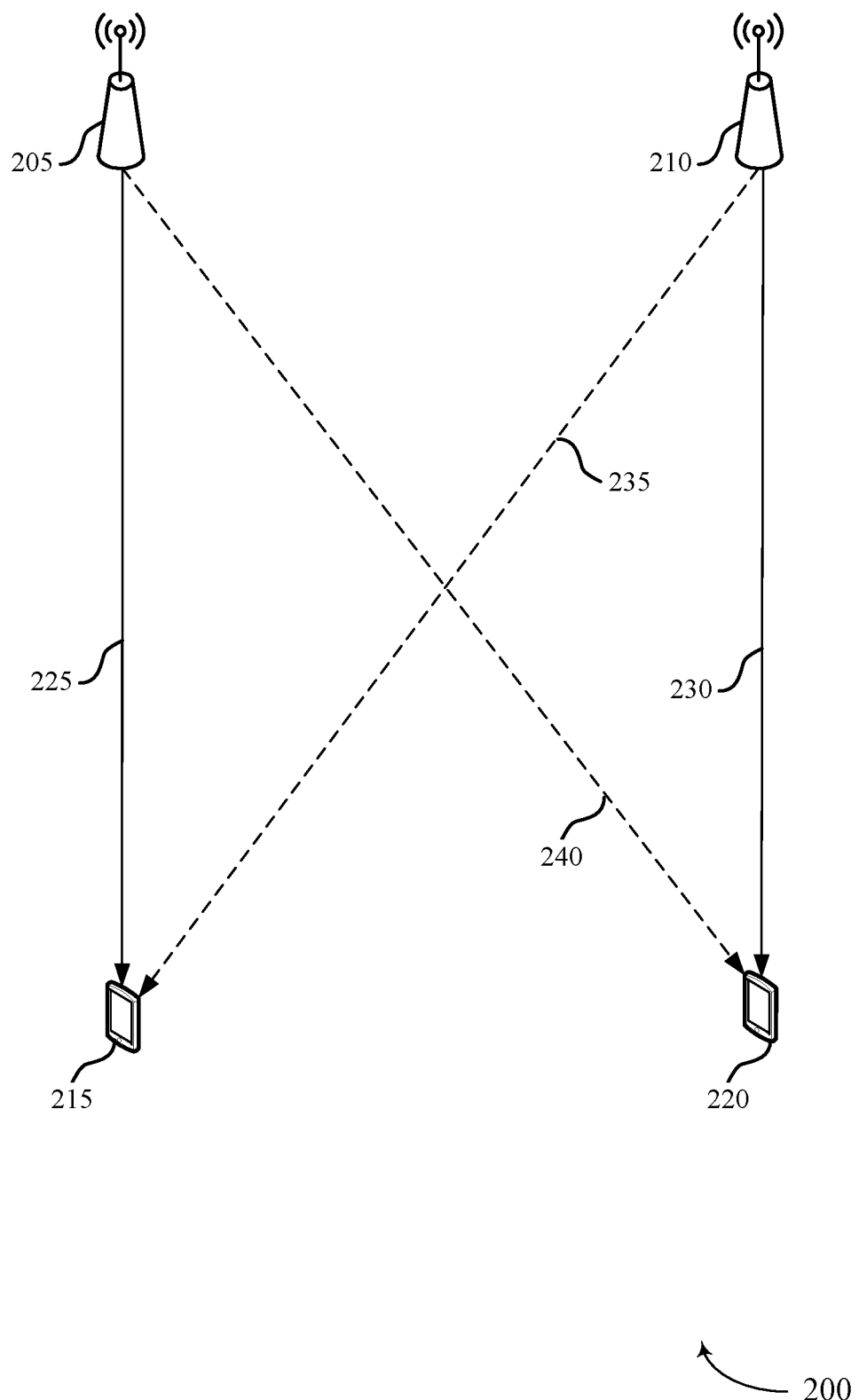
FIG. 2 illustrates an example of a wireless communications system that supports spatial listen before talk in accordance with aspects of the present disclosure.

FIG. 2 illustrates an example of a wireless communications system 200 that supports spatial listen before talk in accordance with various aspects of the present disclosure. In some examples, wireless communications system 200 may implement aspects of wireless communications system 100.

The wireless communications system 200 may include a first base station 205 and a second base station 210. The first base station 205 may be a part of a first basic service set (BSS) including first UE 215. The second base station 210 may be a part of a second BSS including second UE 220. The first base station 205 and the second base station 210 may be examples of aspects of base station 105 described with reference to FIG. 1. The first UE 215 and the second UE 220 may be examples of aspects of UE 115 described with reference to FIG. 1.

The first base station 205 may communicate with the first UE 215 over a first direct channel 225, which may be denoted as H or $H_1$. The second base station 210 may communicate with the second UE 220 over a second direct channel 230, which may be denoted as $H_2$. The first UE 215 may communicate with the second base station 210 over a cross-channel 235, which may be denoted as G.

In some examples, the first base station 205 may transmit data to the first UE 215 over the first direct channel 225. The second base station 210 may have data for transmission to the second UE 220 over the second direct channel 230. The second base station 210 may transmit such data by nulling out the interference at the first UE 215.

In some examples, the first UE 215 may transmit a precoded reference signal (e.g., a sounding reference signal) to the second base station 210. The precoded reference signal may be precoded by a UE precoder P. The first UE 215 may design the UE precoder based at least in part on the noise at the first UE 215. For example, the first UE 215 may design the UE precoder based at least in part on the noise covariance matrix R. The first UE 215 may design the UE precoder based at least in part on the first direct channel 225 and a transmit precoder at the first base station 205. For example, the UE precoder may be a whitening matrix $R_{nn}^{-1/2}$ or a whitening matrix multiplied by the effective channel between the first base station 205 and the first UE 215, $(R_{nn}^{-1} HW_1)^H$. The first UE 215 may determine the first direct channel 225 H based on a communication with the first base station 205, which may be a previous communication or a reference signal transmitted for the purpose of ascertaining H. The first UE 215 may determine the transmit precoder at the first base station 205 based on a communication with the first base station 205 or by calculating the transmit precoder based at least in part on the first direct channel 225 H.

The second base station 210 may receive the signal as PG, which may be referred to as the effective channel. The second base station 210 may design a transmit precoder $W_2$ based at least in part on the effective channel. For example, the second base station 210 may design a transmit precoder $W_2$ such that $PGW_2=0$. In some examples, the second base station 210 may design the transmit precoder $W_2$ such that the effective direct channel, $R_{nn}^{-1/2} HW_1$, is orthogonal to the effective cross-channel, $R_{nn}^{-1/2} GW_2$.

The second base station 210 may perform a LBT procedure based at least in part on the eigen direction of the effective channel. When the second base station 210 detects energy below an energy detection threshold ED on the eigen direction of the effective threshold, the second base station 210 determines that it may transmit. The second base station 210 may transmit data precoded by the transmit precoder to the second UE 220 without causing significant interference at the first UE 215.

Figure 3:
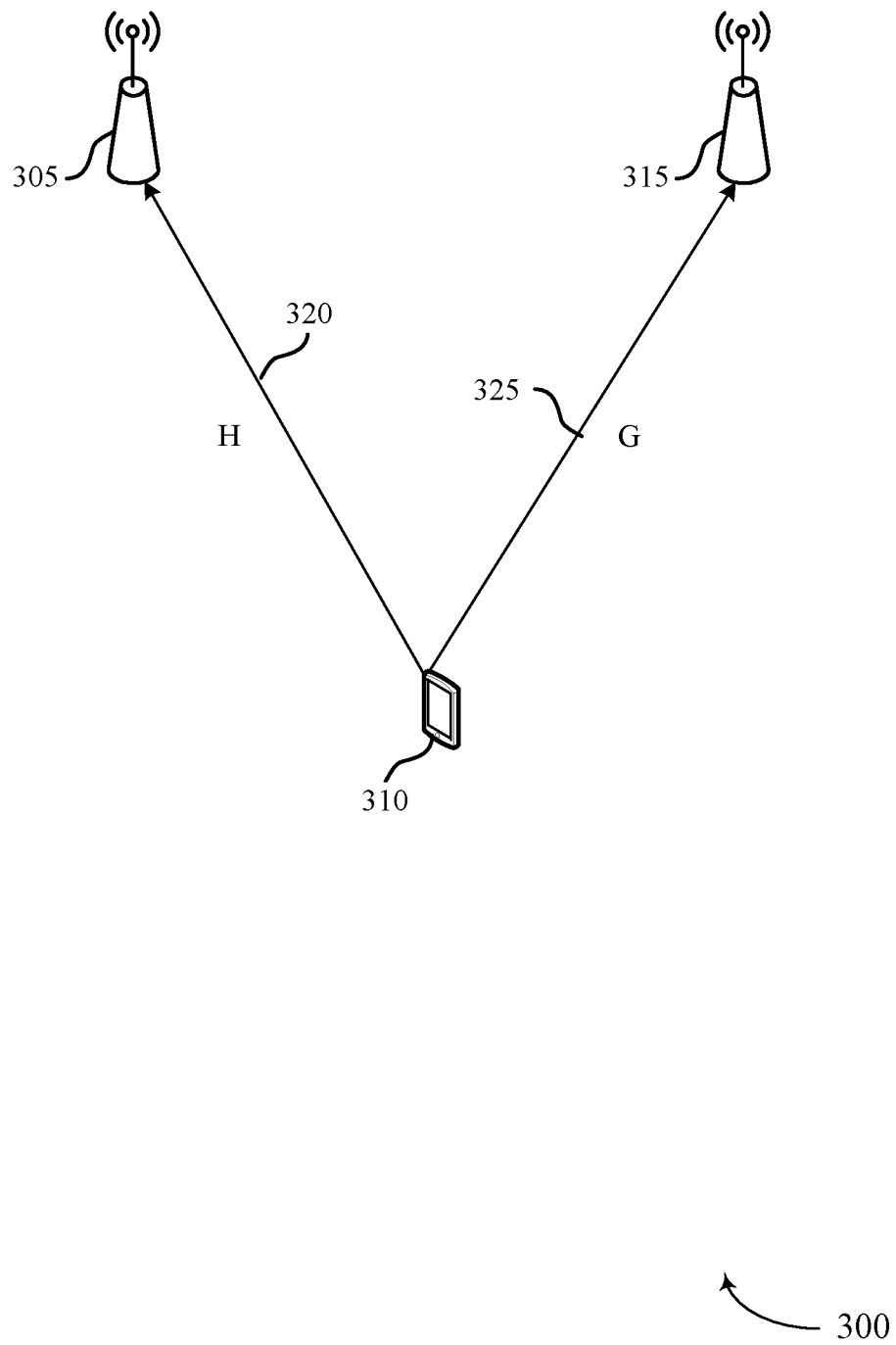
FIG. 3 illustrates an example of a wireless communications system that supports spatial listen before talk in accordance with aspects of the present disclosure.

FIG. 3 illustrates an example of a wireless communications system 300 that supports spatial listen before talk in accordance with various aspects of the present disclosure. In some examples, wireless communications system 300 may implement aspects of wireless communications system 100.

The wireless communications system 300 may include a first base station 305 and a first UE 310. The first base station 305 and the first UE 310 may be a part of a first BSS. The first base station 305 may be a serving base station for the first UE 310. The wireless communications system 300 may also include a second base station 315. The second base station 315 may be a part of a second BSS. The first base station 305 and the second base station 315 may be examples of aspects of base station 105 as described with reference to FIG. 1. The first UE 310 may be an example of aspects of UE 115 as described with reference to FIG. 1.

The first base station 305 may communicate with the first UE 310 over a direct channel H 320. The second base station 315 may communicate with the first UE 310 over a cross-channel G 325. In some examples, a signal transmitted by the first base station 305 may be represented at the first UE 310 as $HW_1S_1$, where H is the contribution from the direct channel H 320, $W_1$ is a precoder applied by the first base station 305, and $S_1$ is the data signal to which the precoder $W_1$ is applied at the first base station 305. Similarly, a signal transmitted by the second base station 315 may be represented at the first UE 310 as $GW_2S_2$, where G is the contribution from the cross-channel G 325, $W_2$ is a precoder applied by the second base station 315, and $S_2$ is the data signal to which the precoder $W_2$ is applied at the second base station 315.

In order to minimize interference from the second base station 315 at the first UE 310, the second base station 315 may make use of the null spatial dimension of G and design the precoder such that $GW_2$ sees energy below an energy detection threshold ED. The second base station 315 may measure the energy on the eigen direction of G and compare it with the energy detection threshold ED.

For example, the direct channel H 320 may be a 1×1 link with high geometry. The first base station 305 may schedule a high modulation and coding scheme (MCS) transmission to the first UE 310. The noise detected at the first UE 310 may be low. The cross-channel G 325 may be a 1×2 link. The second base station 315 may detect high reception energy from the first UE 310 on each antenna. The second base station 315 may transmit on the eigen direction of G which sees an eigen value 0, i.e., where $GW_2=0$, without causing significant interference to the reception at the first UE 310. The second base station 315 may perform a listen before talk (LBT) procedure on the eigen direction of G and compares the received signal on the eigen direction with an energy detection threshold ED. The second base station 315 may transmit without causing significant interference to the reception at the first UE 310 when the eigen direction has energy below the energy detection threshold ED.

In some examples, the first base station 305 may coordinate with a second UE served by the second base station 315 to improve efficiency. For example, the first base station 305 may receive a reference signal (e.g., a sounding reference signal) from the second UE over a second cross-channel $G_2$. The first base station 305 may identify a null space for the second UE based at least in part on the second cross-channel $G_2$. The first base station 305 may transmit data to the first UE 310 in the null space of the second UE in order to avoid significantly interfering with reception at the second UE. The second base station 315 may subsequently transmit data to the second UE in the null space of the first UE, as described above. Because the first base station 305 transmits in the null space of the second UE, the second UE may be able to receive the transmissions from the second base station 315 without significant interference from the ongoing transmissions between the first base station 305 and the first UE 310.

In some examples, the first UE 310 may have fewer transmission chains than reception chains (e.g., in order to reduce the radio frequency (RF) implementation costs). The first UE 310 may use antenna switching techniques. In such examples, the first UE 310 may not preserve the phase continuity of the transmission antenna(s) after the switch.

In such examples without phase continuity, the second base station may rely on the un-precoded cross-channel G 325. For example, the download cross-channel G 325 prior to a random phase $G_{DL,0}$ may be represented as $[G_0; G_1]$, where $G_0$ and $G_1$ represent different groups of transmission antennas at the first UE 310 that may not transmit at the same time. The downlink cross-channel G 325 after the random phase $G_{DL,n}$ may be represented as $[ej\theta\ G_0; ej\beta\ G_1]$, which is equivalent to $[ej\theta\ 0; 0\ ej\beta]G_{DL}$. Because $G_{DL,0}{}^H G_{DL,0}=G_{DL,n}{}^H G_{DL,n}=V \Lambda V^H$, the right singular value V of both $G_{DL,0}$ and $G_{DL,n}$ is the same and is not affected by the random phase. Accordingly, the second base station 315 may transmit on the eigen direction of G which sees an eigen value 0 when a phase discontinuity exists. In some examples, the second base station 315 may transmit on the eigen direction of G which sees an eigen value 0 in response to determining that a phase discontinuity exists at the first UE 310.

Figure 4:
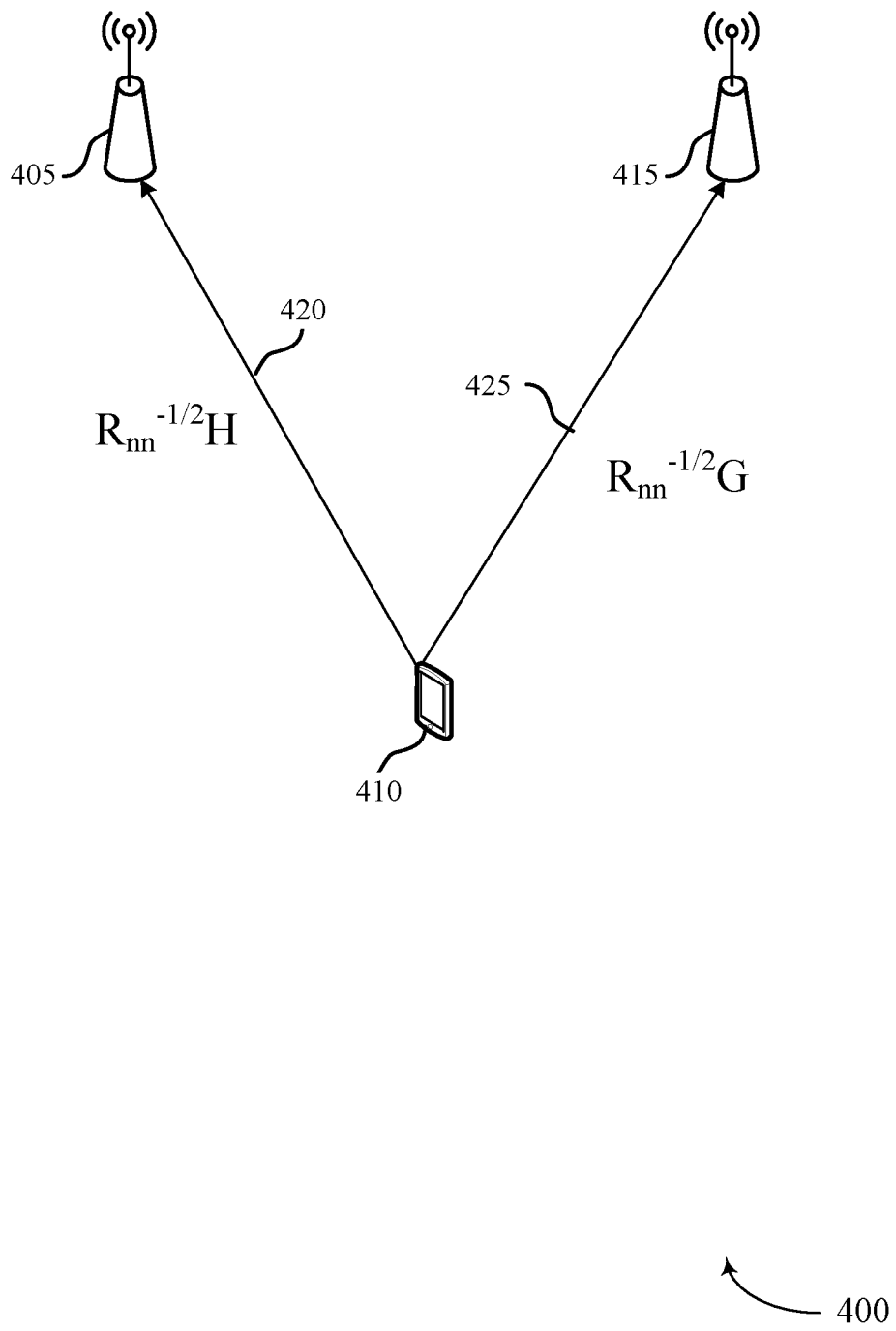
FIG. 4 illustrates an example of a wireless communications system that supports spatial listen before talk in accordance with aspects of the present disclosure.

FIG. 4 illustrates an example of a wireless communications system 400 that supports spatial listen before talk in accordance with various aspects of the present disclosure. In some examples, wireless communications system 400 may implement aspects of wireless communications system 100.

The wireless communications system 400 may include a first base station 405 and a first UE 410. The first base station 405 and the first UE 410 may be a part of a first BSS. The first base station 405 may be a serving base station for the first UE 410. The wireless communications system 400 may also include a second base station 415. The second base station 415 may be a part of a second BSS. The first base station 405 and the second base station 415 may be examples of aspects of base station 105 as described with reference to FIG. 1. The first UE 410 may be an example of aspects of UE 115 as described with reference to FIG. 1.

The first base station 405 may communicate with the first UE 410 over a direct channel H 420. The second base station 415 may communicate with the first UE 410 over a cross-channel G 425. The received signal $Y_1$ at the first UE 410 may be represented as $$Y_1 = HW_1S_1 + GW_2S_2 + Z_1 \qquad (1)$$

where $Z_1$ is noise. The first UE 410 may whiten the received signal as:

$$Y_{1w} = R_{nn}^{-1/2}Y_1 = R_{nn}^{-1/2}HW_1S_1 + R_{nn}^{-1/2}GW_2S_2 + Z_w \qquad (2)$$

where $Y_{1w}$ is the whitened signal and $R_{nn}$ is a noise covariance matrix based on $Z_1$.

In order to minimize interference from the second base station 415 at the first UE 410, the second base station 415 may make use of the null spatial dimension of $R_{nn}^{-1/2}$ G and design the precoder such that $R_{nn}^{-1/2} GW_2$ sees energy below an energy detection threshold ED. The second base station 415 may measure the energy on the eigen direction of $R_{nn}^{-1/2}$ G and compare it with the energy detection threshold ED.

In some examples, a signal transmitted by the first base station 405 may be represented at the first UE 410 as $HW_1S_1$, where H is the contribution from the direct channel H 420, $W_1$ is a precoder applied by the first base station 405, and $S_1$ is the data signal to which the precoder $W_1$ is applied at the first base station 405. Similarly, a signal transmitted by the second base station 415 may be represented at the first UE 410 as $GW_2S_2$, where G is the contribution from the cross-channel G 425, $W_2$ is a precoder applied by the second base station 415, and $S_2$ is the data signal to which the precoder $W_2$ is applied at the second base station 415.

In some examples, the first base station 405 and/or the first UE 410 may coordinate with a second UE served by the second base station 415 to improve efficiency. For example, the first base station 405 may receive a reference signal (e.g., a sounding reference signal) from the second UE over a second cross-channel $G_2$. The first base station 405 may identify a null space for the second UE based at least in part on the whitened second cross-channel $R_{nn}^{-1/2} G_2$. The first base station 405 may transmit data to the first UE 410 in the null space of the second UE in order to avoid significantly interfering with reception at the second UE. The second base station 415 may subsequently transmit data to the second UE in the null space of the first UE, as described above. Because the first base station 405 transmits in the null space of the second UE, the second UE may be able to receive the transmissions from the second base station 415 without significant interference from the ongoing transmissions between the first base station 405 and the first UE 410.

Figure 5:
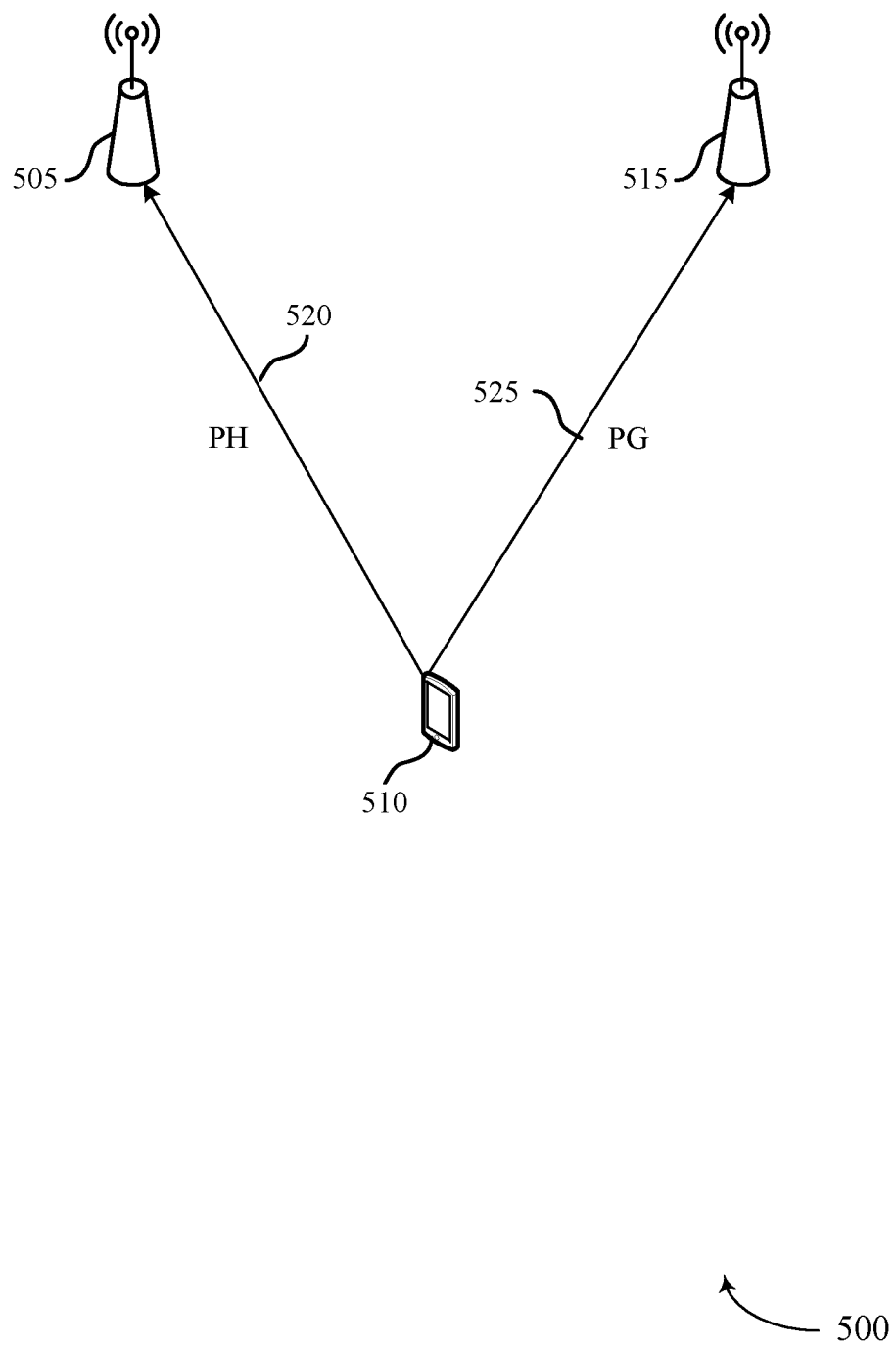
FIG. 5 illustrates an example of a wireless communications system that supports spatial listen before talk in accordance with aspects of the present disclosure.

FIG. 5 illustrates an example of a wireless communications system 500 that supports spatial listen before talk in accordance with various aspects of the present disclosure. In some examples, wireless communications system 500 may implement aspects of wireless communications system 100.

The wireless communications system 500 may include a first base station 505 and a first UE 510. The first base station 505 and the first UE 510 may be a part of a first BSS. The first base station 505 may be a serving base station for the first UE 510. The wireless communications system 500 may also include a second base station 515. The second base station 515 may be a part of a second BSS. The first base station 505 and the second base station 515 may be examples of aspects of base station 105 as described with reference to FIG. 1. The first UE 510 may be an example of aspects of UE 115 as described with reference to FIG. 1.

The first base station 505 may communicate with the first UE 510 over a direct channel H 520. The second base station 515 may communicate with the first UE 510 over a cross-channel G 525. The received signal at the first UE 510 $Y_1$ may be represented as given in Eqn. (1). The first UE 510 may whiten the received signal as given in Eqn. (2).

In some examples, the first UE 510 may select a subspace of $R_{nn}^{-1/2}$. Selection of such a subspace may reduce the uplink overhead. For example, $R_{nn}^{-1/2}$ may have a number of non-zero eigen directions (e.g., three non-zero eigen directions). The first UE 510 may select a subset of the non-zero eigen directions (e.g., two non-zero eigen directions). The selected non-zero eigendirections may be the M largest right eigen directions of $R_{nn}^{-1/2}$. In some examples, the unselected eigen directions of the subset of non-zero eigen directions may be negligible compared to the selected eigen directions. The first UE 510 may precode a reference signal (e.g., a sounding reference signal) based at least in part on the selected eigen directions. The precoder P may be chosen from the right singular direction of $R_{nn}^{-1/2}$.

For example, $R_{nn}^{-1/2}$ may be represented as:

$$R_{nn}^{-1/2} = [u_1 u_2 u_3] \begin{pmatrix} \lambda_1 & 0 & 0 \\ 0 & \lambda_2 & 0 \\ 0 & 0 & \lambda_3 \end{pmatrix} \begin{bmatrix} v_1^H \\ v_2^H \\ v_3^H \end{bmatrix} \quad (3)$$

where $u_i$ is the ith left singular vector of $R_{nn}^{-1/2}$, and $v_i$ is the ith right singular vector of $R_{nn}^{-1/2}$. The first UE 510 may determine that the third eigen vector $\lambda_3$ is negligible as compared to the first eigen vector $\lambda_1$ and the second eigen vector $\lambda_2$. The first UE 510 may select the first eigen vector $\lambda_1$ and the second eigen vector $\lambda_2$. The first UE 510 may design a precoder P based at least in part on the first eigen vector $\lambda_1$ and the second eigen vector $\lambda_2$. The first UE 510 may design a precoder P as:

$$P = [v_1 \ v_2] \begin{pmatrix} \lambda_1 & 0 \\ 0 & \lambda_2 \end{pmatrix} = [\lambda_1 v_1 \lambda_2 v_2] \quad (4)$$

Based on the precoding of the signal by a precoder P, the effective direct channel $H_{eff}$ may be represented as:

$$H_{eff} = PH = \begin{bmatrix} \lambda_1 v_1^H \\ \lambda_2 v_2^H \end{bmatrix} H \quad (5)$$

and the effective cross-channel $G_{eff}$ may be represented as:

$$G_{eff} = PG = \begin{bmatrix} \lambda_1 v_1^H \\ \lambda_2 v_2^H \end{bmatrix} G \quad (6)$$

The first base station 505 may perform downlink precoding based at least in part on $H_{eff}$.

In order to minimize interference from the second base station 515 at the first UE 510, the second base station 515 may make use of the null spatial dimension of $G_{eff}$ and design the precoder such that $G_{eff}W_2$ sees energy below an energy detection threshold ED. The second base station 515 may measure the energy on the eigen direction of PG and compare it with the energy detection threshold ED.

In some examples, the direct channel H 520 may be a 1×2 link with high carrier to noise ratio (C/N). The first base station 505 may schedule a rank 1 high MCS to the first UE 510. The first UE 510 may observe a $R_{nn}$ with a dominant interferer. The cross-channel G 525 may be a 2×2 link. The second base station 515 may observe the cross-channel G 525 with full dimension. However, the whitened cross-channel $R_{nn}^{-1/2} G$ may be rank deficient. The second base station 515 may perform a LBT procedure on the subspace of the whitened cross-channel PG and compare it with an energy detection threshold ED. The second base station 515 may transmit without causing significant interference to ongoing transmissions at the first UE 510 when the eigen direction observes energy below the energy detection threshold ED.

Figure 6:
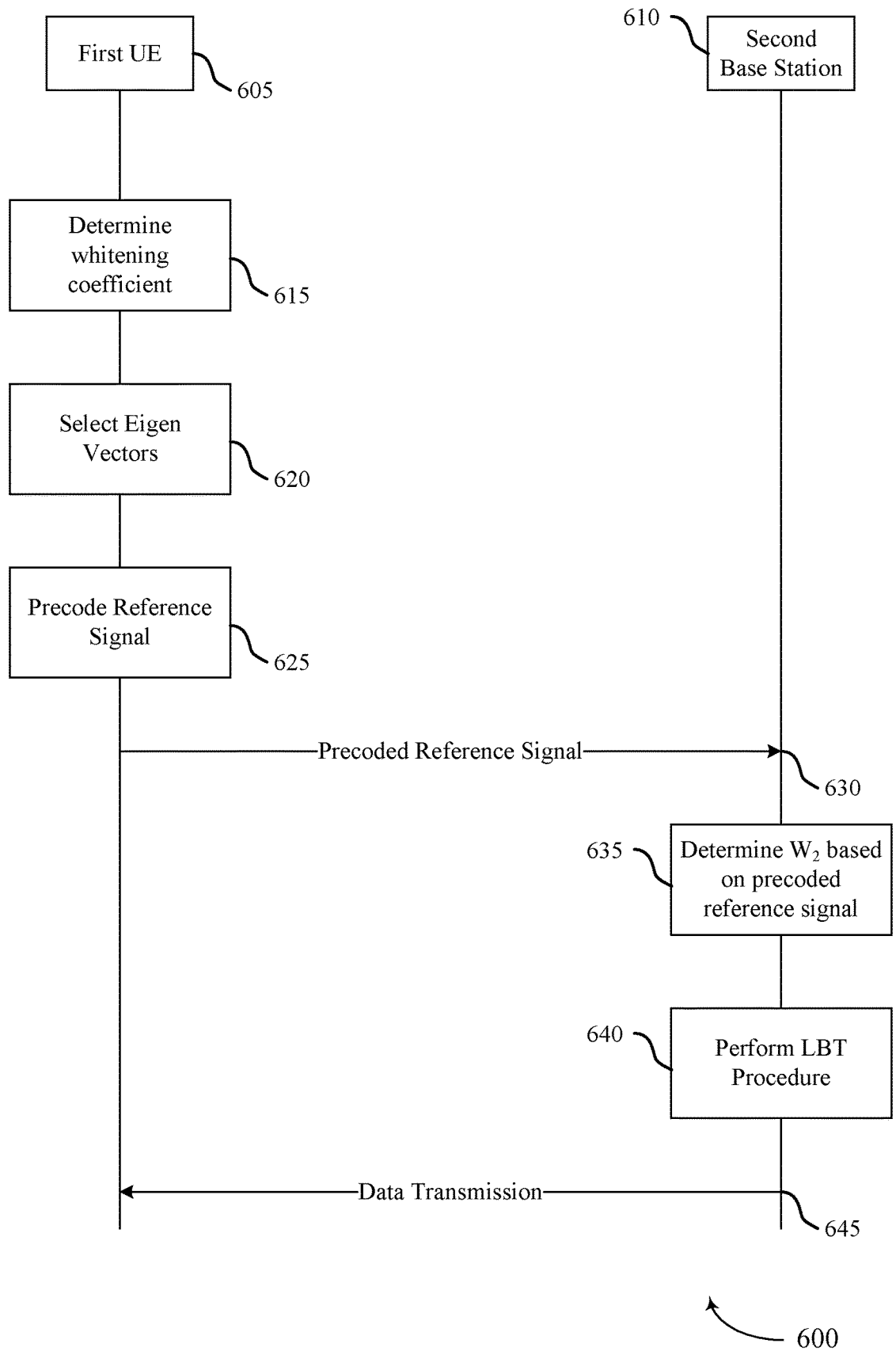
FIG. 6 illustrates an example of a flow diagram for communications in a wireless communication network that supports spatial listen before talk in accordance with aspects of the present disclosure.

FIG. 6 illustrates an example of a flow diagram 600 for communications in a wireless communications system that supports spatial listen before talk in accordance with various aspects of the present disclosure. In some examples, the wireless communications system may implement aspects of wireless communications system 100.

The flow diagram 600 shows communications between a first UE 605 and a second base station 610. The first UE 605 may be an example of aspects of UE 115 described with reference to FIG. 1. The second base station 610 may be an example of aspects of base station 105 described with reference to FIG. 1. The first UE 605 may be a part of a first BSS including a first base station that serves the first UE 605. The second base station 610 may be a part of a second BSS including a second UE that may be served by the second base station 610.

The first UE 605 determines a whitening coefficient at 615. The whitening coefficient $R_{nn}^{1/2}$ may be determined based at least in part on a noise covariance matrix $cov(Z_1)$.

The first UE 605 selects eigen vectors at 620. The eigen vectors may be a subset of the non-zero eigen directions of the whitening coefficient. In some examples, the first UE 605 may select the M largest right eigen directions of the whitening coefficient. In some examples, the first UE 605 may select the non-negligible non-zero eigen vectors.

The first UE 605 may precode a reference signal at 625. The reference signal may be, for example, a sounding reference signal (SRS). The first UE 605 may precode the reference signal based at least in part on the selected eigen vectors. In some examples, the precoder may be chosen from the right singular direction of the whitening coefficient. For example, the first UE 605 may precode the reference signal by a precoder P as described by Eqn. (4).

The first UE 605 may transmit the precoded reference signal 630 to the second base station 610. The precoded reference signal 630 may be received by the second base station 610 as $G_{eff}$ as described by Eqn. (6).

The second base station 610 may determine a transmit precoder $W_2$ based at least in part on the precoded reference signal 630. The transmit precoder $W_2$ may be selected such that $G_{eff}W_2$ sees energy below an energy detection threshold ED.

The second base station 610 may perform a LBT procedure at 640. The LBT procedure may include measuring the energy on the eigen direction of $G_{eff}$. The second base station 610 may compare the energy level with an energy detection threshold ED. The second base station 610 may refrain from transmitting while the measured energy level is larger than the energy detection threshold ED. The second base station 610 may determine that the communications medium is available for transmission when the measured energy level is lower than the energy detection threshold ED.

The second base station 610 may transmit a data transmission 645. The data transmission 645 may be precoded by the transmit precoder $W_2$. Due to the transmit precoder $W_2$, the data transmission 645 may not cause significant interference at the first UE 605. However, the data transmission 645 may be received by a second UE served by the second base station 610.

Figure 7:
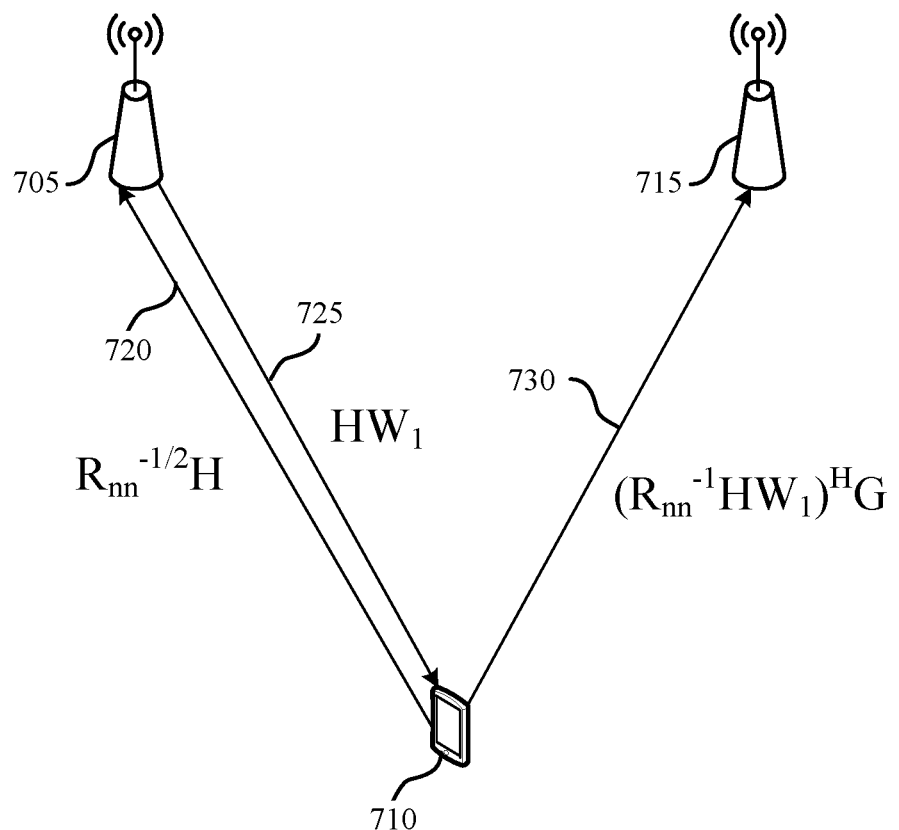
FIG. 7 illustrates an example of a wireless communications system that supports spatial listen before talk in accordance with aspects of the present disclosure.

FIG. 7 illustrates an example of a wireless communications system 700 that supports spatial listen before talk in accordance with various aspects of the present disclosure. In some examples, wireless communications system 700 may implement aspects of wireless communications system 100.

The wireless communications system 700 may include a first base station 705 and a first UE 710. The first base station 705 and the first UE 710 may be a part of a first BSS. The first base station 705 may be a serving base station for the first UE 710. The wireless communications system 700 may also include a second base station 715. The second base station 715 may be a part of a second BSS. The first base station 705 and the second base station 715 may be examples of aspects of base station 105 as described with reference to FIG. 1. The first UE 710 may be an example of aspects of UE 115 as described with reference to FIG. 1.

The first base station 705 may communicate with the first UE 710 over a direct channel H. The second base station 715 may communicate with the first UE 710 over a cross-channel G. The second base station 715 may avoid significantly interfering with transmissions at the first UE 710 by designing a transmit precoder W2 based at least in part on the whitened direct channel H and the whitened cross-channel G.

The signal received at the first UE 710 may be represented as $Y_1$ as set forth in Eqn. (1). The first UE 710 may whiten the received signal as $Y_{1w}$ as set forth in Eqn. (2). The second base station 715 may design the transmit precoder W2 such that the effective direct channel $(H_{eff})$, $R_{nn}^{-1/2}HW_1$, is orthogonal to the effective cross-channel $(G_{eff})$, $R_{nn}^{1/2}GW_2$. Mathematically, this may be expressed as:

$$\text{span}\{R_{nn}^{-1/2}HW_1\} \perp \text{span}\{R_{nn}^{-1/2}GW_2\} \qquad (7)$$

which may be written as:

$$W_2^H G^H R_{nn}^{-1} HW_1 = 0 \qquad (8)$$

Thus, the transmit precoder W2 may be selected such that:

$$W_2 \in \text{Null}\{G^H R_{nn}^{-1} HW_1\} \qquad (9)$$

For example, the first UE 710 may have no knowledge of the unprecoded downlink channel H. The first UE 710 may transmit a precoded reference signal $R_{nn}^{-1/2}$ H 720. The reference signal may be a SRS. This transmission may provide knowledge of the whitening coefficient $R_{nn}^{-1/2}$ to the first base station 705. In response, the first base station 705 may transmit a reference signal precoded by a transmit precoder $HW_1$ 725. In some examples, the first base station 705 may design the transmit precoder $W_1$ based at least in part on the whitening coefficient $R_{nn}^{-1/2}$. In some examples, the reference signal may be a demodulation reference signal (DMRS).

The first UE 710 may measure the precoded downlink channel based at least in part on the reference signal 725. The first UE 710 may transmit a precoded reference signal 730. The reference signal may be, for example, a SRS or a reservation response signal (RRS). The reference signal may be precoded by $(R_{nn}^{-1} HW_1)^H$. In some examples, the precoded reference signal may be power controlled.

In order to minimize interference from the second base station 715 at the first UE 710, the second base station 715 may make use of the orthogonal spatial dimension of $((R_{nn}^{-1} HW_1)^H)G$. The second base station 715 may measure the energy on the eigen direction of $((R_{nn}^{-1} HW_1)^H)G$ and compare it with the energy detection threshold ED. Thus, the whitened cross-channel may utilize the null space of the whitened precoded direct channel.

In some examples, the first UE 710 may use a maximal ratio combining as a receiver filter for the whitened channel. In some other examples, the first UE 710 may select another receiver filtering. For example, the first UE 710 may select minimum mean square error (MMSE) filtering. In such examples, the first UE 710 may precode the reference signal based at least in part on the selected filtering. For example, the first UE 710 may precode the reference signal by $((HW_1)^H(HW_1)+I)^{-1}(R_{nn}^{-1} HW_1)^H$. In some other examples, the receive filter may be a per stream recursive de-mapper (PSRD) filter or a MMSE with successive interference cancellation (MMSE-SIC) filter.

Figure 8:
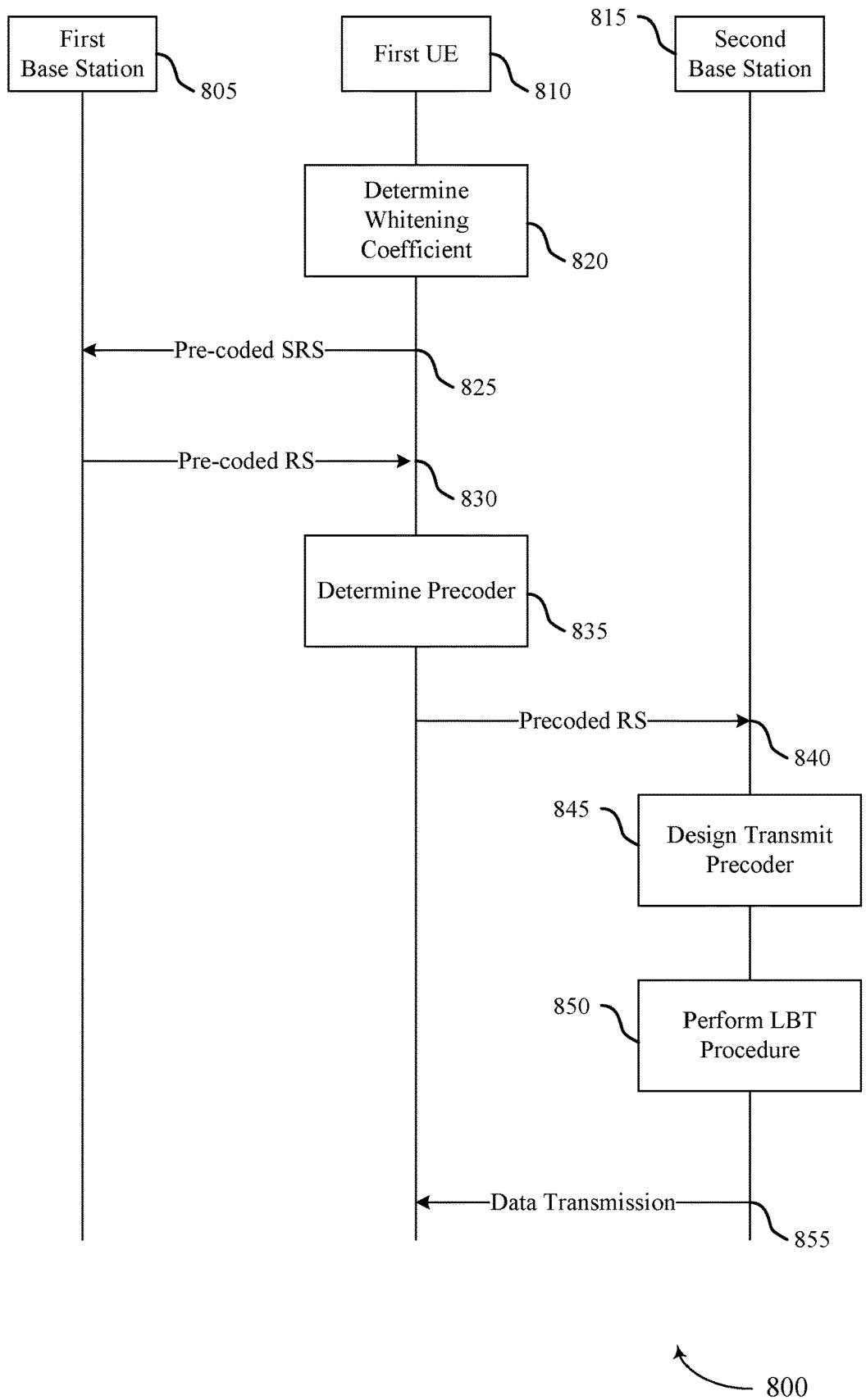
FIG. 8 illustrates an example of a flow diagram for communications in a wireless communication network that supports spatial listen before talk in accordance with aspects of the present disclosure.

FIG. 8 illustrates an example of a flow diagram 800 for communications in a wireless communications system that supports spatial listen before talk in accordance with various aspects of the present disclosure. In some examples, the wireless communications system may implement aspects of wireless communications system 100.

The flow diagram 800 shows communications among a first base station 805, a first UE 810, and a second base station 815. The first base station 805 and second base station 815 may be an example of aspects of base station 105 described with reference to FIG. 1. The first UE 810 may be an example of aspects of UE 115 described with reference to FIG. 1. The first base station 805 and the first UE 810 may be a part of a first BSS. The second base station 815 may be a part of a second BSS including a second UE that may be served by the second base station 815.

The first UE 810 may determine a whitening coefficient at 820. The whitening coefficient $R_{nn}^{-1/2}$ may be determined based at least in part on a noise covariance matrix cov($Z_1$).

The first UE 810 may transmit a precoded reference signal such as precoded SRS 825. The reference signal may be precoded based at least in part on the whitening coefficient. For example, the reference signal may be precoded by the whitening coefficient such that the first base station 805 sees $R_{nn}^{-1/2}$ H, where H is the direct channel between the first base station 805 and the first UE 810.

The first base station 805 may transmit a precoded reference signal 830 in response to precoded SRS 825. The reference signal may be, for example, a DMRS. The precoded reference signal 830 may be precoded by a transmit precoder $W_1$ such that the first UE 810 sees $HW_1$. The first base station 805 may design the transmit precoder $W_1$ based at least in part on the whitening coefficient $R_{nn}^{-1/2}$.

The first UE 810 may determine a precoder at 835. In some examples, the first UE 810 may determine the precoder based at least in part on the direct channel H. For example, the first UE 810 may determine the precoder as $(R_{nn}^{-1} HW_1)^H$. In some examples, the first UE 810 may determine the precoder based at least in part on a receive filter. For example, when the receive filter is MMSE, the first UE 810 may determine the precoder as $((HW_1)^H(HW_1)+I)^{-1}(R_{nn}^{-1} HW_1)^H$.

The first UE 810 may transmit a precoded reference signal 840. The precoded reference signal 840 may be precoded by $(R_{nn}^{-1} HW_1)^H$. The second base station 815 may see the precoded reference signal 840 as $((R_{nn}^{-1} HW_1)^H)G$.

The first base station 805 may design a transmit precoder at 845. The transmit precoder $W_2$ may be designed such that the effective direct channel $H_{eff}$ is orthogonal to the effective cross-channel $G_{eff}$, as described with reference to Eqns. (7) through (9).

The second base station 815 may perform a LBT procedure at 850. The LBT procedure may include measuring the energy on the eigen direction of $(R_{nn}^{-1} HW_1)^H$. The second base station 815 may compare the energy level with an energy detection threshold ED. The second base station 815 may refrain from transmitting while the measured energy level is larger than the energy detection threshold ED. The second base station 815 may determine that the communications medium is available for transmission when the measured energy level is lower than the energy detection threshold ED.

The second base station 815 may transmit a data transmission 855. The data transmission 855 may be precoded by the transmit precoder $W_2$. Due to the transmit precoder $W_2$, the data transmission 855 may not cause significant interference at the first UE 810. However, the data transmission 855 may be received by a second UE served by the second base station 815.

Figure 9:
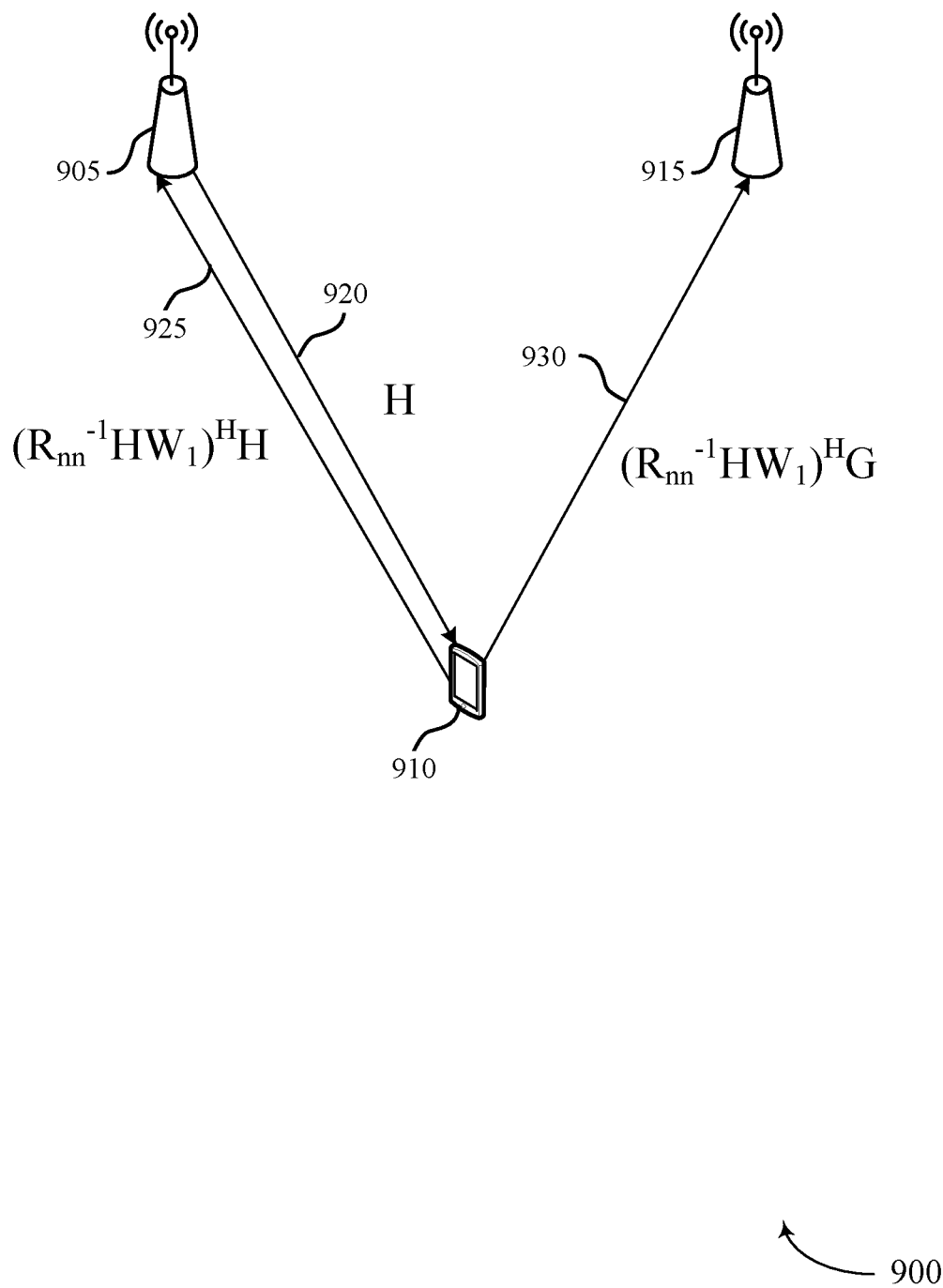
FIG. 9 illustrates an example of a wireless communications system that supports spatial listen before talk in accordance with aspects of the present disclosure.

FIG. 9 illustrates an example of a wireless communications system 900 that supports spatial listen before talk in accordance with various aspects of the present disclosure. In some examples, wireless communications system 900 may implement aspects of wireless communications system 100.

The wireless communications system 900 may include a first base station 905 and a first UE 910. The first base station 905 and the first UE 910 may be a part of a first BSS. The first base station 905 may be a serving base station for the first UE 910. The wireless communications system 900 may also include a second base station 915. The second base station 915 may be a part of a second BSS. The first base station 905 and the second base station 915 may be examples of aspects of base station 105 as described with reference to FIG. 1. The first UE 910 may be an example of aspects of UE 115 as described with reference to FIG. 1.

The first base station 905 may communicate with the first UE 910 over a direct channel H. The second base station 915 may communicate with the first UE 910 over a cross-channel G. The second base station 915 may avoid significantly interfering with transmissions at the first UE 910 by designing a transmit precoder $W_2$ based at least in part on the whitened direct channel H and the whitened cross-channel G.

In some examples, the first UE 910 may have pre-existing knowledge of the unprecoded downlink channel H. For example, the first base station 905 may have indicated the unprecoded downlink channel in a previous reference signal 920. The reference signal 920 may be, for example, a channel state information reference signal (CSI-RS). The first UE 910 may determine a precoder based at least in part on the unprecoded downlink channel. For example, the first UE 910 may determine the first base station 905's transmit precoder $W_1$ based at least in part on the unprecoded downlink channel. The first UE 910 may determine the precoder P as:

$$P = (R_{nn}^{-1}HW_1)^H \quad (10)$$

The first UE 910 may transmit a reference signal (e.g., a SRS transmission) based at least in part on the precoder. The first base station 905 may see the reference signal 925 as $(R_{nn}^{-1} HW_1)^H$ H. The second base station 915 may see the reference signal 930 as $(R_{nn}^{-1} HW_1)^H$ G.

In order to minimize interference from the second base station 915 at the first UE 910, the second base station 915 may perform energy detection on the orthogonal space of $(R_{nn}^{-1} HW_1)^H$ G. The second base station 915 may measure the energy on the eigen direction of $(R_{nn}^{-1} HW_1)^H$ G and compare it with the energy detection threshold ED.

Figure 10:
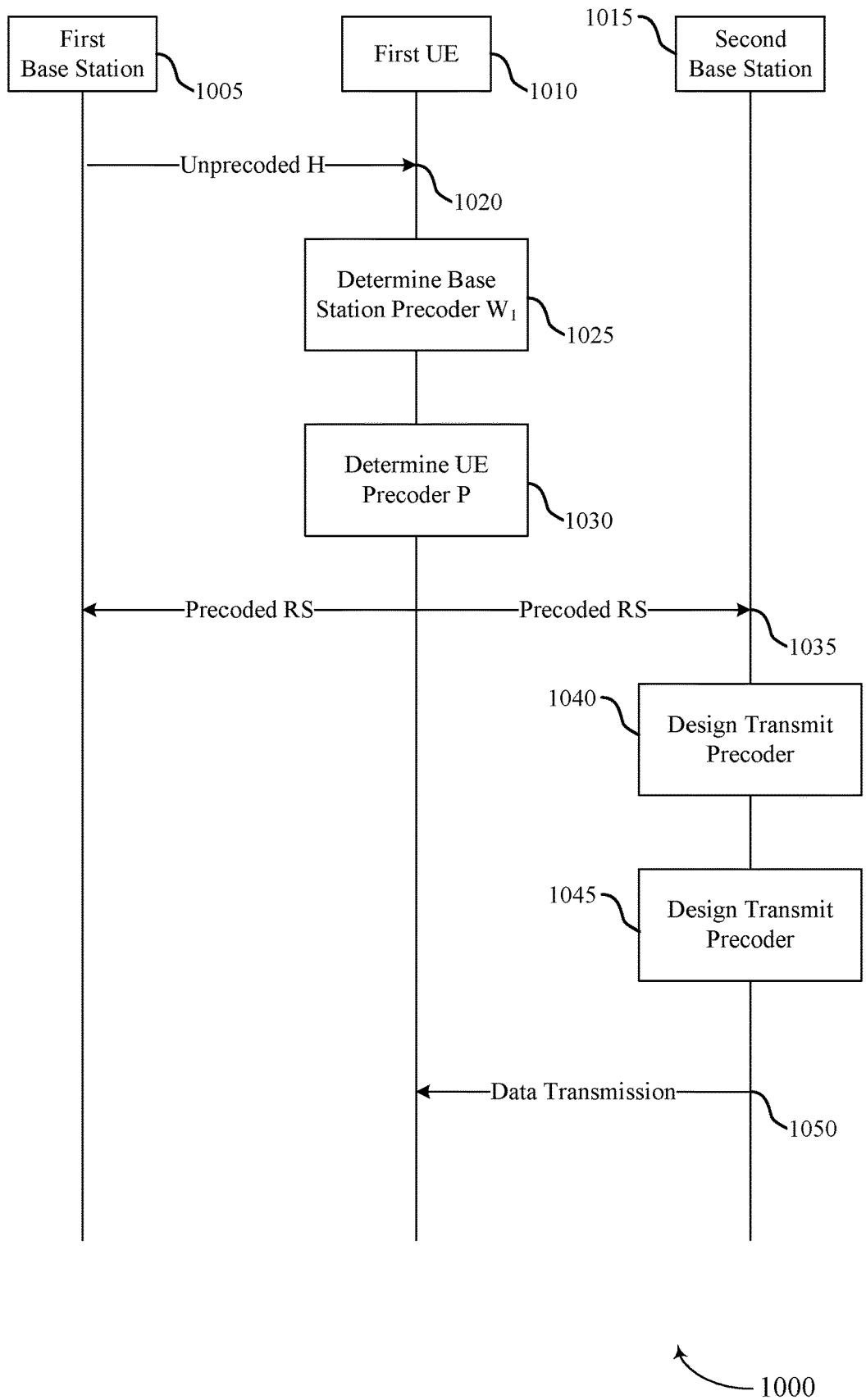
FIG. 10 illustrates an example of a flow diagram for communications in a wireless communication network that supports spatial listen before talk in accordance with aspects of the present disclosure.

FIG. 10 illustrates an example of a flow diagram 1000 for communications in a wireless communications system that supports spatial listen before talk in accordance with various aspects of the present disclosure. In some examples, the wireless communications system may implement aspects of wireless communications system 100.

The flow diagram 1000 shows communications among a first base station 1005, a first UE 1010, and a second base station 1015. The first base station 1005 and second base station 1015 may be an example of aspects of base station 105 described with reference to FIG. 1. The first UE 1010 may be an example of aspects of UE 115 described with reference to FIG. 1. The first base station 1005 and the first UE 1010 may be a part of a first BSS. The second base station 1015 may be a part of a second BSS including a second UE that may be served by the second base station 1015.

The first UE 1010 may have pre-existing knowledge of the unprecoded direct channel H. For the example, the first UE 1010 may have received an indication of the unprecoded direct channel H 1020 in a previous reference signal (e.g., a CSI-RS).

The first UE 1010 may determine a base station precoder $W_1$ at 1025. The first UE 1010 may determine the base station precoder $W_1$ based at least in part on the unprecoded direct channel H and the observed noise.

The first UE 1010 may determine a UE precoder at 1030. In some examples, the first UE 1010 may determine the precoder based at least in part on the base station precoder $W_1$. For example, the first UE 1010 may determine the precoder as given in Eqn. (10).

The first UE 1010 may transmit a precoded reference signal 1035. The precoded reference signal 1035 may be precoded by the precoder given in Eqn. (10). The precoded reference signal 1035 may be seen by the first base station 1005 as $(R_{nn}^{-1} HW_1)^H H$. The first base station 1005 may use this signal to derive the base station precoder $W_1$. The precoded reference signal 1035 may be seen by the second base station 1015 as $(R_{nn}^{-1} HW_1)^H G$.

The first base station 1005 may design a transmit precoder at 1040. The transmit precoder $W_2$ may be designed such that the effective direct channel $H_{eff}$ is orthogonal to the effective cross-channel $G_{eff}$, as described with reference to Eqns. (7) through (9).

The second base station 1015 may perform a LBT procedure at 1045. The LBT procedure may include measuring the energy on the eigen direction of $(R_{nn}^{-1} HW_1)^H$. The second base station 1015 may compare the energy level with an energy detection threshold ED. The second base station 1015 may refrain from transmitting while the measured energy level is larger than the energy detection threshold ED. The second base station 1015 may determine that the communications medium is available for transmission when the measured energy level is lower than the energy detection threshold ED.

The second base station 1015 may transmit a data transmission 1050. The data transmission 1050 may be precoded by the transmit precoder $W_2$. Due to the transmit precoder $W_2$, the data transmission 1050 may not cause significant interference at the first UE 1010. However, the data transmission 1050 may be received by a second UE served by the second base station 1015.

Figure 11:
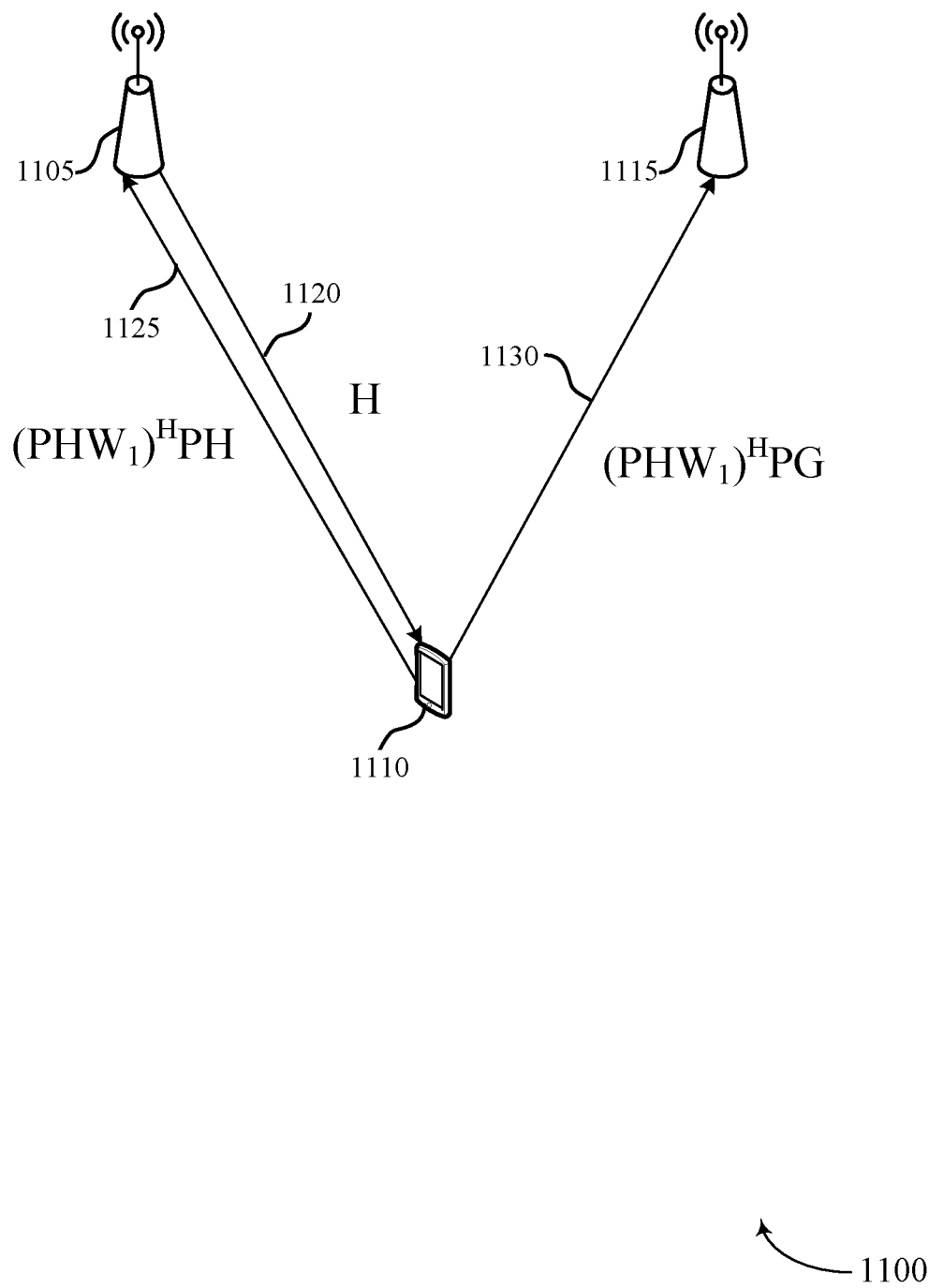
FIG. 11 illustrates an example of a wireless communications system that supports spatial listen before talk in accordance with aspects of the present disclosure.

FIG. 11 illustrates an example of a wireless communications system 1100 that supports spatial listen before talk in accordance with various aspects of the present disclosure. In some examples, the wireless communications system may implement aspects of wireless communications system 100.

The wireless communications system 1100 may include a first base station 1105 and a first UE 1110. The first base station 1105 and the first UE 1110 may be a part of a first BSS. The first base station 1105 may be a serving base station for the first UE 1110. The wireless communications system 1100 may also include a second base station 1115. The second base station 1115 may be a part of a second BSS. The first base station 1105 and the second base station 1115 may be examples of aspects of base station 105 as described with reference to FIG. 1. The first UE 1110 may be an example of aspects of UE 115 as described with reference to FIG. 1.

The first base station 1105 may communicate with the first UE 1110 over a direct channel H. The second base station 1115 may communicate with the first UE 1110 over a cross-channel G. The second base station 1115 may avoid significantly interfering with transmissions at the first UE 1110 by designing a transmit precoder $W_2$ based at least in part on the whitened direct channel H and the whitened cross-channel G.

In some examples, the first UE 1110 may have pre-existing knowledge of the unprecoded downlink channel H. For example, the first base station 1105 may have indicated the unprecoded downlink channel in a previous reference signal 1120. The reference signal 920 may be, for example, a channel state information reference signal (CSI-RS).

The first UE 1110 may select a precoder based at least in part on the unprecoded downlink channel H and the noise covariance R. The whitening coefficient $R_{nn}^{-1/2}$ may be a m×m matrix, and the unprecoded downlink channel H may be a m×n matrix. The rank of $R_{nn}^{-1/2} H$ may be given as r, where r is less than or equal to min(m, n). When $R_{nn}^{-1/2}$ is defined as $U\Lambda V^H$, and H is defined as $\Phi\Sigma\Gamma^H$, where U is the matrix of left singular vectors of $R_{nn}^{-1/2}$, $\Lambda$ is the diagonal matrix of singular values of $R_{nn}^{-1/2}$, V is the matrix of right singular vectors of $R_{nn}^{-1/2}$, $\Phi$ is the matrix of left singular vectors of H, $\Sigma$ is the diagonal matrix of singular values of H, and $\Gamma$ is the matrix of right singular vectors of H, the whitened channel $R_{nn}^{-1/2} H$ may be given as:

$$R_{nn}^{-1/2} H = U\Lambda V^H \Phi \Sigma \Gamma^H = U_x \Lambda_x V_x^H \quad (11)$$

Let $\Gamma V^H \Phi \Sigma$ be defined as $ABD^H$, where A and B are sub-unitary and D is diagonal. Then $U_x$ (which is m×r) can be rewritten as UA, $V_x^H$ (which is r×n) can be rewritten as $B^H \Gamma^H$, and $\Lambda_x$ (which is r×r) can be rewritten as D. The first UE 1110 may determine a precoder P of size r×m such that:

$$PH = \Lambda_x V_x^H \quad (12)$$

In some examples, the first UE 1110 may select a subset $r_p$ of the non-zero eigen direction of the precoder P. For example, the first UE 1110 may select the $r_p$ largest eigen directions.

The first UE 1110 may therefore select a precoder P as:

$$P = \Lambda_x B^H \sum{}^{-1} \Phi^H \quad (13)$$

The first UE 1110 may precode a reference signal based at least in part on the precoder P. For example, the first UE 1110 may precode the reference signal by $(PHW_1)^H P$. The first base station 1105 may determine the base station transmit precoder W1 based at least in part on $(PHW_1)^H PH$.

The second base station 1115 may determine the transmit precoder W2 based at least in part on $(PHW_1)^H PG$.

In order to minimize interference from the second base station 1115 at the first UE 1110, the second base station 1115 may perform energy detection on the orthogonal space of $(PHW_1)^H PG$. The second base station 1115 may measure the energy on the eigen direction of $(PHW_1)^H PG$ and compare it with the energy detection threshold ED.

For example, the direct channel H may be a 1×2 link at high C/N. The first base station 1105 may schedule a rank 1 high MCS transmission to the first UE 1110. The cross-channel G may be a 2×2 link. The second base station may obtain the null space with respect to $H^H G$ and perform energy detection. For example, the first UE 1110 may transmit a precoded reference signal $$\left(\left(\frac{1}{\sigma^2}H\right)^H G\right),$$

where $\sigma_2$ is the thermal noise variance in this example. The second base station 1115 may transmit on the null space of $$\left(\left(\frac{1}{\sigma^2}H\right)^H G\right)$$

without causing interference to the first UE 1110.

Figure 12:
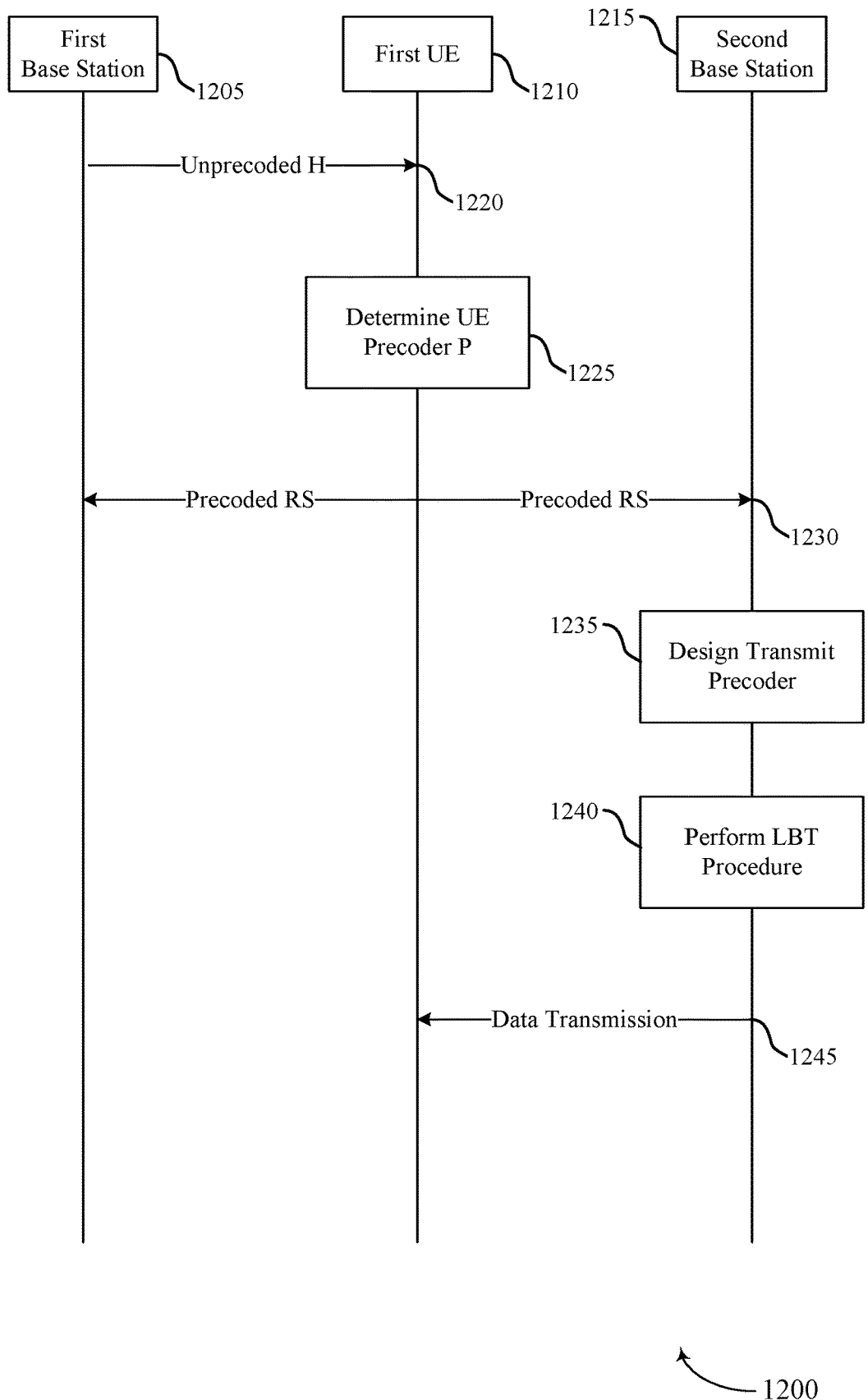
FIG. 12 illustrates an example of a flow diagram for communications in a wireless communication network that supports spatial listen before talk in accordance with aspects of the present disclosure.

FIG. 12 illustrates an example of a flow diagram 1200 for communications in a wireless communications system that supports spatial listen before talk in accordance with various aspects of the present disclosure. In some examples, the wireless communications system may implement aspects of wireless communications system 100.

The flow diagram 1200 shows communications among a first base station 1205, a first UE 1210, and a second base station 1215. The first base station 1205 and second base station 1215 may be an example of aspects of base station 105 described with reference to FIG. 1. The first UE 1210 may be an example of aspects of UE 115 described with reference to FIG. 1. The first base station 1205 and the first UE 1210 may be a part of a first BSS. The second base station 1215 may be a part of a second BSS including a second UE that may be served by the second base station 1215.

The first UE 1210 may have pre-existing knowledge of the unprecoded direct channel H. For the example, the first UE 1210 may have received an indication of the unprecoded direct channel H 1220 in a previous reference signal (e.g., a CSI-RS).

The first UE 1010 may determine a UE precoder at 1225. In some examples, the first UE 1210 may determine the precoder based at least in part on the unprecoded direct channel H 1220. For example, the first UE 1210 may determine the precoder as $(PHW_1)^H P$, where P is given in Eqn. (13).

The first UE 1210 may transmit a precoded reference signal 1230. The precoded reference signal 1230 may be precoded by the precoder given by $(PHW_1)^H P$. The precoded reference signal 1230 may be seen by the first base station 1205 as $(PHW_1)^H PH$. The first base station 1205 may use this signal to derive a base station precoder $W_1$. The precoded reference signal 1230 may be seen by the second base station 1215 as $(PHW_1)^H PG$.

The first base station 1205 may design a transmit precoder at 1235. The transmit precoder $W_2$ may be designed such that the effective direct channel $H_{eff}$ is orthogonal to the effective cross-channel $G_{eff}$, as described with reference to Eqns. (7) through (9).

The second base station 1215 may perform a LBT procedure at 1240. The LBT procedure may include measuring the energy on the eigen direction of $(PHW_1)^H P$. The second base station 1215 may compare the energy level with an energy detection threshold ED. The second base station 1215 may refrain from transmitting while the measured energy level is larger than the energy detection threshold ED. The second base station 1215 may determine that the communications medium is available for transmission when the measured energy level is lower than the energy detection threshold ED.

The second base station 1215 may transmit a data transmission 1245. The data transmission 1245 may be precoded by the transmit precoder $W_2$. Due to the transmit precoder $W_2$, the data transmission 1245 may not cause significant interference at the first UE 1210. However, the data transmission 1245 may be received by a second UE served by the second base station 1215.

Figure 13:
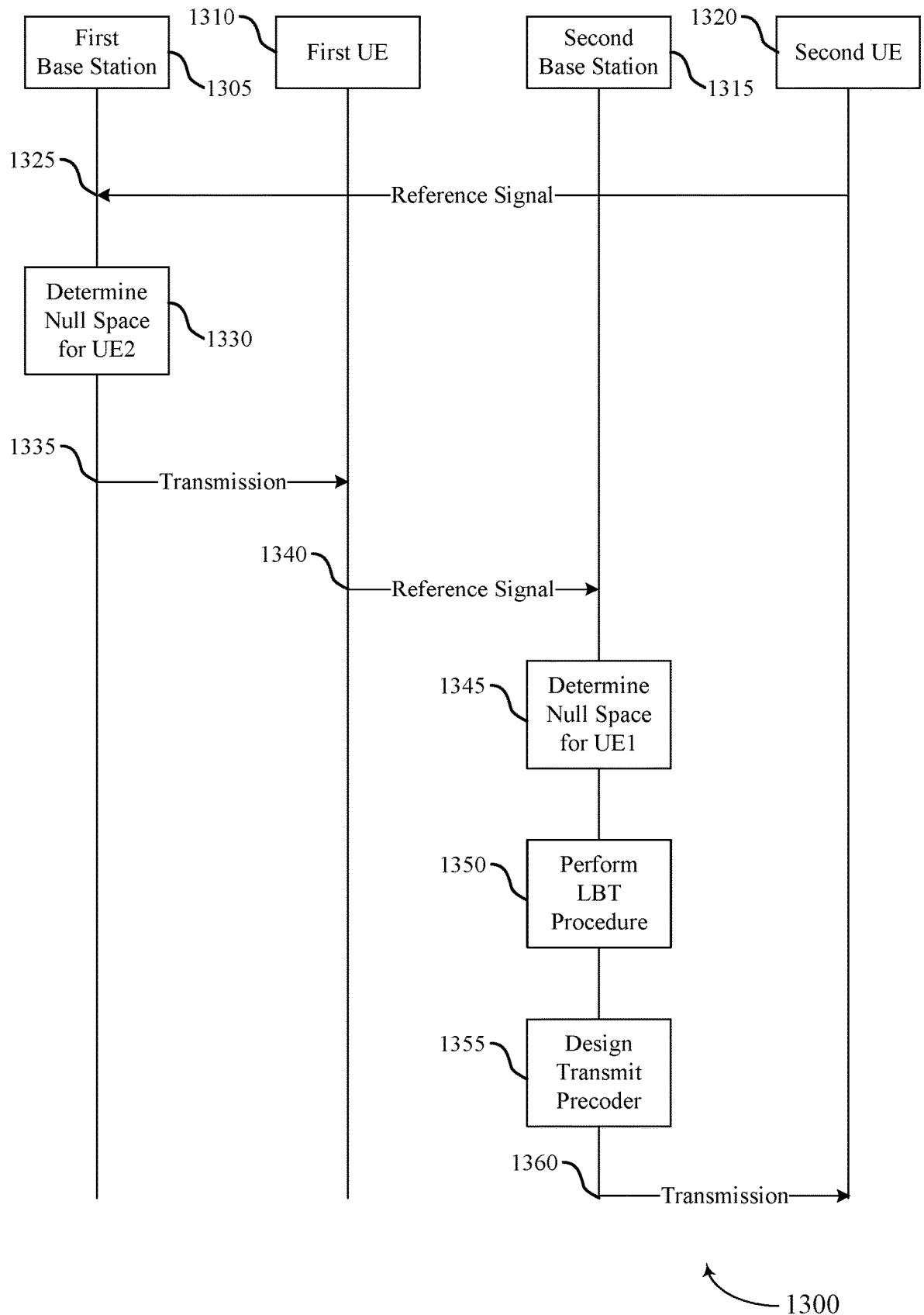
FIG. 13 illustrates an example of a flow diagram for communications in a wireless communication network that supports spatial listen before talk in accordance with aspects of the present disclosure.

FIG. 13 illustrates an example of a flow diagram 1300 for communications in a wireless communications system that supports spatial listen before talk in accordance with various aspects of the present disclosure. In some examples, the wireless communications system may implement aspects of wireless communications system 100.

The flow diagram 1300 shows communications among a first base station 1305, a first UE 1310, a second base station 1315, and a second UE 1320. The first UE 1310 and second UE 1320 may be examples of aspects of UE 115 described with reference to FIG. 1. The first base station 1305 and the second base station 1315 may be examples of aspects of base station 105 described with reference to FIG. 1. The first base station 1305 and the first UE 1310 may be a part of a first BSS. The second base station 1315 and the second UE 1320 may be a part of a second BSS.

The second UE 1320 may transmit a reference signal 1325. The reference signal 1325 may be, for example, a SRS.

The first base station 1305 may determine a null space for the second UE 1320 at 1330. The first base station 1305 may determine the null space for the second UE 1320 based at least in part on the reference signal 1325. In some examples, the first base station 1305 may determine the null space with respect to the cross-channel $G_2$ between the first base station 1305 and the second UE 1320 as described, for example, with reference to FIG. 3. In some examples, the first base station 1035 may determine the null space with respect the whitened cross-channel $R_{nn}^{-1/2} G_2$ between the first base station 1035 and the second UE 1320 as described, for example, with reference to FIGS. 4 through 6. In some examples, the first base station 1305 may determine the null space with respect to the whitened cross-channel between the first base station 1305 and the second UE 1320, and the whitened direct channel (denoted $H_2$) between the second UE 1320 and the second base station 1315 $((R_{nn}^{-1/2} H_2 W_2)^H G_2)$, as described, for example, with reference to FIGS. 7 through 12.

The first base station 1305 may send one or more transmissions 1335 to the first UE 1310. The one or more transmissions 1335 may be, for example, control messages or data messages. The first base station 1305 may send the one or more transmissions 1335 in the null space for the second UE 1320, such that the one or more transmissions 1335 do not significantly interfere with reception at the second UE 1320. In some other examples, e.g., when the first base station 1305 is unable to identify a null space at 1330, the first base station 1305 may send the one or more transmissions 1335 without regard for the interference at the second UE 1320.

The first UE 1310 may transmit a reference signal 1340 to the second base station 1315. The reference signal 1340 may be, for example, the reference signal transmitted along the cross-channel G as described with reference to FIG. 3, the reference signal transmitted along the whitened cross-channel as described with reference to FIG. 4, the precoded reference signal 630 as described with reference to FIG. 6, the precoded reference signal 840 described with reference to FIG. 8, the precoded reference signal 1035 described with reference to FIG. 10, or the precoded reference signal 1230 as described with reference to FIG. 12. In some examples, the reference signal 1340 may be preceded by a signal exchange between the first base station 1305 and the first UE 1310 as described, for example, with reference to FIGS. 8, 10, and 12. The reference signal 1340 may be precoded by a UE precoder P.

The second base station 1315 may determine the null space for the first UE 1310 at 1345 based at least in part on the reference signal 1340 as described, for example, with reference to FIGS. 3 through 12. The second base station 1315 may perform a LBT procedure at 1350 as described, for example, with reference to FIGS. 3 through 12. The second base station 1315 may design a transmit precoder at 1355 as described, for example, with reference to FIGS. 3 through 12. The second base station 1315 may transmit one or more data transmissions 1360 to the second UE 1320. The one or more data transmissions may be precoded by the transmit precoder. Because the data transmissions 1360 may be transmitted in the null space of the first UE 1310, the data transmissions 1360 may be received at the second UE 1320 without causing significant interference with reception at the first UE 1310.

Figure 14:
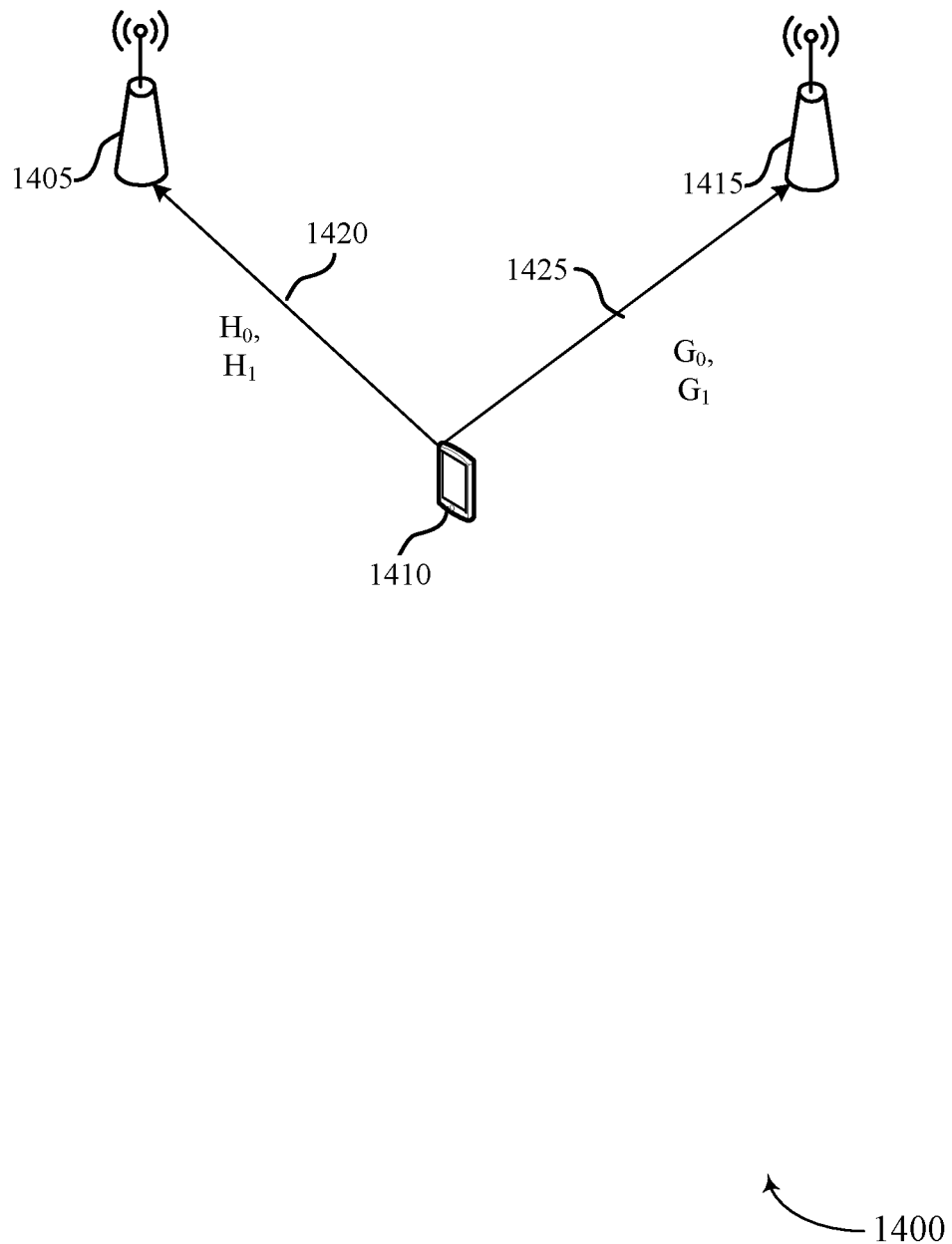
FIG. 14 illustrates an example of a wireless communications system that supports spatial listen before talk in accordance with aspects of the present disclosure.

FIG. 14 illustrates an example of a wireless communications system 1400 that supports spatial listen before talk in accordance with various aspects of the present disclosure. In some examples, wireless communications system 1400 may implement aspects of wireless communications system 100.

The wireless communications system 1400 may include a first base station 1405 and a first UE 1410. The first base station 1405 and the first UE 1410 may be a part of a first BSS. The first base station 1405 may be a serving base station for the first UE 1410. The wireless communications system 1400 may also include a second base station 1415. The second base station 1415 may be a part of a second BSS. The first base station 1405 and the second base station 1415 may be examples of aspects of base station 105 as described with reference to FIG. 1. The first UE 1410 may be an example of aspects of UE 115 as described with reference to FIG. 1.

The first base station 1405 may communicate with the first UE 1410 over a direct channel H that includes a first channel $H_0$ and a second channel $H_1$. The second base station 1415 may communicate with the first UE 1410 over a cross-channel G including a first channel $G_0$ and a second channel $G_1$.

In some examples, the first UE 1410 may have fewer transmit chains than receive chains, e.g., in order to reduce radio frequency implementation costs. Transmission antenna switching may be used. In some cases, the transmission antenna may maintain the phase continuity after the switch.

The transmission antennas at the first UE 1410 may include a first group of antennas (Group 0) and a second group of antennas (Group 1). The first group of antennas and the second group of antennas may not be able to transmit at the same time. The first UE 1410 may determine a precoder P. The precoder P may be denoted as:

$$P = [AB; CD] \quad (14)$$

and the channel may be denoted as:

$$G_{DL} = [G_{00} G_{01}; G_{10} G_{11}] \quad (15)$$

where $G_{ij}$ denotes the channel between a transmit antenna group i at the first UE 1410 and a receive antenna group j at the second base station 1415.

The whitened reference signal be denoted as:

$$PG_{DL} = [AG_{00} + BG_{10}AG_{01} + BG_{11}; CG_{00} + DG_{10}CG_{01} + DG_{11}] \quad (16)$$

However, $G_{00}$ and $G_{10}$, and $G_{01}$ and $G_{11}$, cannot be sounded at the same time. The whitened reference signal can be rewritten as:

$$PG_{DL} = [AG_{00}AG_{01}; CG_{00}CG_{01}] + [BG_{10}BG_{11}; DG_{10}DG_{11}] \quad (17)$$

The first UE 1410 may compute a precoder based at least in part on the noise covariance matrix and/or the downlink channel H between the first base station 1405 and the first UE 1410, as described with reference to FIGS. 7 through 12. For example, the precoder may be $R_{nn}^{-1/2}$ or $(R_{nn}^{-1} H W_1)^H$.

The first UE 1410 may transmit the reference signal from the first antenna group using precoder A and C from Eqn. (14). The precoder A and C may be applied on different tones and/or different symbols. In some examples, the first UE 1410 may use A for precoding on even tones of $G_0$, and may use C for precoding on odd tones of $G_0$. In some examples, the first UE 1410 may use A for precoding on a first symbol on $G_0$, and may use C for precoding on a second symbol on $G_0$. The second symbol may be adjacent to the first symbol. The second base station 1415 may receive $AG_{00}$, $AG_{01}$, $CG_{00}$, and $CG_{01}$ on $G_0$. Similarly, the first UE 1410 may transmit the reference signal from the second antenna group using precoder B and D from Eqn. (14). The precoder B and D may be applied on different tones and/or different symbols.

The second base station 1415 may combine the signals received on G0 and G1 to obtain the whitened signal $PG_{DL}$ as described in Eqn. (17). The second base station 1415 may use the whitened signal $PG_{DL}$ to obtain signal-to-interference-and-noise ratio (SINR) and/or eigen directions. The second base station 1415 may use the whitened signal PGDL to design a transmit precoder and perform an LBT procedure as described, for example, with reference to FIGS. 8, 10, and 12.

Figure 15:
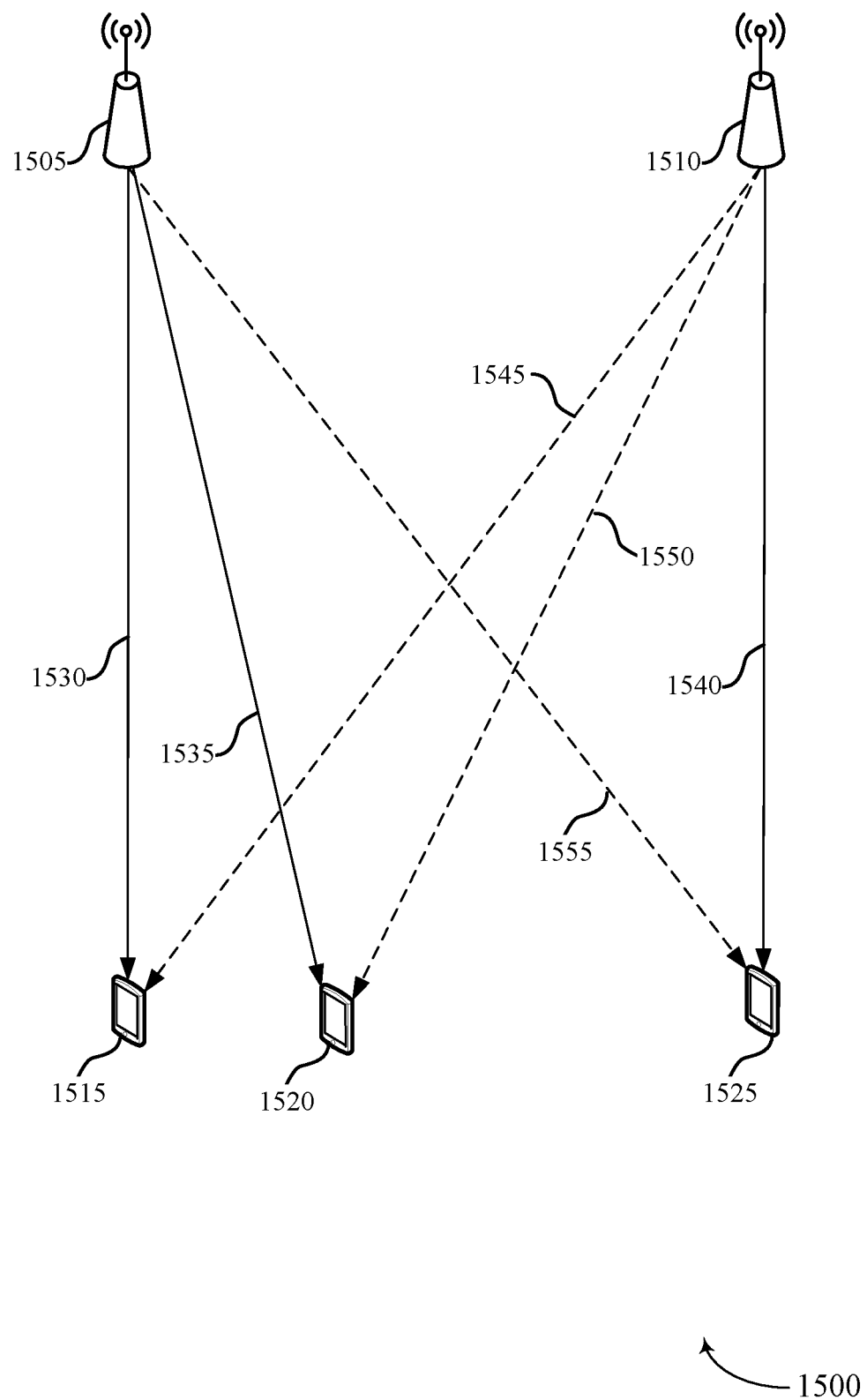
FIG. 15 illustrates an example of a wireless communications system that supports spatial listen before talk in accordance with aspects of the present disclosure.

FIG. 15 illustrates an example of a wireless communications system 1500 that supports spatial listen before talk in accordance with various aspects of the present disclosure. In some examples, wireless communications system 1500 may implement aspects of wireless communications system 100.

The wireless communications system 1500 may include a first base station 1505 and a second base station 1510. The first base station 1505 may be a part of a first BSS including first UE 1515 and second UE 1520. The second base station 1510 may be a part of a second BSS including third UE 1525. The first base station 1505 and second base station 1510 may be examples of aspects of base station 105 as described with reference to FIG. 1. The first UE 1515, the second UE 1520, and the third UE 1525 may be examples of aspects of UE 115 described with reference to FIG. 1.

The first base station 1505 may communicate with the first UE 1515 over a first direct channel $H_1$ 1530, and with the second UE 1520 over a second direct channel $H_2$ 1535. The second base station 1510 may communicate with the first UE 1515 over a first cross-channel $G_1$ 1545, and with the second UE 1520 over a second cross-channel $G_2$ 1550.

In some examples, the first base station 1505 may be transmitting to both the first UE 1515 and the second UE 1520. If the second base station 1510 wants to transmit to the third UE 1525, it must design a transmit precoder $W_2$ to minimize interference at both the first UE 1515 and the second UE 1520.

In some examples, the first base station 1505 may communicate with the first UE 1515 and the second UE 1520 using frequency division multiplexing (FDM). With frequency division multiplexing, the signal at the first UE 1515 $Y_1$ may be given as:

$$Y_1 = H_1 W_1 S_1 + G_1 W_3 S_3 + Z_1 \qquad (18)$$

and the signal at the second UE 1520 $Y_2$ may be given as:

$$Y_1 = H_2 W_2 S_1 + G_2 W_3 S_3 + Z_2 \qquad (19)$$

With FDM scheduling, the first UE 1515 and the second UE 1520 may be scheduled on a different set of tones. On a particular tone, the second base station 1510 may identify the null space with respect to (P1G1) or (P2G2), depending on the SRS observation with respect to that tone. As such, a different transmit precoder $W_1$ may be applied on different tones.

In some examples, the first base station 1505 may communicate with the first UE 1515 and the second UE 1520 using space division multiplexing (FDM). With space division multiplexing, the signal at the first UE 1515 $Y_1$ may be given as:

$$Y_1 = H_1 W_1 S_1 + H_1 W_2 S_2 + G_1 W_3 S_3 + Z_1 \qquad (20)$$

and the signal at the second UE 1520 $Y_2$ may be given as:

$$Y_2 = H_2 W_2 S_1 + H_2 W_1 S_1 + G_2 W_3 S_3 + Z_2 \qquad (21)$$

The first base station 1505 may apply SLR or SLR-QR precoding to minimize the interference between the first UE 1515 and the second UE 1520.

The second base station 1510 may identify a null space which minimizes the interference at both the first UE 1515 and the second UE 1520. The second base station 1510 may conceptualize a virtual UE with a cross-link [$G_1$; $G_2$]. The second base station 1510 may minimize the interference with respect to the virtual cross-link [$G_1$; $G_2$]. The second base station 1510 may utilize the null space of [$P_1 G_1$; $P_2 G_2$]. The second base station 1510 may estimate the virtual cross link based on an unprecoded SRS or a precoded SRS.

Figure 16:
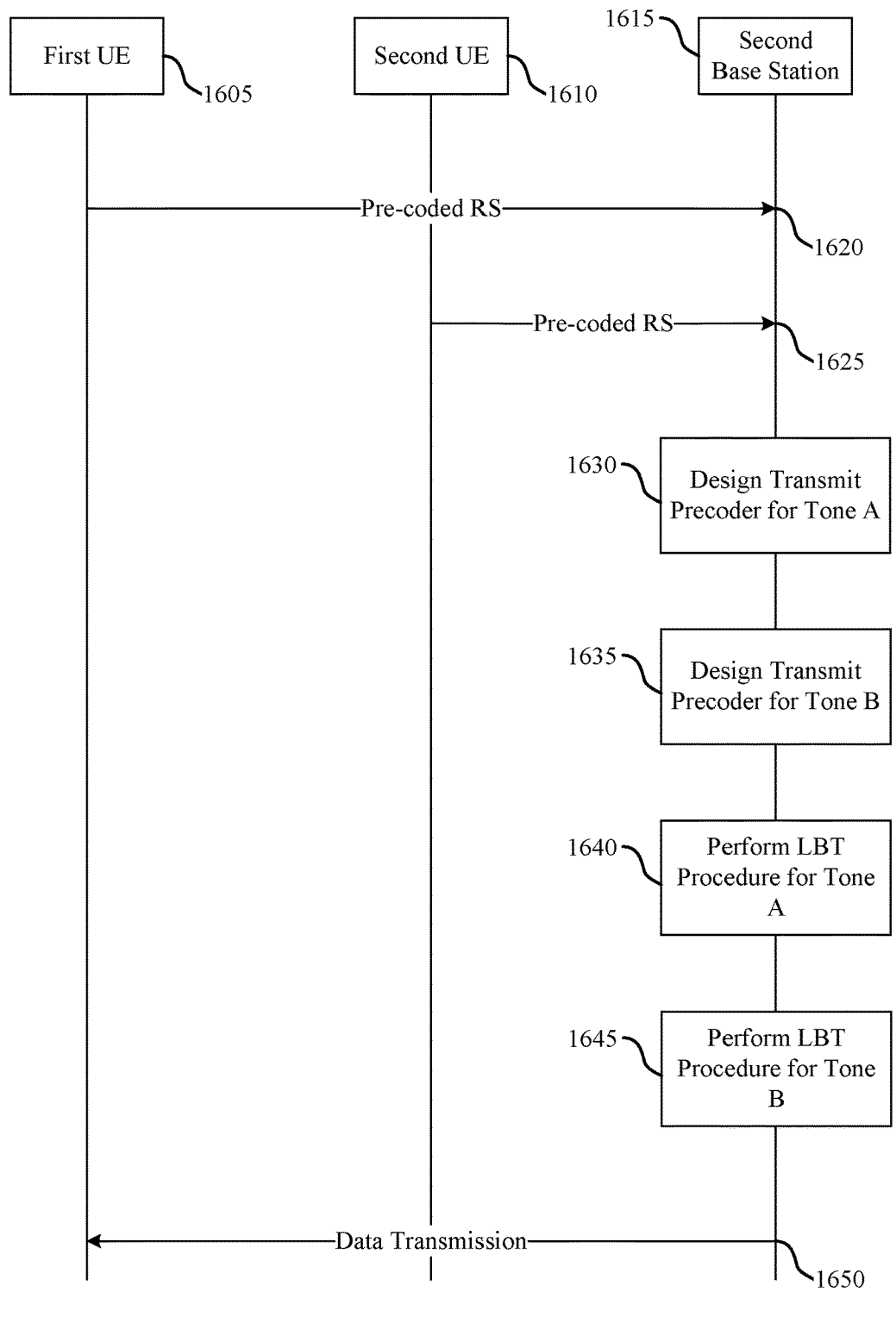
FIG. 16 illustrates an example of a flow diagram for communications in a wireless communication network that supports spatial listen before talk in accordance with aspects of the present disclosure.

FIG. 16 illustrates an example of a flow diagram 1600 for communications in a wireless communications system that supports spatial listen before talk in accordance with various aspects of the present disclosure. In some examples, the wireless communications system may implement aspects of wireless communications system 100.

The flow diagram 1600 shows communications among a first UE 1605, a second UE 1610, and a second base station 1615. The first UE 1605 and the second UE 1610 may be a part of a first BSS including a first base station that serves the first UE 1605 and the second UE 1610. The second base station 1615 may be part of a second BSS including a third UE that is served by the second base station 1615. The first UE 1605 and the second UE 1610 may be examples of aspects of UE 115 described with reference to FIG. 1. The second base station 1615 may be an example of aspects of base station 105 described with reference to FIG. 1.

The first UE 1605 may transmit a first reference signal such as first pre-coded reference signal 1620. The first reference signal may be transmitted on a first tone and on a first cross-channel $G_1$. The second UE 1610 may transmit a second reference signal such as second pre-coded reference signal 1625. The second reference signal may be transmitted on a second tone and on a second cross-channel $G_2$. The first pre-coded reference signal 1620 and the second pre-coded reference signal 1625 may be precoded by a UE transmit precoder. The transmit precoder may be, for example, a whitening matrix $R_{nn}^{-1/2}$, a precoder based on a subset of the eigen vectors in a whitening matrix, or $(R_{nn}^{-1} H_x W_1)^H$.

The second base station 1615 may design a first transmit precoder for a first tone (Tone A) based at least in part on the first pre-coded reference signal 1620 at 1630. The second base station 1615 may design a second transmit precoder for a second tone (Tone B) based at least in part on the second pre-coded reference signal 1625 at 1635.

The second base station 1615 may perform a LBT procedure for the first tone at 1640. The LBT procedure may include measuring the energy on the eigen direction of the effective channel. The effective channel may be, for example, the channel $G_1$, or a pre-coded channel such as $R_{nn}^{-1/2} G_1$, $(R_{nn}^{-1} H_x W_1)^H G_1$, or $(PHW_1)^H PG_1$, where P is given in Eqn. (13). The second base station 1615 may compare the measured energy level with an energy detection threshold ED. The second base station 1615 may refrain from transmitting on the first tone while the measured energy level is larger than the energy detection threshold ED. The second base station 1615 may determine that the first tone is available for transmission when the measured energy level is lower than the energy detection threshold ED.

The second base station 1615 may perform a LBT procedure for the second tone at 1645. The LBT procedure may include measuring the energy on the eigen direction of the effective channel. The effective channel may be, for example, the channel $G_2$, or a pre-coded channel such as $R_{nn}^{-1/2} G_2$, $(R_{nn}^{-1} H_x W_1)^H G_2$, or $(PHW_1)^H PG_2$, where P is given in Eqn. (13). The second base station 1615 may compare the measured energy level with an energy detection threshold ED. The second base station 1615 may refrain from transmitting on the second tone while the measured energy level is larger than the energy detection threshold ED. The second base station 1615 may determine that the second tone is available for transmission when the measured energy level is lower than the energy detection threshold ED.

The second base station 1615 may transmit a data transmission 1650. In some examples, the data transmission 1650 may be transmitted on the first tone and may be precoded with a first transmit precoder. In some examples, the data transmission 1650 may be transmitted on the second tone and may be precoded with a second transmit precoder.

Figure 17:
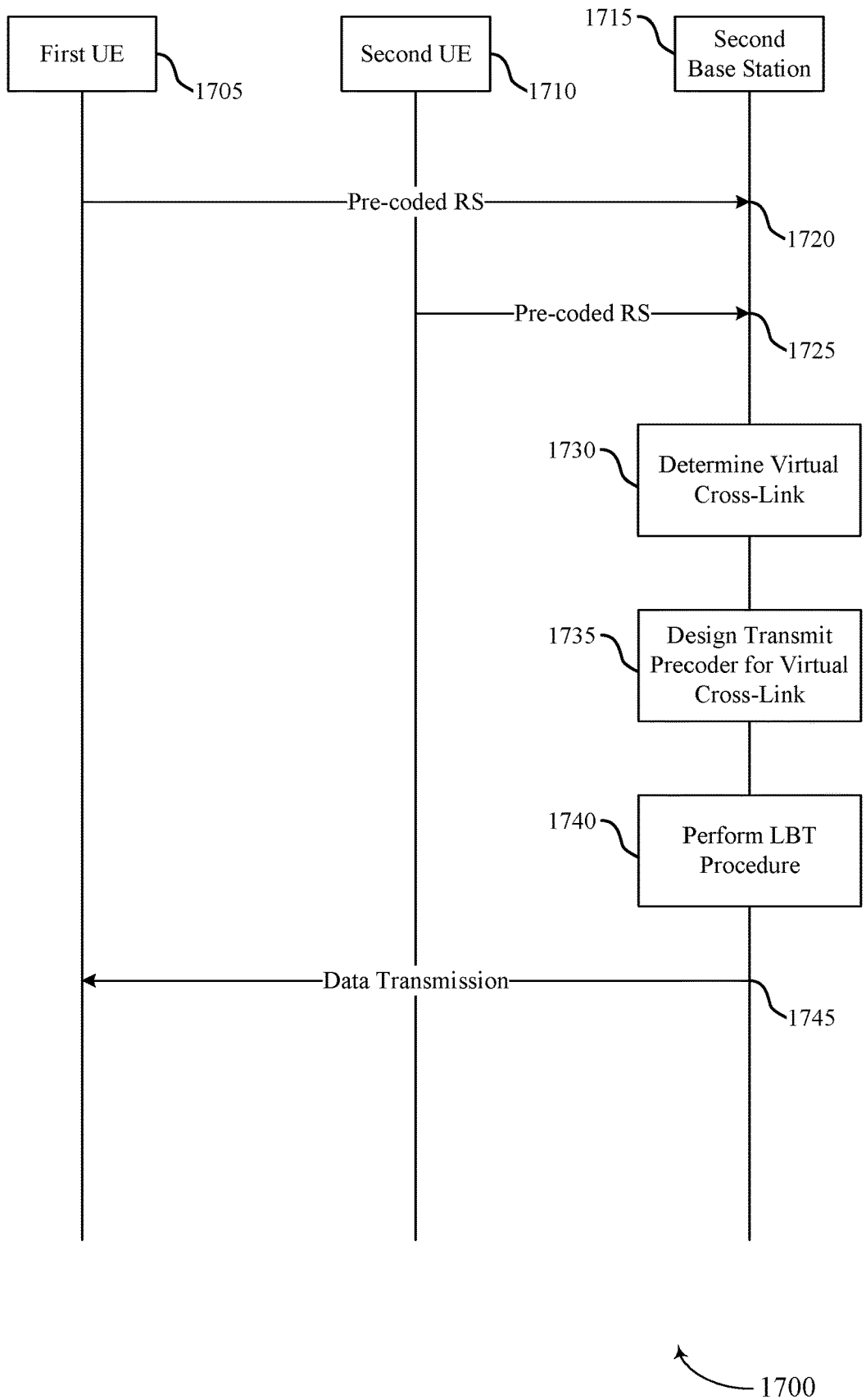
FIG. 17 illustrates an example of a flow diagram for communications in a wireless communication network that supports spatial listen before talk in accordance with aspects of the present disclosure.

FIG. 17 illustrates an example of a flow diagram 1700 for communications in a wireless communications system that supports spatial listen before talk in accordance with various aspects of the present disclosure. In some examples, the wireless communications system may implement aspects of wireless communications system 100.

The flow diagram 1700 shows communications among a first UE 1705, a second UE 1710, and a second base station 1715. The first UE 1705 and the second UE 1710 may be a part of a first BSS including a first base station that serves the first UE 1705 and the second UE 1710. The second base station 1615 may be part of a second BSS including a third UE that is served by the second base station 1715. The first UE 1705 and the second UE 1710 may be examples of aspects of UE 115 described with reference to FIG. 1. The second base station 1715 may be an example of aspects of base station 105 described with reference to FIG. 1.

The first UE 1705 may transmit a first reference signal such as first pre-coded reference signal 1720. The first reference signal may be transmitted on a first cross-channel $G_1$. The second UE 1710 may transmit a second reference signal such as second pre-coded reference signal 1725. The second reference signal may be transmitted on a second cross-channel $G_2$. The first pre-coded reference signal 1720 and the second pre-coded reference signal 1725 may be precoded by a UE transmit precoder. The UE transmit precoder P may be, for example, a whitening matrix $R_{nn}^{-1/2}$, a precoder based on a subset of the eigen vectors in a whitening matrix, or $(R_{nn}^{-1} H_x W_1)^H$.

The second base station 1715 may determine a virtual cross-link at 1730. The second base station 1715 may determine the virtual cross-link based at least in part on the first reference signal and the second reference signal. The virtual cross-link may be $G_v = [G_1; G_2]$.

The second base station 1715 may design a transmit precoder for the virtual cross-link at 1735. The transmit precoder may be designed based at least in part on the virtual cross-link.

The second base station 1715 may perform a LBT procedure at 1740. The LBT procedure may include measuring an energy level on an eigen direction of the effective channel for the virtual cross-link. The effective channel of the virtual cross-link may be $P_v G_v = [P_1 G_1; P_2 G_2]$. The second base station 1715 may compare the measured energy level with an energy detection threshold ED. The second base station 1715 may refrain from transmitting on the second tone while the measured energy level is larger than the energy detection threshold ED. The second base station 1715 may determine that the second tone is available for transmission when the measured energy level is lower than the energy detection threshold ED.

The second base station 1715 may transmit a data transmission 1745. The data transmission 1745 may be precoded by the transmit precoder.

Figure 18:
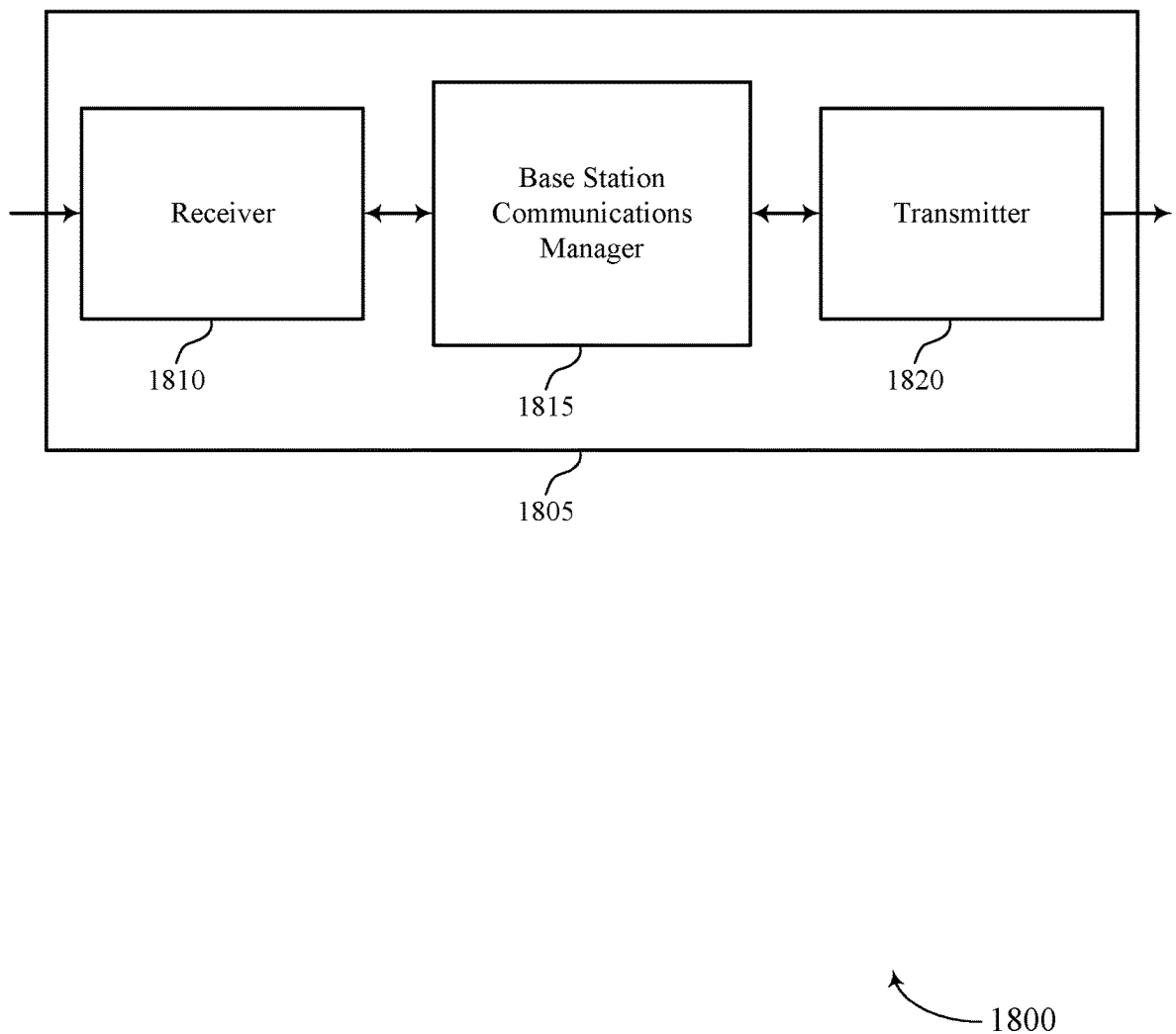
FIGS. 18 through 20 show block diagrams of a device that supports spatial listen before talk in accordance with aspects of the present disclosure.

FIG. 18 shows a block diagram 1800 of a wireless device 1805 that supports spatial listen before talk in accordance with aspects of the present disclosure. Wireless device 1805 may be an example of aspects of a base station 105 as described herein. Wireless device 1805 may include receiver 1810, base station communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to spatial listen before talk, etc.). Information may be passed on to other components of the device. The receiver 1810 may be an example of aspects of the transceiver 2135 described with reference to FIG. 21. The receiver 1810 may utilize a single antenna or a set of antennas.

Base station communications manager 1815 may be an example of aspects of the base station communications manager 2115 described with reference to FIG. 21.

Base station communications manager 1815 and/or at least some of its various sub-components may be implemented in hardware, software executed by a processor, firmware, or any combination thereof. If implemented in software executed by a processor, the functions of the base station communications manager 1815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 1815 and/or at least some of its various sub-components may be physically located at various positions, including being distributed such that portions of functions are implemented at different physical locations by one or more physical devices. In some examples, base station communications manager 1815 and/or at least some of its various sub-components may be a separate and distinct component in accordance with various aspects of the present disclosure. In other examples, base station communications manager 1815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1815 may receive, by a wireless device, a precoded reference signal from a user equipment (UE), the precoded reference signal being precoded based on a subset of eigen vectors of a noise covariance matrix, determine an effective channel between the UE and the wireless device based on the precoded reference signal, determine a transmit precoder based on the effective channel, perform a listen-before-talk (LBT) procedure on an eigen direction of the effective channel between the UE and the wireless device, and transmit one or more data signals based on the transmit precoder and the LBT procedure. The base station communications manager 1815 may also receive, by a wireless device, a precoded reference signal from a UE, the precoded reference signal being precoded based on an whitened channel between the UE and a serving base station, determine an effective channel between the UE and the wireless device based on the precoded reference signal, determine a transmit precoder based on the effective channel, perform a listen before talk (LBT) procedure on an eigen direction of the effective channel between the UE and the wireless device, and transmit one or more data signals based on the transmit precoder and the LBT procedure. The base station communications manager 1815 may also receive, by a wireless device, an indication of a number of null layers for a channel between a first base station and a first UE and schedule one or more data signals based on the indication of the number of null layers for the channel between the first base station and the first UE.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2135 described with reference to FIG. 21. The transmitter 1820 may utilize a single antenna or a set of antennas.

Figure 19:
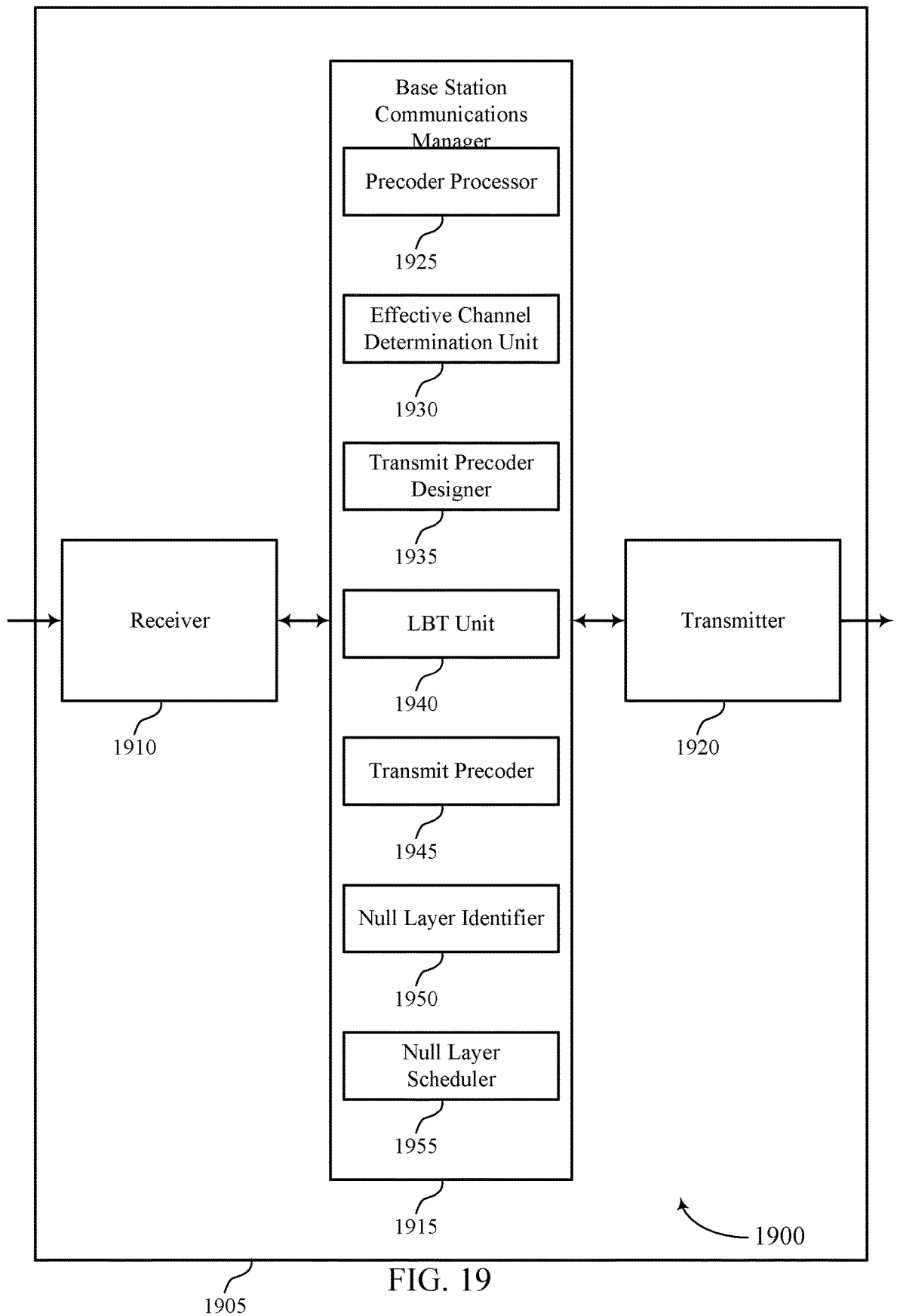

FIG. 19 shows a block diagram 1900 of a wireless device 1905 that supports spatial listen before talk in accordance with aspects of the present disclosure. Wireless device 1905 may be an example of aspects of a wireless device 1805 or a base station 105 as described with reference to FIG. 18. Wireless device 1905 may include receiver 1910, base station communications manager 1915, and transmitter 1920. Wireless device 1905 may also include a processor. Each of these components may be in communication with one another (e.g., via one or more buses).

Receiver 1910 may receive information such as packets, user data, or control information associated with various information channels (e.g., control channels, data channels, and information related to spatial listen before talk, etc.). Information may be passed on to other components of the device. The receiver 1910 may be an example of aspects of the transceiver 2135 described with reference to FIG. 21. The receiver 1910 may utilize a single antenna or a set of antennas.

Base station communications manager 1915 may be an example of aspects of the base station communications manager 2115 described with reference to FIG. 21.

Base station communications manager 1915 may also include precoder processor 1925, effective channel determination unit 1930, transmit precoder designer 1935, LBT unit 1940, transmit precoder 1945, null layer identifier 1950, and null layer scheduler 1955.

Precoder processor 1925 may receive, by a wireless device, a precoded reference signal from a UE, the precoded reference signal being precoded based on a subset of eigen vectors of a noise covariance matrix, receive a second precoded reference signal from a second UE, receive, by a wireless device, a precoded reference signal from a UE, the precoded reference signal being precoded based on an whitened channel between the UE and a serving base station, and receive a second precoded reference signal from a second UE on a second tone, the second tone being a different tone than the tone on which the precoded reference signal is received.

Effective channel determination unit 1930 may determine an effective channel between the UE and the wireless device based on the precoded reference signal and determine a second effective channel between the second UE and the wireless device based on the second precoded reference signal.

Transmit precoder designer 1935 may determine a transmit precoder based on the effective channel, determine a second transmit precoder based on the virtual effective channel, determine the transmit precoder such that the whitened channel between the UE and the serving base station is orthogonal to a whitened channel between the UE and the wireless device, determine, based on the precoded signal, a transmit precoder, determine the transmit precoder such that the precoded reference signal is within the null space, and determine a second transmit precoder based on the second effective channel between the second UE and the wireless device.

LBT unit 1940 may perform a LBT procedure on an eigen direction of the effective channel between the UE and the wireless device, perform the LBT procedure on an eigen direction of the virtual effective channel, perform a listen before talk (LBT) procedure on an eigen direction of the effective channel between the UE and the wireless device, and perform the LBT procedure on the eigen direction of the second effective channel.

Transmit precoder 1945 may transmit one or more data signals based on the transmit precoder 1945 and the LBT procedure, transmit one or more second data signals based on the second transmit precoder 1945 and the LBT procedure on the eigen direction of the virtual effective channel, transmit the one or more data signals based on the transmit precoder 1945, and transmit one or more second data signals on the second tone, the one or more second data signals based on the second transmit precoder 1945 and the LBT procedure on the eigen direction of the second effective channel.

Null layer identifier 1950 may determine, based on the indication of the number of null layers for the channel between the first base station and the first UE and a precoded reference signal, a null space for the channel between the first base station and the first UE, determine, based on the indication of the number of null layers for the channel between the first base station and the first UE and a precoded reference signal, that the channel between the first base station and the first UE does not have a null space, and receive, by a wireless device, an indication of a number of null layers for a channel between a first base station and a first UE.

Null layer scheduler 1955 may schedule the one or more data signals in the null space of the channel between the first base station and the first UE and schedule one or more data signals based on the indication of the number of null layers for the channel between the first base station and the first UE.

Transmitter 1920 may transmit signals generated by other components of the device. In some examples, the transmitter 1920 may be collocated with a receiver 1910 in a transceiver module. For example, the transmitter 1920 may be an example of aspects of the transceiver 2135 described with reference to FIG. 21. The transmitter 1920 may utilize a single antenna or a set of antennas.

Figure 20:
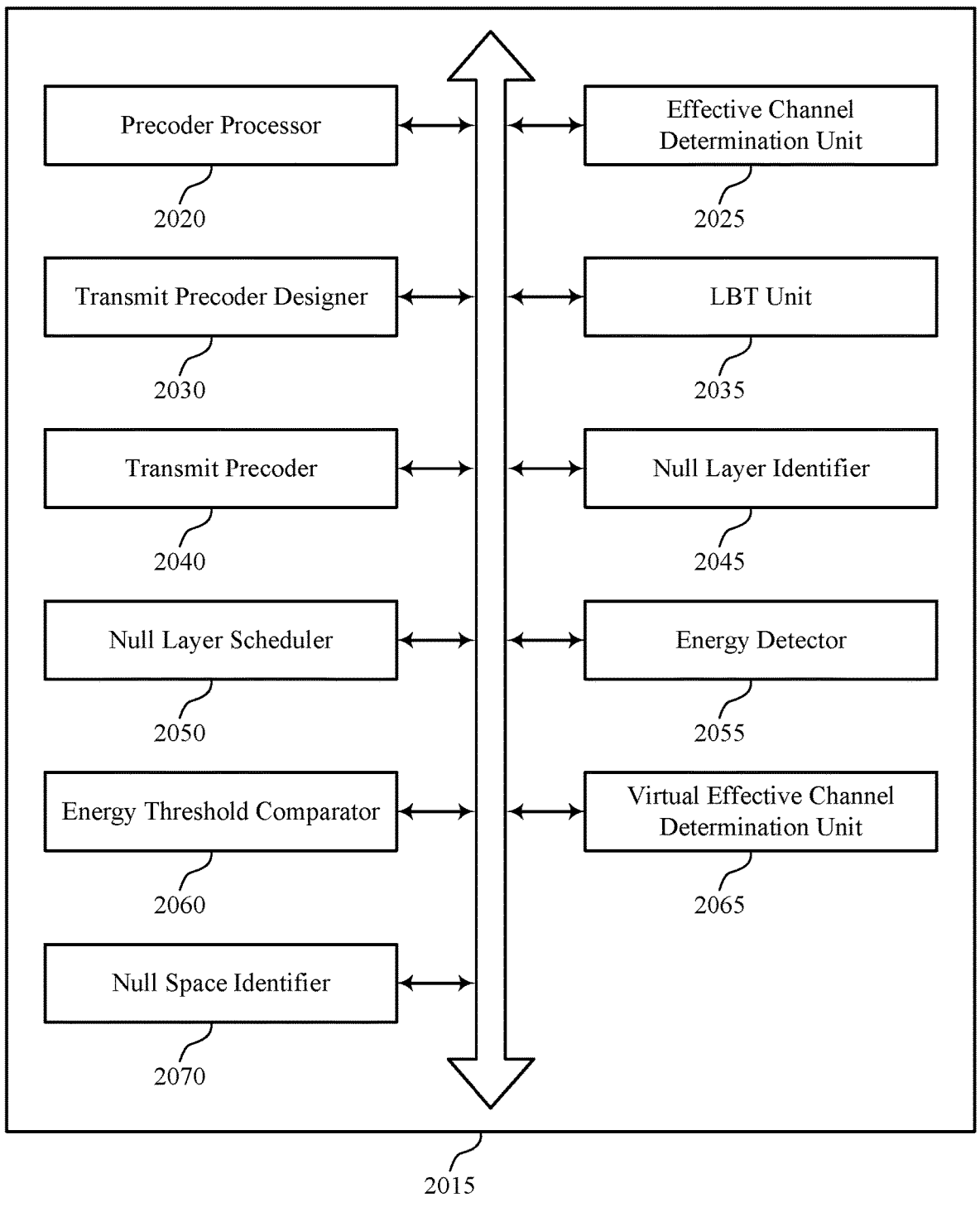

FIG. 20 shows a block diagram 2000 of a base station communications manager 2015 that supports spatial listen before talk in accordance with aspects of the present disclosure. The base station communications manager 2015 may be an example of aspects of a base station communications manager 1815, a base station communications manager 1915, or a base station communications manager 2115 described with reference to FIGS. 18, 19, and 21. The base station communications manager 2015 may include precoder processor 2020, effective channel determination unit 2025, transmit precoder designer 2030, LBT unit 2035, transmit precoder 2040, null layer identifier 2045, null layer scheduler 2050, energy detector 2055, energy threshold comparator 2060, virtual effective channel determination unit 2065, and null space identifier 2070. Each of these modules may communicate, directly or indirectly, with one another (e.g., via one or more buses).

Precoder processor 2020 may receive, by a wireless device, a precoded reference signal from a UE, the precoded reference signal being precoded based on a subset of eigen vectors of a noise covariance matrix, receive a second precoded reference signal from a second UE, receive, by a wireless device, a precoded reference signal from a UE, the precoded reference signal being precoded based on an whitened channel between the UE and a serving base station, and receive a second precoded reference signal from a second UE on a second tone, the second tone being a different tone than the tone on which the precoded reference signal is received.

Effective channel determination unit 2025 may determine an effective channel between the UE and the wireless device based on the precoded reference signal and determine a second effective channel between the second UE and the wireless device based on the second precoded reference signal.

Transmit precoder designer 2030 may determine a transmit precoder based on the effective channel, determine a second transmit precoder based on the virtual effective channel, determine the transmit precoder such that the whitened channel between the UE and the serving base station is orthogonal to a whitened channel between the UE and the wireless device, determine, based on the precoded signal, a transmit precoder, determine the transmit precoder such that the precoded reference signal is within the null space, and determine a second transmit precoder based on the second effective channel between the second UE and the wireless device.

LBT unit 2035 may perform a LBT procedure on an eigen direction of the effective channel between the UE and the wireless device, perform the LBT procedure on an eigen direction of the virtual effective channel, perform a listen before talk (LBT) procedure on an eigen direction of the effective channel between the UE and the wireless device, and perform the LBT procedure on the eigen direction of the second effective channel.

Transmit precoder 2040 may transmit one or more data signals based on the transmit precoder 2040 and the LBT procedure, transmit one or more second data signals based on the second transmit precoder 2040 and the LBT procedure on the eigen direction of the virtual effective channel, transmit the one or more data signals based on the transmit precoder 2040, and transmit one or more second data signals on the second tone, the one or more second data signals based on the second transmit precoder 2040 and the LBT procedure on the eigen direction of the second effective channel.

Null layer identifier 2045 may determine, based on the indication of the number of null layers for the channel between the first base station and the first UE and a precoded reference signal, a null space for the channel between the first base station and the first UE, determine, based on the indication of the number of null layers for the channel between the first base station and the first UE and a precoded reference signal, that the channel between the first base station and the first UE does not have a null space, and receive, by a wireless device, an indication of a number of null layers for a channel between a first base station and a first UE.

Null layer scheduler 2050 may schedule the one or more data signals in the null space of the channel between the first base station and the first UE and schedule one or more data signals based on the indication of the number of null layers for the channel between the first base station and the first UE.

Energy detector 2055 may measure an energy level on a wireless communication channel. In some cases, performing the LBT procedure includes: measuring an energy level on the eigen direction of the effective channel between the UE and the wireless device. In some cases, performing the LBT procedure on the eigen direction of the virtual effective channel includes: measuring a second energy level on the eigen direction of the virtual effective channel. In some cases, performing the LBT procedure includes: measuring an energy level on the eigen direction of the effective channel between the UE and the wireless device. In some cases, performing the LBT procedure on the eigen direction of the second effective channel includes: measuring a second energy level of the second tone on the eigen direction of the second effective channel.

Energy threshold comparator 2060 may determine that the energy level satisfies an energy detection threshold and determine that the second energy level satisfies the energy detection threshold.

Virtual effective channel determination unit 2065 may determine a virtual effective channel based on the precoded reference signal and the second precoded reference signal.

Null space identifier 2070 may identify a null space based on the precoded reference signal.

Figure 21:
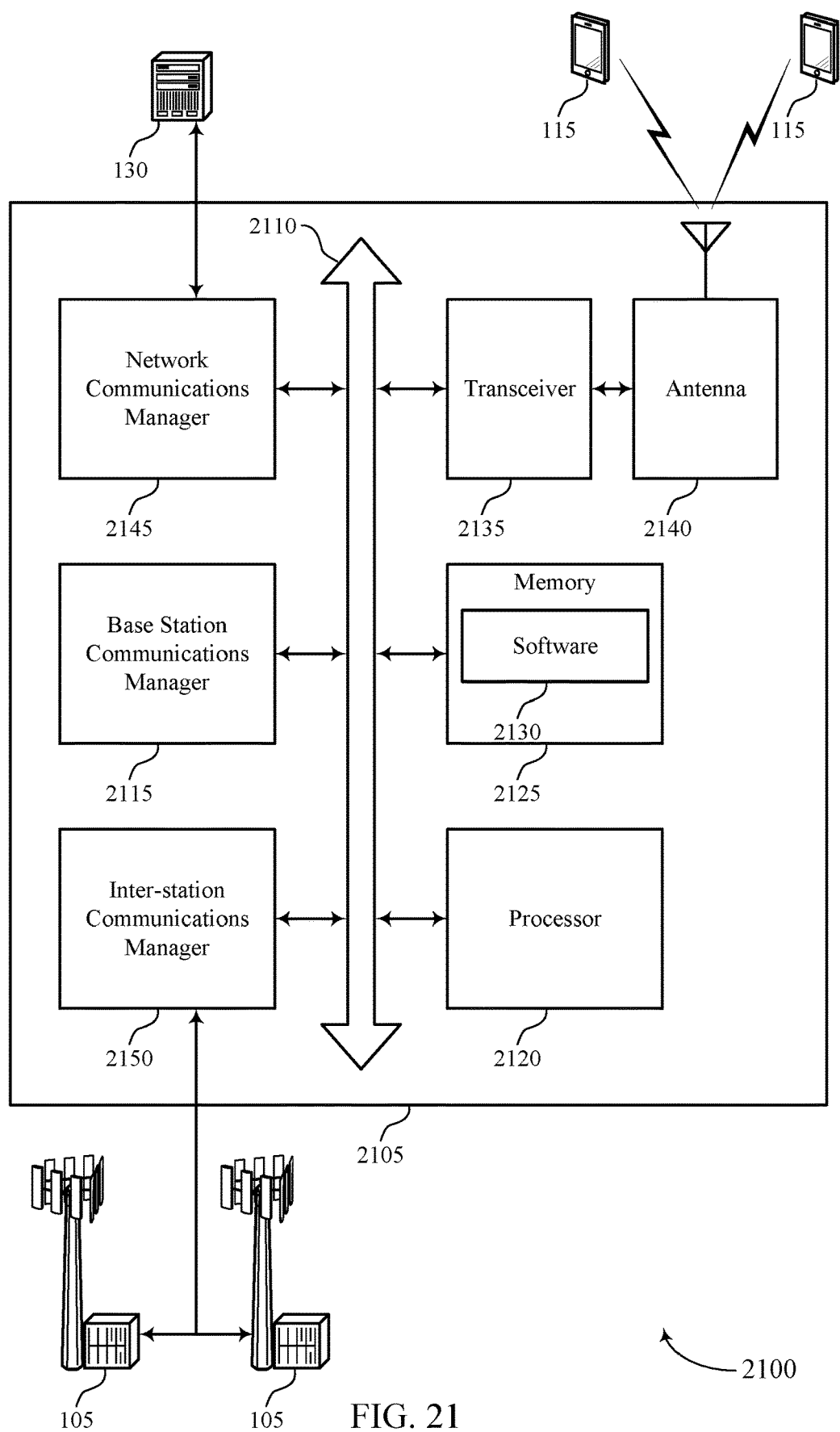
FIG. 21 illustrates a block diagram of a system including a base station that supports spatial listen before talk in accordance with aspects of the present disclosure.

FIG. 21 shows a diagram of a system 2100 including a device 2105 that supports spatial listen before talk in accordance with aspects of the present disclosure. Device 2105 may be an example of or include the components of wireless device 1805, wireless device 1905, or a base station 105 as described above, e.g., with reference to FIGS. 18 and 19. Device 2105 may include components for bi-directional voice and data communications including components for transmitting and receiving communications, including base station communications manager 2115, processor 2120, memory 2125, software 2130, transceiver 2135, antenna 2140, network communications manager 2145, and inter-station communications manager 2150. These components may be in electronic communication via one or more buses (e.g., bus 2110). Device 2105 may communicate wirelessly with one or more UEs 115.

Processor 2120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 2120 may be configured to operate a memory array using a memory controller. In other cases, a memory controller may be integrated into processor 2120. Processor 2120 may be configured to execute computer-readable instructions stored in a memory to perform various functions (e.g., functions or tasks supporting spatial listen before talk).

Memory 2125 may include random access memory (RAM) and read only memory (ROM). The memory 2125 may store computer-readable, computer-executable software 2130 including instructions that, when executed, cause the processor to perform various functions described herein. In some cases, the memory 2125 may contain, among other things, a basic input/output system (BIOS) which may control basic hardware or software operation such as the interaction with peripheral components or devices.

Software 2130 may include code to implement aspects of the present disclosure, including code to support spatial listen before talk. Software 2130 may be stored in a non-transitory computer-readable medium such as system memory or other memory. In some cases, the software 2130 may not be directly executable by the processor but may cause a computer (e.g., when compiled and executed) to perform functions described herein.

Transceiver 2135 may communicate bi-directionally, via one or more antennas, wired, or wireless links as described above. For example, the transceiver 2135 may represent a wireless transceiver and may communicate bi-directionally with another wireless transceiver. The transceiver 2135 may also include a modem to modulate the packets and provide the modulated packets to the antennas for transmission, and to demodulate packets received from the antennas.

In some cases, the wireless device may include a single antenna 2140. However, in some cases the device may have more than one antenna 2140, which may be capable of concurrently transmitting or receiving multiple wireless transmissions.

Network communications manager 2145 may manage communications with the core network (e.g., via one or more wired backhaul links). For example, the network communications manager 2145 may manage the transfer of data communications for client devices, such as one or more UEs 115.

Inter-station communications manager 2150 may manage communications with other base station 105, and may include a controller or scheduler for controlling communications with UEs 115 in cooperation with other base stations 105. For example, the inter-station communications manager 2150 may coordinate scheduling for transmissions to UEs 115 for various interference mitigation techniques such as beamforming or joint transmission. In some examples, inter-station communications manager 2150 may provide an X2 interface within an Long Term Evolution (LTE)/LTE-A wireless communication network technology to provide communication between base stations 105.

Figure 22:
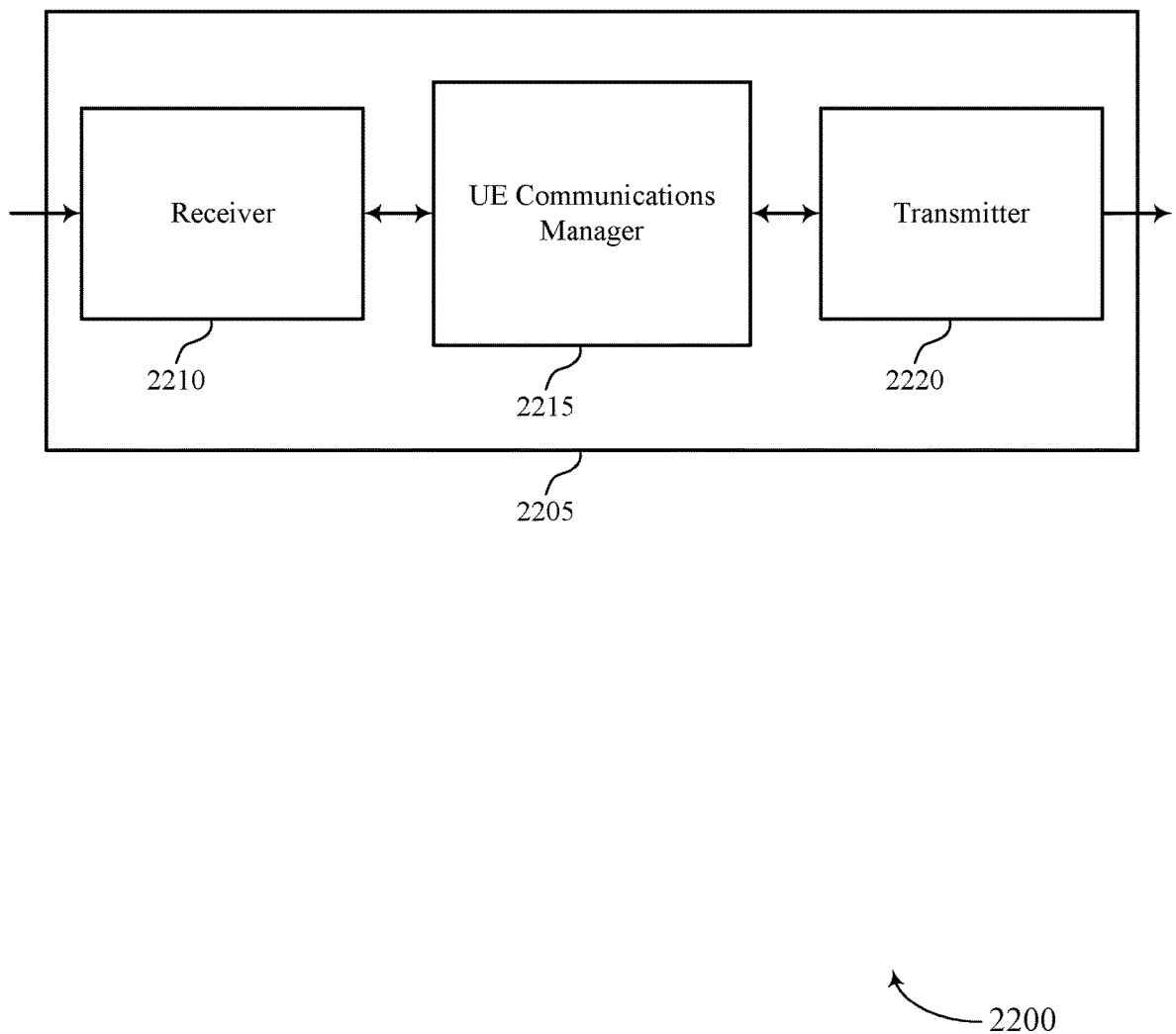
FIGS. 22 through 24 show block diagrams of a device that supports spatial listen before talk in accordance with aspects of the present disclosure.

FIG. 22 shows a block diagram 2200 of a wireless device 2205 that supports spatial listen before talk in accordance with aspects of the present disclosure. Wireless device 2205 may be an example of aspects of a UE 115 as described herein. Wireless device 2205 may include receiver 2210, UE communications manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to spatial listen before talk, etc.). Information may be passed on to other components of the device. The receiver 2210 may be an example of aspects of the transceiver 2535 described with reference to FIG. 25. The receiver 2210 may utilize a single antenna or a set of antennas.

Receiver 2210 may receive, from a serving base station, an indication of the channel between the serving base station and a UE, receive the indication of the channel between the serving base station and the UE includes receiving a second precoded reference signal from the serving base station, receive the second precoded reference signal in response to the third precoded reference signal, and receive, at a wireless device in a first wireless communications system, scheduling information for a data transmission intended for the wireless device.

UE communications manager 2215 may be an example of aspects of the UE communications manager 2515 described with reference to FIG. 25.

UE communications manager 2215 and/or at least some of its various sub-components may be implemented in hardware, software executed by a processor, firmware, or any combination thereof. If implemented in software executed by a processor, the functions of the UE communications manager 2215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 2215 and/or at least some of its various sub-components may be physically located at various positions, including being distributed such that portions of functions are implemented at different physical locations by one or more physical devices. In some examples, UE communications manager 2215 and/or at least some of its various sub-components may be a separate and distinct component in accordance with various aspects of the present disclosure. In other examples, UE communications manager 2215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 2215 may determine, by a UE, a noise covariance matrix, select a subset of eigen directions based on the noise covariance matrix, determine a precoder based on the subset of eigen directions, and transmit a reference signal precoded by the precoder. The UE communications manager 2215 may also determine, by the UE, an effective channel between the serving base station and the UE based on the indication of the channel between the serving base station and the UE, determine a precoder based on the effective channel the serving base station and the UE, and transmit a reference signal precoded by the precoder. The UE communications manager 2215 may also transmit a response to the scheduling information, where at least one of the scheduling information and the response to the scheduling information includes an indication of a number of layers that can be nulled out for communications in a second wireless communications system.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2535 described with reference to FIG. 25. The transmitter 2220 may utilize a single antenna or a set of antennas.

Transmitter 2220 may transmit a third precoded reference signal to the serving base station.

Figure 23:
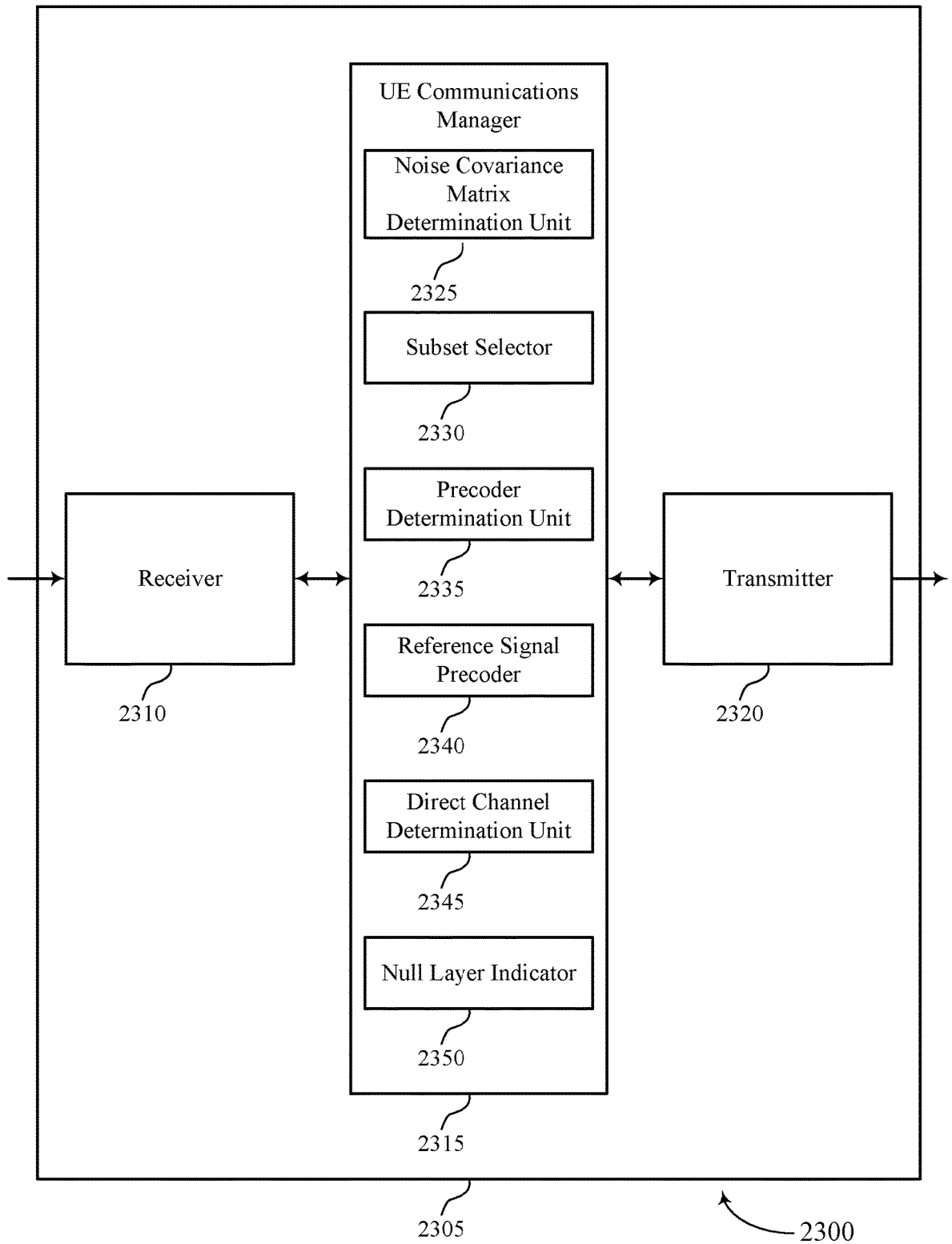

FIG. 23 shows a block diagram 2300 of a wireless device 2305 that supports spatial listen before talk in accordance with aspects of the present disclosure. Wireless device 2305 may be an example of aspects of a wireless device 2205 or a UE 115 as described with reference to FIG. 22. Wireless device 2305 may include receiver 2310, UE communications manager 2315, and transmitter 2320. Wireless device 2305 may also include a processor. Each of these components may be in communication with one another (e.g., via one or more buses).

Receiver 2310 may receive information such as packets, user data, or control information associated with various information channels (e.g., control channels, data channels, and information related to spatial listen before talk, etc.). Information may be passed on to other components of the device. The receiver 2310 may be an example of aspects of the transceiver 2535 described with reference to FIG. 25. The receiver 2310 may utilize a single antenna or a set of antennas.

UE communications manager 2315 may be an example of aspects of the UE communications manager 2515 described with reference to FIG. 25.

UE communications manager 2315 may also include noise covariance matrix determination unit 2325, subset selector 2330, precoder determination unit 2335, reference signal precoder 2340, direct channel determination unit 2345, and null layer indicator 2350.

Noise covariance matrix determination unit 2325 may determine, by a UE, a noise covariance matrix and determine the covariance matrix based on the signal measurement.

Subset selector 2330 may select a subset of eigen directions based on the noise covariance matrix and select the subset of eigen directions from a set of non-zero eigen directions of the whitening. In some cases, selecting the subset of eigen directions of the noise covariance matrix includes: selecting a set number of largest eigen directions of the noise covariance matrix.

Precoder determination unit 2335 may determine a precoder based on the subset of eigen directions, determine a precoder based on the effective channel the serving base station and the UE, determine the precoder based on maximal-ratio combining (MRC) filtering, determine the precoder based on minimum mean square error (MMSE) filtering, determine the precoder based on the serving base station precoder, and determine the precoder based on the whitening matrix.

Reference signal precoder 2340 may transmit a reference signal precoded by the precoder and precode the third precoded reference signal based on the whitening matrix. In some cases, the reference signal includes a sounding reference signal.

Direct channel determination unit 2345 may determine, by the UE, an effective channel between the serving base station and the UE based on the indication of the channel between the serving base station and the UE and determine the effective channel between the UE and the serving base station based on the second precoded reference signal.

Null layer indicator 2350 may transmit a response to the scheduling information, where at least one of the scheduling information and the response to the scheduling information includes an indication of a number of layers that can be nulled out for communications in a second wireless communications system.

Transmitter 2320 may transmit signals generated by other components of the device. In some examples, the transmitter 2320 may be collocated with a receiver 2310 in a transceiver module. For example, the transmitter 2320 may be an example of aspects of the transceiver 2535 described with reference to FIG. 25. The transmitter 2320 may utilize a single antenna or a set of antennas.

Figure 24:
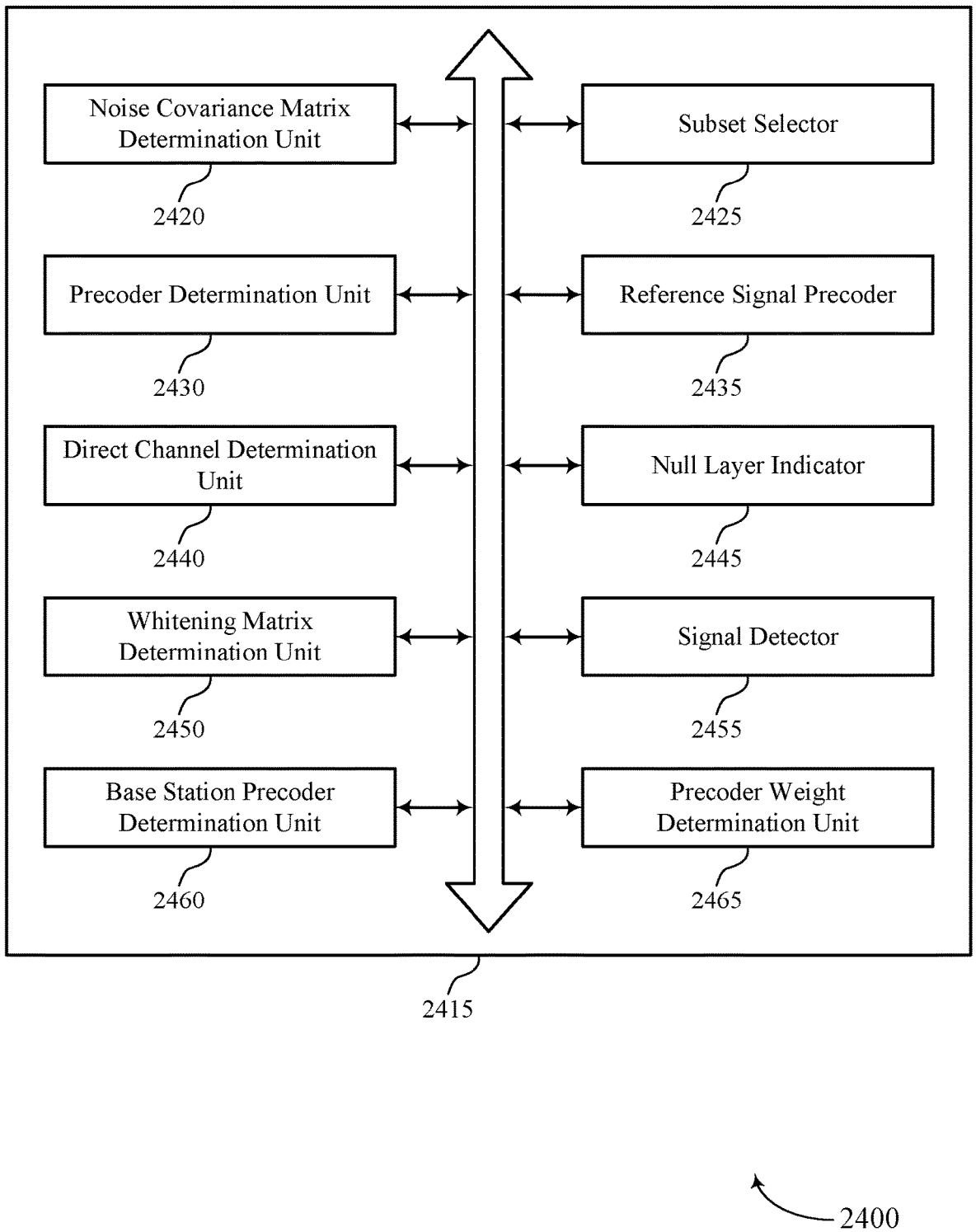

FIG. 24 shows a block diagram 2400 of a UE communications manager 2415 that supports spatial listen before talk in accordance with aspects of the present disclosure. The UE communications manager 2415 may be an example of aspects of a UE communications manager 2515 described with reference to FIGS. 22, 23, and 25. The UE communications manager 2415 may include noise covariance matrix determination unit 2420, subset selector 2425, precoder determination unit 2430, reference signal precoder 2435, direct channel determination unit 2440, null layer indicator 2445, whitening matrix determination unit 2450, signal detector 2455, base station precoder determination unit 2460, and precoder weight determination unit 2465. Each of these modules may communicate, directly or indirectly, with one another (e.g., via one or more buses).

Noise covariance matrix determination unit 2420 may determine, by a UE, a noise covariance matrix and determine the covariance matrix based on the signal measurement.

Subset selector 2425 may select a subset of eigen directions based on the noise covariance matrix and select the subset of eigen directions from a set of non-zero eigen directions of the whitening. In some cases, selecting the subset of eigen directions of the noise covariance matrix includes: selecting a set number of largest eigen directions of the noise covariance matrix.

Precoder determination unit 2430 may determine a precoder based on the subset of eigen directions, determine a precoder based on the effective channel the serving base station and the UE, determine the precoder based on maximal-ratio combining (MRC) filtering, determine the precoder based on minimum mean square error (MMSE) filtering, determine the precoder based on the serving base station precoder, and determine the precoder based on the whitening matrix.

Reference signal precoder 2435 may transmit a reference signal precoded by the precoder and precode the third precoded reference signal based on the whitening matrix. In some cases, the reference signal includes a sounding reference signal.

Direct channel determination unit 2440 may determine, by the UE, an effective channel between the serving base station and the UE based on the indication of the channel between the serving base station and the UE and determine the effective channel between the UE and the serving base station based on the second precoded reference signal.

Null layer indicator 2445 may transmit a response to the scheduling information, where at least one of the scheduling information and the response to the scheduling information includes an indication of a number of layers that can be nulled out for communications in a second wireless communications system.

Whitening matrix determination unit 2450 may determine a whitening matrix based on the noise covariance matrix and determine a whitening matrix based on a noise covariance matrix.

Signal detector 2455 may perform a signal measurement at the UE and measure a downlink channel from a UE in the second wireless communications system.

Base station precoder determination unit 2460 may determine a serving base station precoder based on the indication of the channel between the serving base station and the UE.

Precoder weight determination unit 2465 may determine precoding weights based on the measuring.

Figure 25:
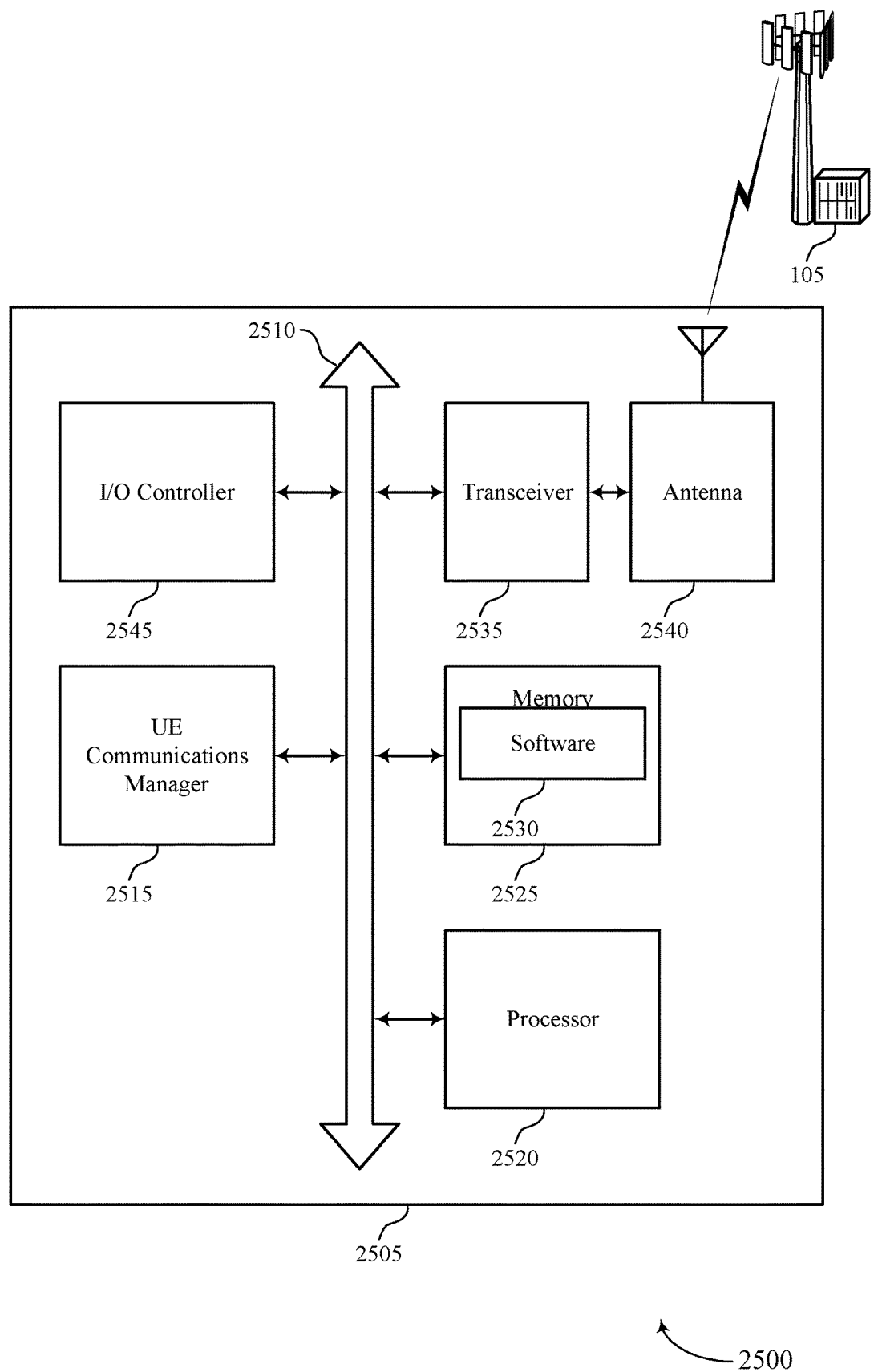
FIG. 25 illustrates a block diagram of a system including a UE that supports spatial listen before talk in accordance with aspects of the present disclosure.

FIG. 25 shows a diagram of a system 2500 including a device 2505 that supports spatial listen before talk in accordance with aspects of the present disclosure. Device 2505 may be an example of or include the components of UE 115 as described above, e.g., with reference to FIG. 1. Device 2505 may include components for bi-directional voice and data communications including components for transmitting and receiving communications, including UE communications manager 2515, processor 2520, memory 2525, software 2530, transceiver 2535, antenna 2540, and I/O controller 2545. These components may be in electronic communication via one or more buses (e.g., bus 2510). Device 2505 may communicate wirelessly with one or more base stations 105.

Processor 2520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2520 may be configured to operate a memory array using a memory controller. In other cases, a memory controller may be integrated into processor 2520. Processor 2520 may be configured to execute computer-readable instructions stored in a memory to perform various functions (e.g., functions or tasks supporting spatial listen before talk).

Memory 2525 may include RAM and ROM. The memory 2525 may store computer-readable, computer-executable software 2530 including instructions that, when executed, cause the processor to perform various functions described herein. In some cases, the memory 2525 may contain, among other things, a BIOS which may control basic hardware or software operation such as the interaction with peripheral components or devices.

Software 2530 may include code to implement aspects of the present disclosure, including code to support spatial listen before talk. Software 2530 may be stored in a non-transitory computer-readable medium such as system memory or other memory. In some cases, the software 2530 may not be directly executable by the processor but may cause a computer (e.g., when compiled and executed) to perform functions described herein.

Transceiver 2535 may communicate bi-directionally, via one or more antennas, wired, or wireless links as described above. For example, the transceiver 2535 may represent a wireless transceiver and may communicate bi-directionally with another wireless transceiver. The transceiver 2535 may also include a modem to modulate the packets and provide the modulated packets to the antennas for transmission, and to demodulate packets received from the antennas.

In some cases, the wireless device may include a single antenna 2540. However, in some cases the device may have more than one antenna 2540, which may be capable of concurrently transmitting or receiving multiple wireless transmissions.

I/O controller 2545 may manage input and output signals for device 2505. I/O controller 2545 may also manage peripherals not integrated into device 2505. In some cases, I/O controller 2545 may represent a physical connection or port to an external peripheral. In some cases, I/O controller 2545 may utilize an operating system such as iOS®, ANDROID®, MS-DOS®, MS-WINDOWS®, OS/2®, UNIX®, LINUX®, or another known operating system. In other cases, I/O controller 2545 may represent or interact with a modem, a keyboard, a mouse, a touchscreen, or a similar device. In some cases, I/O controller 2545 may be implemented as part of a processor. In some cases, a user may interact with device 2505 via I/O controller 2545 or via hardware components controlled by I/O controller 2545.

Figure 26:
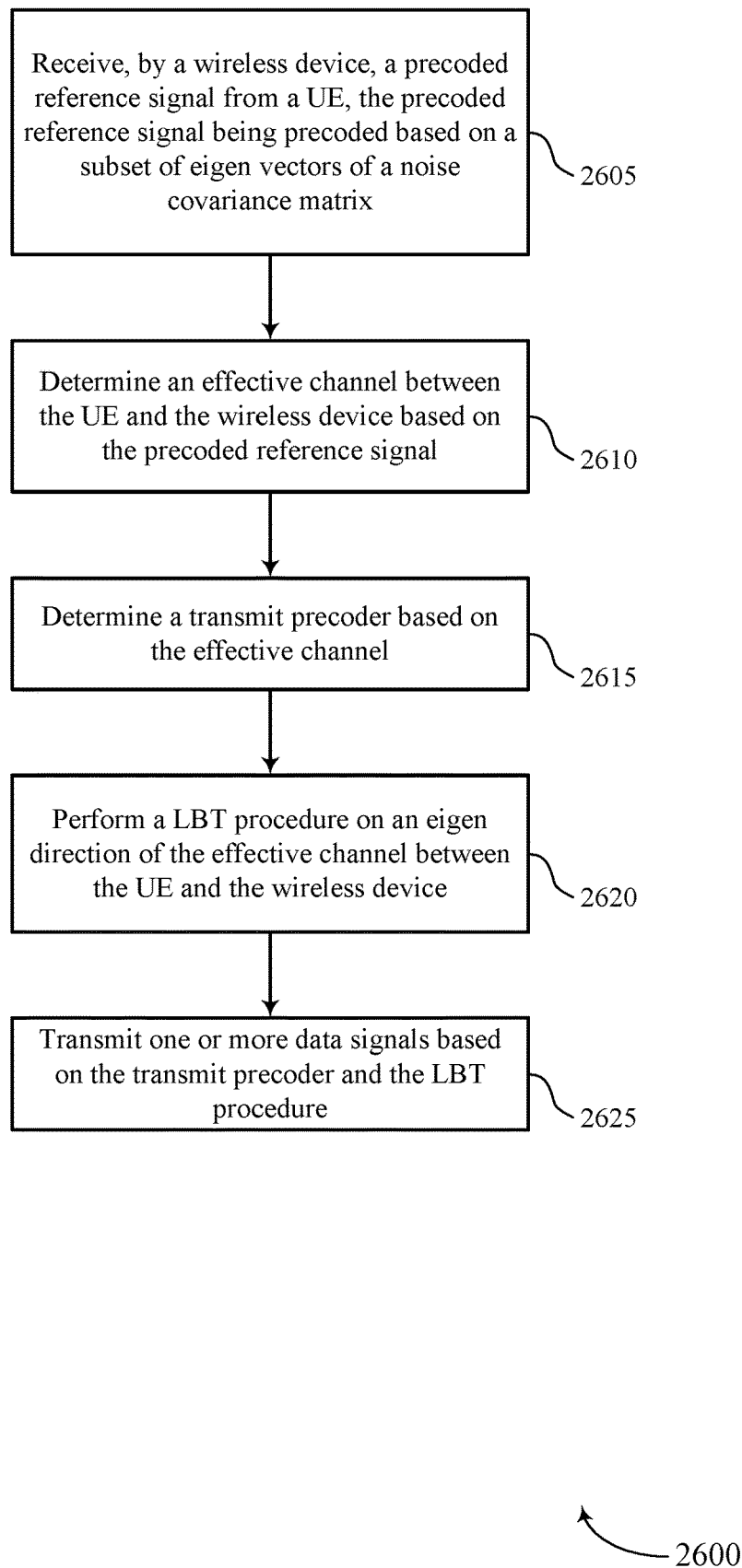
FIGS. 26 through 31 illustrate methods for spatial listen before talk in accordance with aspects of the present disclosure.

FIG. 26 shows a flowchart illustrating a method 2600 for spatial listen before talk in accordance with aspects of the present disclosure. The operations of method 2600 may be implemented by a base station 105 or its components as described herein. For example, the operations of method 2600 may be performed by a base station communications manager as described with reference to FIGS. 18 through 21. In some examples, a base station 105 may execute a set of codes to control the functional elements of the device to perform the functions described below. Additionally or alternatively, the base station 105 may perform aspects of the functions described below using special-purpose hardware.

At block 2605 the base station 105 may receive, by a wireless device, a precoded reference signal from a user equipment (UE), the precoded reference signal being precoded based at least in part on a subset of eigen vectors of a noise covariance matrix. The operations of block 2605 may be performed according to the methods described herein. In certain examples, aspects of the operations of block 2605 may be performed by a precoder processor as described with reference to FIGS. 18 through 21.

At block 2610 the base station 105 may determine an effective channel between the UE and the wireless device based at least in part on the precoded reference signal. The operations of block 2610 may be performed according to the methods described herein. In certain examples, aspects of the operations of block 2610 may be performed by an effective channel determination unit as described with reference to FIGS. 18 through 21.

At block 2615 the base station 105 may determine a transmit precoder based at least in part on the effective channel. The operations of block 2615 may be performed according to the methods described herein. In certain examples, aspects of the operations of block 2615 may be performed by a transmit precoder designer as described with reference to FIGS. 18 through 21.

At block 2620 the base station 105 may perform a listen-before-talk (LBT) procedure on an eigen direction of the effective channel between the UE and the wireless device. The operations of block 2620 may be performed according to the methods described herein. In certain examples, aspects of the operations of block 2620 may be performed by a LBT unit as described with reference to FIGS. 18 through 21.

At block 2625 the base station 105 may transmit one or more data signals based at least in part on the transmit precoder and the LBT procedure. The operations of block 2625 may be performed according to the methods described herein. In certain examples, aspects of the operations of block 2625 may be performed by a transmit precoder as described with reference to FIGS. 18 through 21.

Figure 27:
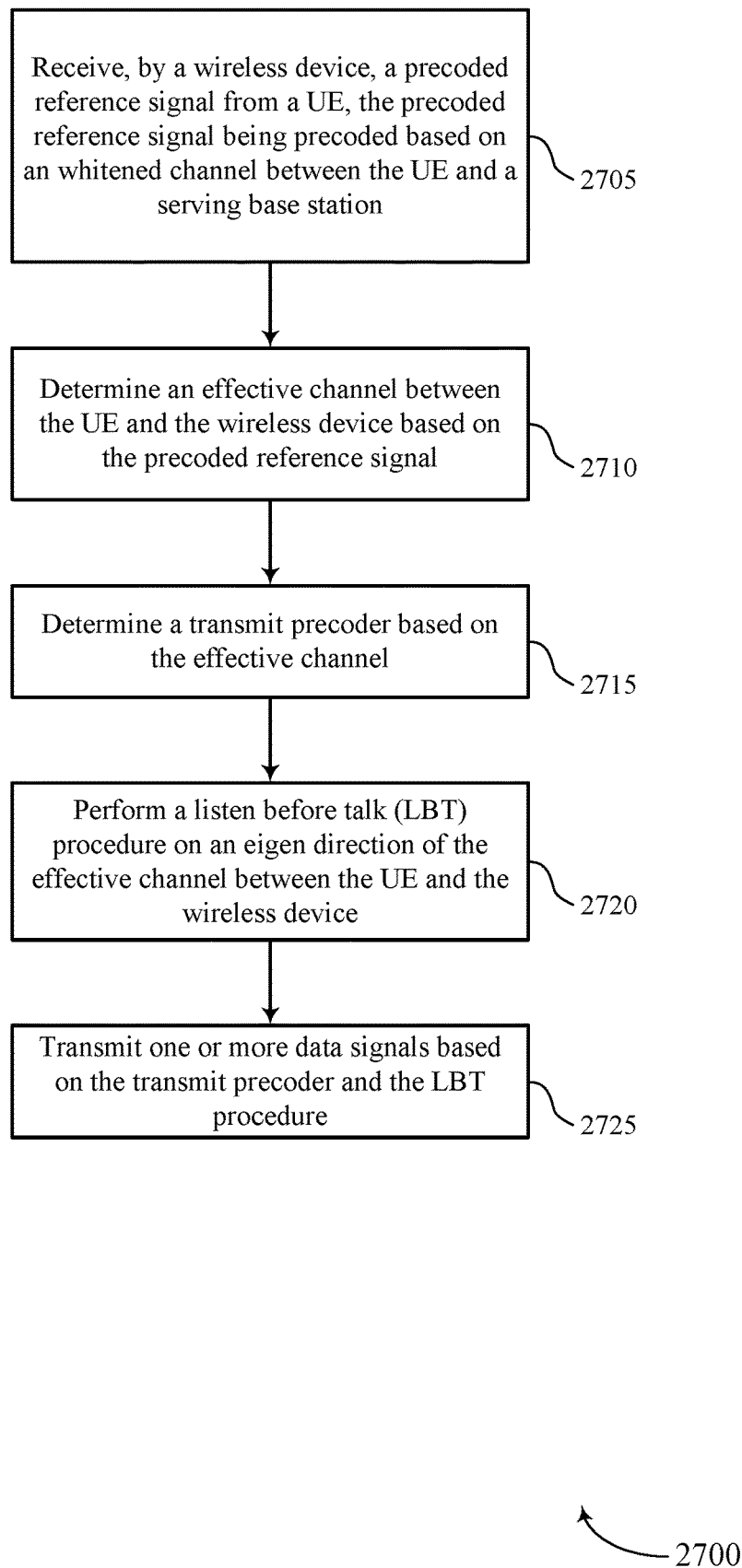

FIG. 27 shows a flowchart illustrating a method 2700 for spatial listen before talk in accordance with aspects of the present disclosure. The operations of method 2700 may be implemented by a base station 105 or its components as described herein. For example, the operations of method 2700 may be performed by a base station communications manager as described with reference to FIGS. 18 through 21. In some examples, a base station 105 may execute a set of codes to control the functional elements of the device to perform the functions described below. Additionally or alternatively, the base station 105 may perform aspects of the functions described below using special-purpose hardware.

At block 2705 the base station 105 may receive, by a wireless device, a precoded reference signal from a user equipment (UE), the precoded reference signal being precoded based at least in part on an whitened channel between the UE and a serving base station. The operations of block 2705 may be performed according to the methods described herein. In certain examples, aspects of the operations of block 2705 may be performed by a precoder processor as described with reference to FIGS. 18 through 21.

At block 2710 the base station 105 may determine an effective channel between the UE and the wireless device based at least in part on the precoded reference signal. The operations of block 2710 may be performed according to the methods described herein. In certain examples, aspects of the operations of block 2710 may be performed by an effective channel determination unit as described with reference to FIGS. 18 through 21.

At block 2715 the base station 105 may determine a transmit precoder based at least in part on the effective channel. The operations of block 2715 may be performed according to the methods described herein. In certain examples, aspects of the operations of block 2715 may be performed by a transmit precoder designer as described with reference to FIGS. 18 through 21.

At block 2720 the base station 105 may perform a listen before talk (LBT) procedure on an eigen direction of the effective channel between the UE and the wireless device. The operations of block 2720 may be performed according to the methods described herein. In certain examples, aspects of the operations of block 2720 may be performed by a LBT unit as described with reference to FIGS. 18 through 21.

At block 2725 the base station 105 may transmit one or more data signals based at least in part on the transmit precoder and the LBT procedure. The operations of block 2725 may be performed according to the methods described herein. In certain examples, aspects of the operations of block 2725 may be performed by a transmit precoder as described with reference to FIGS. 18 through 21.

Figure 28:
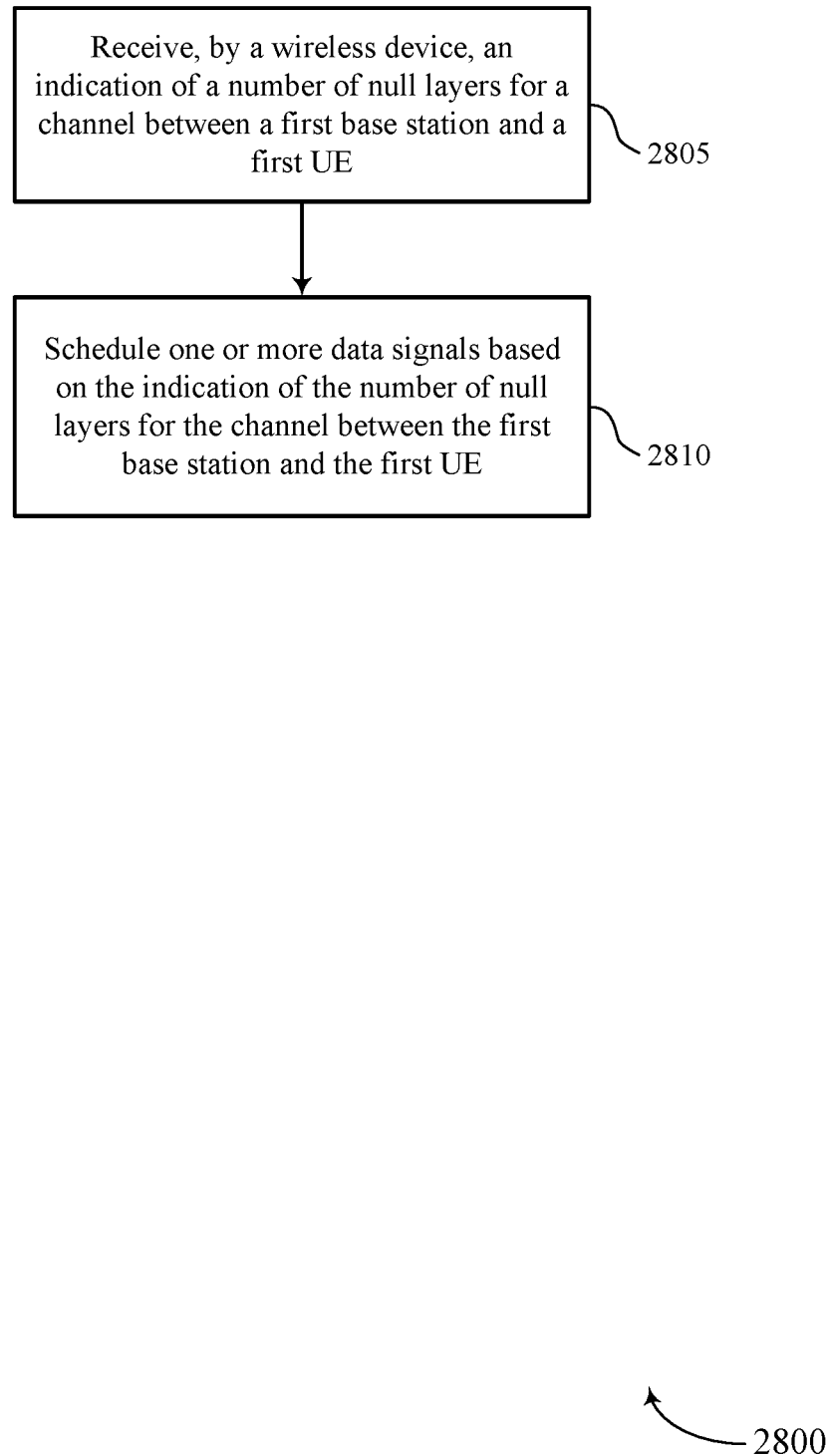

FIG. 28 shows a flowchart illustrating a method 2800 for spatial listen before talk in accordance with aspects of the present disclosure. The operations of method 2800 may be implemented by a base station 105 or its components as described herein. For example, the operations of method 2800 may be performed by a base station communications manager as described with reference to FIGS. 18 through 21. In some examples, a base station 105 may execute a set of codes to control the functional elements of the device to perform the functions described below. Additionally or alternatively, the base station 105 may perform aspects of the functions described below using special-purpose hardware.

At block 2805 the base station 105 may receive, by a wireless device, an indication of a number of null layers for a channel between a first base station and a first user equipment (UE). The operations of block 2805 may be performed according to the methods described herein. In certain examples, aspects of the operations of block 2805 may be performed by a null layer identifier as described with reference to FIGS. 18 through 21.

At block 2810 the base station 105 may schedule one or more data signals based at least in part on the indication of the number of null layers for the channel between the first base station and the first UE. The operations of block 2810 may be performed according to the methods described herein. In certain examples, aspects of the operations of block 2810 may be performed by a null layer scheduler as described with reference to FIGS. 18 through 21.

Figure 29:
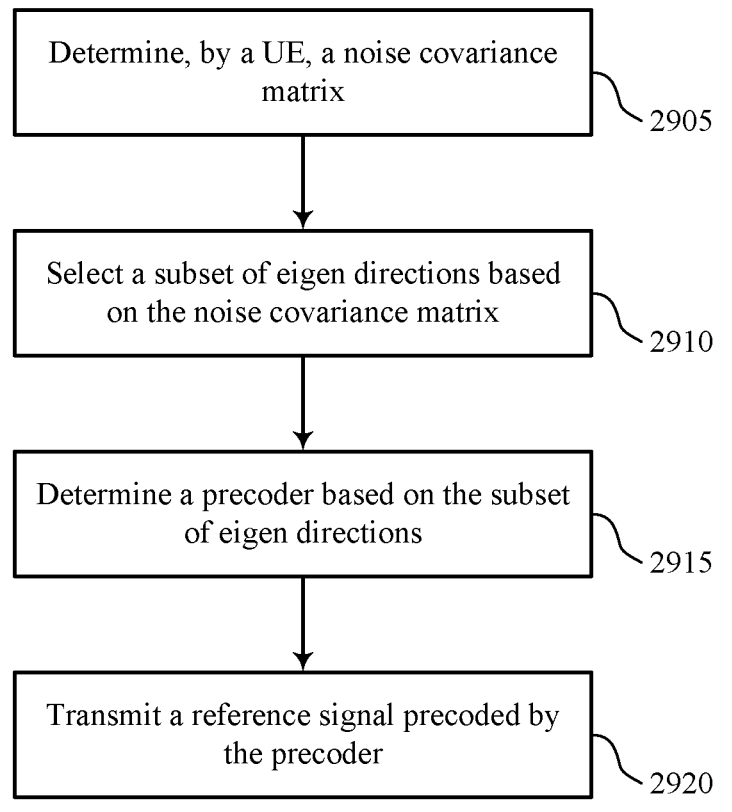

FIG. 29 shows a flowchart illustrating a method 2900 for spatial listen before talk in accordance with aspects of the present disclosure. The operations of method 2900 may be implemented by a UE 115 or its components as described herein. For example, the operations of method 2900 may be performed by a UE communications manager as described with reference to FIGS. 22 through 25. In some examples, a UE 115 may execute a set of codes to control the functional elements of the device to perform the functions described below. Additionally or alternatively, the UE 115 may perform aspects of the functions described below using special-purpose hardware.

At block 2905 the UE 115 may determine, by a user equipment (UE), a noise covariance matrix. The operations of block 2905 may be performed according to the methods described herein. In certain examples, aspects of the operations of block 2905 may be performed by a noise covariance matrix determination unit as described with reference to FIGS. 22 through 25.

At block 2910 the UE 115 may select a subset of eigen directions based at least in part on the noise covariance matrix. The operations of block 2910 may be performed according to the methods described herein. In certain examples, aspects of the operations of block 2910 may be performed by a subset selector as described with reference to FIGS. 22 through 25.

At block 2915 the UE 115 may determine a precoder based at least in part on the subset of eigen directions. The operations of block 2915 may be performed according to the methods described herein. In certain examples, aspects of the operations of block 2915 may be performed by a precoder determination unit as described with reference to FIGS. 22 through 25.

At block 2920 the UE 115 may transmit a reference signal precoded by the precoder. The operations of block 2920 may be performed according to the methods described herein. In certain examples, aspects of the operations of block 2920 may be performed by a reference signal precoder as described with reference to FIGS. 22 through 25.

Figure 30:
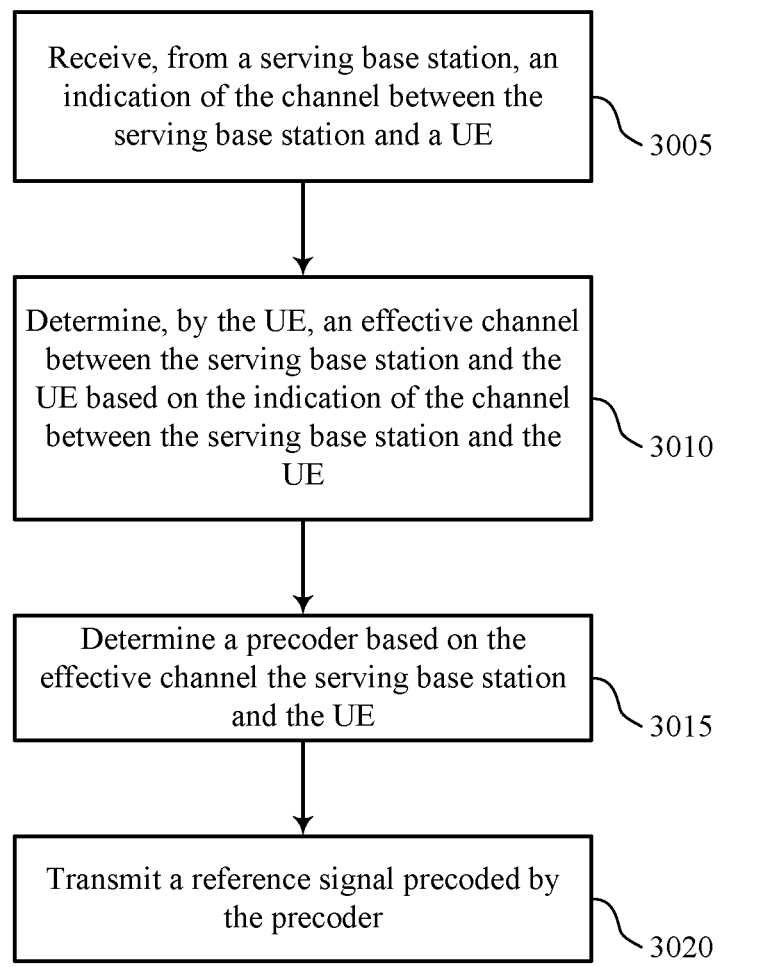

FIG. 30 shows a flowchart illustrating a method 3000 for spatial listen before talk in accordance with aspects of the present disclosure. The operations of method 3000 may be implemented by a UE 115 or its components as described herein. For example, the operations of method 3000 may be performed by a UE communications manager as described with reference to FIGS. 22 through 25. In some examples, a UE 115 may execute a set of codes to control the functional elements of the device to perform the functions described below. Additionally or alternatively, the UE 115 may perform aspects of the functions described below using special-purpose hardware.

At block 3005 the UE 115 may receive, from a serving base station, an indication of the channel between the serving base station and a user equipment (UE). The operations of block 3005 may be performed according to the methods described herein. In certain examples, aspects of the operations of block 3005 may be performed by a receiver as described with reference to FIGS. 22 through 25.

At block 3010 the UE 115 may determine, by the UE, an effective channel between the serving base station and the UE based at least in part on the indication of the channel between the serving base station and the UE. The operations of block 3010 may be performed according to the methods described herein. In certain examples, aspects of the operations of block 3010 may be performed by a direct channel determination unit as described with reference to FIGS. 22 through 25.

At block 3015 the UE 115 may determine a precoder based at least in part on the effective channel the serving base station and the UE. The operations of block 3015 may be performed according to the methods described herein. In certain examples, aspects of the operations of block 3015 may be performed by a precoder determination unit as described with reference to FIGS. 22 through 25.

At block 3020 the UE 115 may transmit a reference signal precoded by the precoder. The operations of block 3020 may be performed according to the methods described herein. In certain examples, aspects of the operations of block 3020 may be performed by a reference signal precoder as described with reference to FIGS. 22 through 25.

Figure 31:
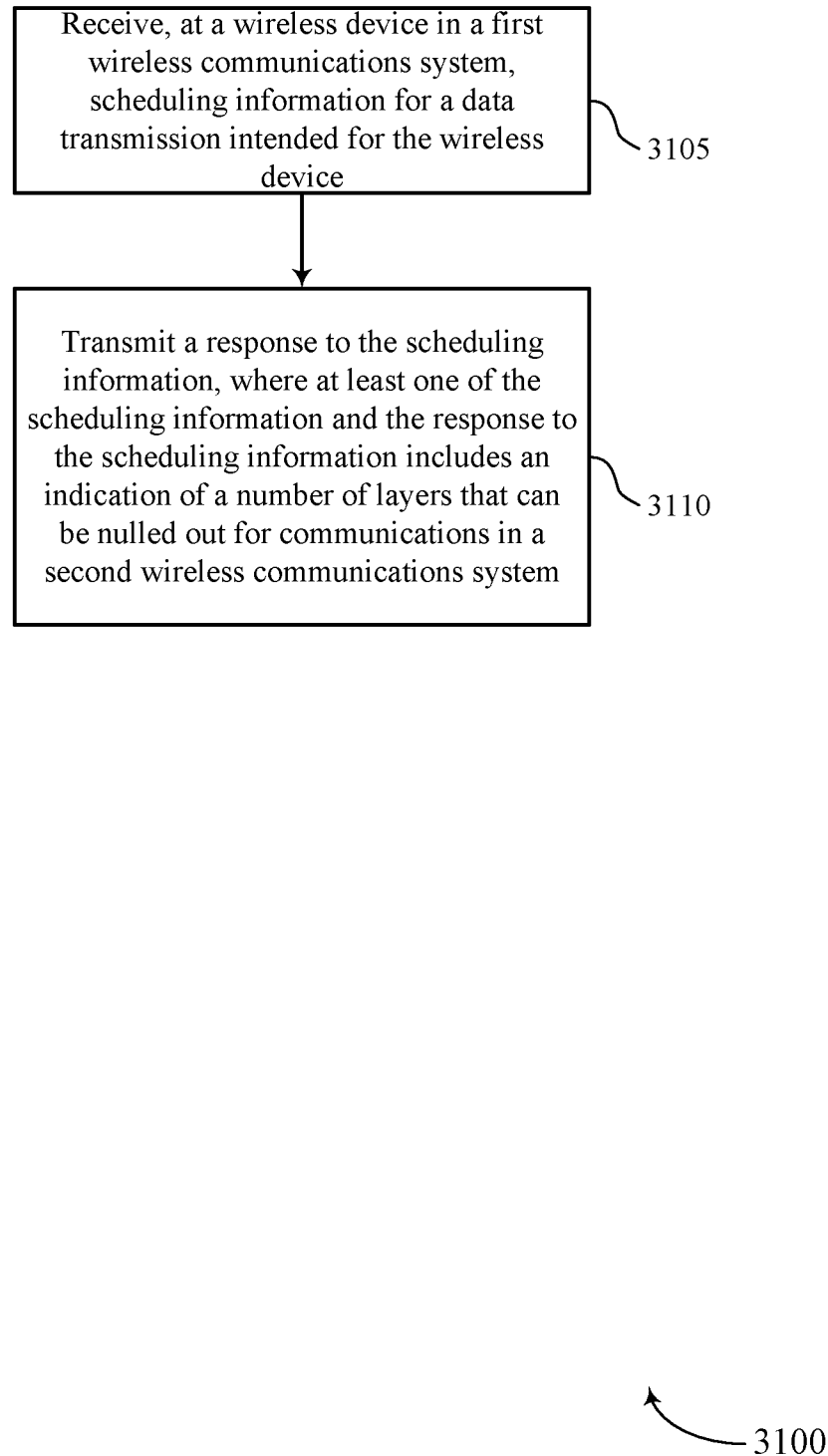

FIG. 31 shows a flowchart illustrating a method 3100 for spatial listen before talk in accordance with aspects of the present disclosure. The operations of method 3100 may be implemented by a UE 115 or its components as described herein. For example, the operations of method 3100 may be performed by a UE communications manager as described with reference to FIGS. 22 through 25. In some examples, a UE 115 may execute a set of codes to control the functional elements of the device to perform the functions described below. Additionally or alternatively, the UE 115 may perform aspects of the functions described below using special-purpose hardware.

At block 3105 the UE 115 may receive, at a wireless device in a first wireless communications system, scheduling information for a data transmission intended for the wireless device. The operations of block 3105 may be performed according to the methods described herein. In certain examples, aspects of the operations of block 3105 may be performed by a receiver as described with reference to FIGS. 22 through 25.

At block 3110 the UE 115 may transmit a response to the scheduling information, wherein at least one of the scheduling information and the response to the scheduling information comprises an indication of a number of layers that can be nulled out for communications in a second wireless communications system. The operations of block 3110 may be performed according to the methods described herein. In certain examples, aspects of the operations of block 3110 may be performed by a null layer indicator as described with reference to FIGS. 22 through 25.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, from a serving base station, an indication of the channel between the serving base station and a user equipment (UE);
determining, by the UE, an effective channel between the serving base station and the UE based at least in part on the indication of the channel between the serving base station and the UE;
determining a whitening matrix based at least in part on a noise covariance matrix;
determining a precoder based at least in part on the whitening matrix and the effective channel between the serving base station and the UE; and
transmitting a reference signal precoded by the precoder.

2. The method of claim 1, further comprising:
receiving the indication of the channel between the serving base station and the UE comprises receiving a second precoded reference signal from the serving base station.

3. The method of claim 2, further comprising:
determining the effective channel between the UE and the serving base station based at least in part on the second precoded reference signal.

4. The method of claim 2, further comprising:
transmitting a third precoded reference signal to the serving base station; and
receiving the second precoded reference signal in response to the third precoded reference signal.

5. The method of claim 4, further comprising:
precoding the third precoded reference signal based at least in part on the whitening matrix.

6. The method of claim 1, further comprising:
determining the precoder based at least in part on maximal-ratio combining (MRC) filtering.

7. The method of claim 1, further comprising:
determining the precoder based at least in part on minimum mean square error (MMSE) filtering.

8. The method of claim 1, further comprising:
determining a serving base station precoder based at least in part on the indication of the channel between the serving base station and the UE; and
determining the precoder based at least in part on the serving base station precoder.

9. The method of claim 8, further comprising:
determining a whitening matrix based at least in part on a noise covariance matrix; and
determining the precoder based at least in part on the whitening matrix.

10. An apparatus for wireless communication, comprising:
a processor;
memory in electronic communication with the processor; and
instructions stored in the memory and operable, when executed by the processor, to cause the apparatus to:
receive, from a serving base station, an indication of the channel between the serving base station and a user equipment (UE);
determine, by the UE, an effective channel between the serving base station and the UE based at least in part on the indication of the channel between the serving base station and the UE;
determine a whitening matrix based at least in part on a noise covariance matrix;
determine a precoder based at least in part on the whitening matrix and the effective channel between the serving base station and the UE; and
transmit a reference signal precoded by the precoder.

11. The apparatus of claim 10, wherein the instructions are further executable by the processor to:
receive the indication of the channel between the serving base station and the UE comprises receiving a second precoded reference signal from the serving base station.

12. The apparatus of claim 11, wherein the instructions are further executable by the processor to:
determine the effective channel between the UE and the serving base station based at least in part on the second precoded reference signal.

13. The apparatus of claim 11, wherein the instructions are further executable by the processor to:
transmit a third precoded reference signal to the serving base station; and
receive the second precoded reference signal in response to the third precoded reference signal.

14. The apparatus of claim 13, wherein the instructions are further executable by the processor to:
precode the third precoded reference signal based at least in part on the whitening matrix.

15. The apparatus of claim 10, wherein the instructions are further executable by the processor to:
determine the precoder based at least in part on maximal-ratio combining (MRC) filtering.

16. The apparatus of claim 10, wherein the instructions are further executable by the processor to:
determine the precoder based at least in part on minimum mean square error (MMSE) filtering.

17. The apparatus of claim 10, wherein the instructions are further executable by the processor to:
determine a serving base station precoder based at least in part on the indication of the channel between the serving base station and the UE; and
determine the precoder based at least in part on the serving base station precoder.

18. The apparatus of claim 17, wherein the instructions are further executable by the processor to:
determine a whitening matrix based at least in part on a noise covariance matrix; and
determine the precoder based at least in part on the whitening matrix.

* * * * *